(12) United States Patent
Enomura

(10) Patent No.: US 11,065,588 B2
(45) Date of Patent: Jul. 20, 2021

(54) FLUID PROCESSING METHOD

(71) Applicant: M. TECHNIQUE CO., LTD., Izumi (JP)

(72) Inventor: Masakazu Enomura, Izumi (JP)

(73) Assignee: M. TECHNIQUE CO., LTD., Izumi (JP)

( * ) Notice: Subject to any disclaimer, the term of this patent is extended or adjusted under 35 U.S.C. 154(b) by 1006 days.

(21) Appl. No.: 14/787,979

(22) PCT Filed: Apr. 28, 2014

(86) PCT No.: PCT/JP2014/061905
§ 371 (c)(1),
(2) Date: Oct. 29, 2015

(87) PCT Pub. No.: WO2014/178387
PCT Pub. Date: Nov. 6, 2014

(65) Prior Publication Data
US 2016/0089641 A1 Mar. 31, 2016

(30) Foreign Application Priority Data

Apr. 30, 2013 (JP) ............................. JP2013-096049

(51) Int. Cl.
*B01F 15/00* (2006.01)
*B01F 3/08* (2006.01)
(Continued)

(52) U.S. Cl.
CPC .......... *B01F 3/0807* (2013.01); *B01D 9/0063* (2013.01); *B01D 9/0072* (2013.01);
(Continued)

(58) Field of Classification Search
CPC ...... B01D 9/0063; B01D 9/0072; B01D 9/77; B01F 15/00331; B01F 15/0203;
(Continued)

(56) References Cited

U.S. PATENT DOCUMENTS 8,852,402 B2 10/2014 Imppola et al.
2004/0032792 A1 2/2004 Enomura
(Continued)

FOREIGN PATENT DOCUMENTS

CN 1278745 A 1/2001
CN 103025957 A 4/2013
(Continued)

*Primary Examiner* — Alexander M Weddle
(74) *Attorney, Agent, or Firm* — Birch, Stewart, Kolasch & Birch LLP

(57) ABSTRACT

A fluid processing method with which processing properties of fluids to be processed can be effectively controlled. Processing surfaces which are capable of being brought closer to each other and being separated from each other, and which rotate relatively are provided. A fluid to be processed is made to pass from inside to outside in a processing area between the processing surfaces to obtain a fluid thin film, and the resultant fluid thin film of the fluid to be processed is subjected to processing. Processing properties are controlled by changing the ratio of the distance to an outer peripheral end from a centre of rotation.

16 Claims, 47 Drawing Sheets

(51) Int. Cl.
  *B01J 19/18*  (2006.01)
  *B01F 7/00*  (2006.01)
  *B01F 15/02*  (2006.01)
  *B01D 9/00*  (2006.01)

(52) U.S. Cl.
  CPC .......... *B01D 9/0077* (2013.01); *B01F 3/0853* (2013.01); *B01F 7/00775* (2013.01); *B01F 15/00331* (2013.01); *B01F 15/0203* (2013.01); *B01J 19/1887* (2013.01); *B01F 2003/0846* (2013.01); *B01F 2215/0036* (2013.01); *B01J 2219/00094* (2013.01)

(58) Field of Classification Search
  CPC ............ B01F 2215/0036; B01F 3/0853; B01F 7/00775; B01J 19/1887; B01J 2219/00094
  See application file for complete search history.

(56) References Cited

U.S. PATENT DOCUMENTS

| | | |
|---|---|---|
| 2005/0100481 A1 | 5/2005 | Mae et al. |
| 2009/0004099 A1 | 1/2009 | Iversen et al. |
| 2009/0269250 A1 | 10/2009 | Panagiotou et al. |
| 2011/0177337 A1 | 7/2011 | Enomura |
| 2012/0006230 A1 | 1/2012 | Enomura |
| 2013/0008514 A1* | 1/2013 | Enomura .............. B01F 3/0807 137/1 |
| 2013/0062030 A1 | 3/2013 | Imppola et al. |
| 2014/0134068 A1 | 5/2014 | Enomura |
| 2014/0155247 A1 | 6/2014 | Aoyagi et al. |

FOREIGN PATENT DOCUMENTS

| | | |
|---|---|---|
| EP | 2179966 A1 | 4/2010 |
| EP | 2 184 109 A1 | 5/2010 |
| JP | 2003-138253 A | 5/2003 |
| JP | 2004-49957 A | 2/2004 |
| JP | 2004-358322 A | 12/2004 |
| JP | 2006-341232 A | 12/2006 |
| JP | 2007-326066 A | 12/2007 |
| JP | 2008-30966 A | 2/2008 |
| JP | 2008-289985 A | 12/2008 |
| JP | 2009-518167 A | 5/2009 |
| JP | 2010-24478 A | 2/2010 |
| JP | 2011-509173 A | 3/2011 |
| JP | WO2013/088706 A1 | 1/2013 |
| JP | 2013-39567 A | 2/2013 |
| JP | 2013-521417 A | 6/2013 |
| WO | WO 99/22844 A1 | 5/1999 |
| WO | WO 2009/008393 A1 | 1/2009 |
| WO | WO 2011/110744 A2 | 9/2011 |
| WO | WO 2011/126124 A1 | 10/2011 |

* cited by examiner (A)

(B)

(A)

(B)

(A)

(B)

FLUID PROCESSING METHOD

TECHNICAL FIELD

The present invention relates to a fluid processing method, especially for single or a plurality of fluid to be processed in various processing such as emulsification, dispersion, pulverization, separation of microparticles, and a reaction not accompanies with separation of microparticles.

BACKGROUND ART

Technologies to process single or a plurality of fluid to be processed by emulsification, dispersion, pulverization, separation of microparticles, a reaction not accompanies with separation of microparticles, and the like are widely used in various industrial fields. For example, the fluid processing method accompanied with separation of microparticles is widely used in production of microparticles; and the microparticles thereby obtained are used as an optical material, a magnetic material, a conductive material, an electronic material, a functional ceramics, a fluorescent material, a catalytic material, and a chemical material, and the like. Especially, microparticles of a metal, a metal oxide, and a composite material are expected to drastically improve optical, electromagnetic, and mechanical properties thereof. In addition, there is a large expectation for new properties brought about by making microparticles; the properties including expression of superfunctional properties and novel properties owing to a quantum size effect.

As shown in Patent Document 1 and Patent Document 2, the applicant of the present application has made many proposals with regard to the processing method of a fluid to be processed and a processing apparatus thereof. Specifically, it relates to the processing method wherein a fluid to be processed is introduced from one, or two or more introduction parts into between at least two processing surfaces which are disposed in a position they are faced with each other so as to be able to approach to and separate from each other, at least one of which rotates relative to the other whereby carrying out various processing of the fluid to be processed while making the introduced fluid to be processed pass through between the processing surfaces under the state of a thin film fluid, and thereafter the fluid is discharged from between the processing surfaces.

The apparatus by the applicant of the present application has been put to practical use under the commercial names of "SS5" and "ULREA (registered trade mark)"; and it is used various industrial fields with receiving a high rating. However, at present there are many uncertainties in control of individual processing; and as the application field thereof is increasingly diversified, the requirement in the processing is diversified as well.

For example, in the processing accompanied with separation of microparticles, it is required not only to merely obtain microparticles but also to obtain microparticles having specific physical properties. In more detail, because physical properties of microparticles are deeply dependent not only on particle diameter but also on crystallinity and crystallite diameter thereof, it is required not only to merely produce microparticles but also to precisely control crystallinity and crystallite diameter of the microparticles.

There are many methods to control crystallinity or crystallite diameter of microparticles. Illustrative example thereof includes: the method as shown in Patent Document 3 in which a simple metal, a metal ion, a metal compound, or metal solutions obtained by dissolving these substances into a solvent is subjected to the solvothermal method; the method as shown in Patent Document 4 or 5 in which these substances are subjected to the hydrothermal treatment under a subcritical state or a supercritical state followed by controlling the cooling temperature thereof; and the method as shown Patent Document 6 in which these substances are subjected to the heat treatment under an inert atmosphere. However, in these methods, an apparatus having excellent heat resistance and pressure resistance as well as an inert atmosphere is required, and on top of them, long processing time is necessary; and therefore, there are problems including an increase in the energy cost.

And also, a method for manufacturing microparticles shown by Patent Document 7 was provided by the applicant of the present application, in which a proposal was made to control the crystallite diameter at the time when a raw material fluid which contains a substance to be separated is mixed with a separating fluid to separate the substance to be separated in the raw material fluid between processing surfaces which are able to approach to and separate from each other thereby separating microparticles of the substance to be separated. However, the method shown in Patent Document 7 only changes the kind, concentration, and pH of the substance to be separated contained in each fluid, and the introduction temperature and introduction rate of each fluid.

PRIOR ART DOCUMENTS

Patent Document

Patent Document 1: Japanese Patent Laid-Open Publication No. 2004-049957

Patent Document 2: International Patent Laid-Open Publication No. WO 2009/008393

Patent Document 3: Japanese Patent Laid-Open publication No. 2008-030966

Patent Document 4: Japanese Patent Laid-Open publication No. 2008-289985

Patent Document 5: Japanese Translation of PCT International Application Publication No. 2009-518167

Patent Document 6: Japanese Patent Laid-Open Publication No. 2010-024478

Patent Document 7: International Patent Laid-Open Publication No. WO 2013/008706

DISCLOSURE OF THE INVENTION

Problems to be Solved by the Invention

In the apparatus of the applicant of the present application which has been put the apparatus described in Patent Documents 1, 2, and 7 to practical use, a fluid to be processed is made to pass through a processing region which is regulated by the flow path controlled by at least two processing surfaces which are disposed in a position they are faced with each other so as to be able to approach to and separate from each other, at least one of which rotates relative to the other, thereby separating microparticles into the fluid to be processed which is made to a thin film fluid between the processing surfaces.

This apparatus can be used in various processing including emulsification, dispersion, pulverization, separation of microparticles, and a reaction not accompanies with separation of microparticles; and one use example thereof is the apparatus with which microparticles are separated by using two or more fluids to be processed. In this case, as the processing region, an unmixed region is provided inside the radius direction and a mixing region is provided outside the unmixed region. In this apparatus, an inside introduction part is provided inside the unmixed region (namely upstream side) and an intermediate introduction part is provided in the boundary between the unmixed region and the mixing region; and two or more fluids to be processed are introduced from the inside introduction part and the intermediate introduction part, whereby separating microparticles in the mixing region, which is then discharged from the discharge part in the downstream end of the processing region. In this apparatus which has been put to practical use, the distance (Cd) from a center of the rotation to the intermediate introduction part and the distance (Od) from the center of the rotation to the outer circumference edge of the processing region have been set in such a way that Od/Cd becomes less than 1.25. In other words, in the apparatus put to practical use by the applicant of the present application, the location of the processing region from the center of the rotation and the area (namely volume) of the processing region have been constant.

In addition, in this apparatus, as the unmixed region, a coercive introducing region which is located near to the center of the rotation and a thin film controlling region which is located far from the center of the rotation are provided. The coercive introducing region is the region which is formed in at least one processing surface in such a way that a depression expressing a micropump effect may be extended from the upstream to the downstream; and the thin film controlling region is the region between the downstream end of the depression and the intermediate introduction part. At least one kind of the fluid to be processed is coercively introduced into the coercive introducing region from the inside introduction part through the depression, and it is adjusted to a spiral laminar flow between this coercive introducing region and the thin film controlling region, and then it runs to the mixing region. And in the apparatus put to practical use, the width ratio (Ow/Iw) of the width (Ow) of the mixing region in a radius direction of the rotation to the width (Iw) of the thin film controlling region in the radius direction of the rotation has been set at the value of less than 2.00. In other words, in the apparatus put to practical use by the present application, the ratio between the width (Iw) of the thin film controlling region and the width (Ow) of the mixing region has been constant.

One other example of the use method of this apparatus is to use it for separation of microparticles by using one kind of fluid to be processed. In this case, one kind of fluid to be processed is introduced from the inside introduction part as the processing region, which is followed by separation of microparticles by applying a thermal energy in the processing surfaces. Accordingly, because the intermediate introduction part to introduce other fluid is not necessary, there is no distinction between the unmixed region and the mixing region; and thus, almost all of the space between the processing surfaces becomes the processing region. Separation of microparticles is carried out in this processing region; and the separated microparticles are discharged together with the fluid to be processed from the discharge part in the downstream end of the processing region. In this apparatus which has been put to practical use, the distance (Id) from the center of the rotation to the inside introduction part and the distance (Od) from the center of the rotation to the discharge part have been set so as to give the value of Od/Id less than 1.67. In other words, in the apparatus which was put to practical use by the present application, the location of the processing region from the center of the rotation and the area (namely volume) of the processing region have been constant.

It became apparent to a certain extent by investigation of the present inventors that the state of the crystals can be changed from separation of microparticles by changing the location and area of the regions to separate the microparticles (namely the mixing region when two or more kinds of fluids to be processed are used, and the processing region when only one kind of fluid to be processed is used), and in the case that the coercive introducing region is formed, by changing the rotation speed of the processing surfaces, the introduction velocity of each of the fluids to be processed, and the like in the apparatus having the widths of the thin film controlling region and of the mixing region made constant. For example, if the rotation speed of the processing surfaces is increased, a force applied to the fluid to be processed in the direction to the periphery increases, so that the moving distance to the discharge part becomes longer. If the introduction velocity of the fluid to be processed is increased, i.e., the introducing amount per unit time is increased, the flow rate becomes faster, resulting in a shorter moving time to the discharge part. The present inventors have been attempting to control crystallinity, particle diameter, and growing state of the crystallite diameter by controlling the conditions as mentioned above.

However, when the introduction velocity of the fluid to be processed or the rotation speed of the processing surfaces is changed, sometimes there are the cases that the particle diameter of the obtained microparticles is significantly changed, the shape of the obtained microparticles becomes unstable, and in the case when microparticles are composed of a composite material, distribution of each substance to constitute the composite material becomes uneven among the particles. And at the time when microparticles are separated by using two fluids to be processed, i.e., a raw material fluid which contains a substance becoming a raw material of a substance to be separated and a separating fluid to separate the substance to be separated, if the introduction velocity of one fluid to be processed is changed, the mixing ratio between the raw material fluid and the separating fluid changes, whereby sometimes leading to difficulty in obtaining the microparticles having intended characteristics and performance.

And with regard to the fluid processing by the reaction not accompanied with separation of microparticles, if the introduction velocity of the fluid to be processed or the rotation speed of the processing surfaces is changed, there occurs the cases that an intended reaction condition cannot be obtained and that when the reaction is carried out by using two fluids to be processed, if the introduction velocity of one fluid to be processed is changed, the mixing ratio between the fluids to be processed changes.

In addition, with regard to the processing of emulsification, dispersion, and pulverization, too, if the introduction velocity of the fluid to be processed or the rotation speed of the processing surfaces is changed, there are risks that the particle diameter of the obtained microparticles changes significantly and the shape of the obtained microparticles becomes unstable. And in the case that the processing of emulsification, dispersion, or pulverization is carried out by using two fluids to be processed, if the introduction velocity of one fluid to be processed is changed, emulsification or the mixing ratio between the fluids to be processed changes.

Accordingly, an object of the present invention is, regardless of whether or not the introduction velocity of the fluid to be processed and the rotation speed of the processing surfaces are changed, to enable to control the processing characteristics by controlling the area, location, and ratio of each of the regions.

More specifically, in the fluid processing accompanied with separation of microparticles, the object thereof is to enable a crystallinity control in which crystallinity of the microparticles is increased or decreased, a d/D control in which a ratio (d/D) of crystallite diameter (d) to particle diameter (D) of the microparticles is increased or decreased, and a CV value control in which particle size distribution of the microparticles is controlled. In the fluid processing accompanied with a reaction, the object thereof is to enable a yield control in which yield is increased or decreased and a purity control in which purity of the reaction is increased or decreased. Further, in the processing of emulsification, dispersion, or pulverization, it is to enable to control the particle diameter in which the particle diameter of the obtained microparticles is controlled and to control the CV value in which the particle size distribution of the obtained microparticles is controlled.

Means for Solving the Problems

The present invention solves the above-mentioned problems by providing the following means.

The present invention comprises: an introducing step in which a fluid to be processed is introduced through one, or two or more of introduction parts into between at least two processing surfaces which are disposed in a position they are faced with each other so as to be able to approach to and separate from each other, at least one of which rotates relative to the other, and a processing step in which a fluid processing is performed while a thin film fluid formed by the fluid to be processed passes through between the processing surfaces, then the fluid to be processed is discharged from between the two processing surfaces, wherein in the processing step, the fluid to be processed is passed through a space between the processing surfaces, which is a processing region having a center side of the rotation of the processing surfaces as an upstream and an outer circumference side of the rotation as a downstream, then the fluid is discharged from an outer circumference edge of the processing region; and processing characteristics of the processing is controlled by increasing or decreasing a ratio (Od/Id) of a distance (Od) from the center of the rotation to the outer circumference edge to a distance (Id) from the center of the rotation to the introduction part.

The present invention may also be carried out by using two kinds of fluids to be processed.

Specifically, the present invention comprises: an introducing step in which a fluid to be processed is introduced through two or more introduction parts into between at least two processing surfaces which are disposed in a position they are faced with each other so as to be able to approach to and separate from each other, at least one of which rotates relative to the other, and a processing step in which a fluid processing is performed while a thin film fluid formed by the fluid to be processed passes through between the processing surfaces, then the fluid to be processed is discharged from between the two processing surfaces, wherein in the processing step, the fluid to be processed is passed through a space between the processing surfaces, which is a processing region having a center side of the rotation of the processing surfaces as an upstream and an outer circumference side of the rotation as a downstream, then the fluid to be processed is discharged from an outer circumference edge of the processing region.

In this case, as the fluid to be processed, at least two kinds of fluids to be processed are used, and as the introduction parts, an inside introduction part and an intermediate introduction part which is disposed in a position more apart from the center of the rotation than the inside introduction part are provided; the processing region comprises a mixing region which is located more apart from the center of the rotation than the intermediate introduction part and an unmixed region which is located nearer to the center of the rotation than the intermediate introduction part; the step of introduction comprises a step of introducing at least one of the fluids to be processed into the unmixed region from the inside introduction part and a step of introducing at least one other fluid to be processed into the mixing region from the intermediate introduction part; and the step of processing comprises a step of mixing in the mixing region the fluid to be processed which is introduced from the inside introduction part with the fluid to be processed which is introduced from the intermediate introduction part. And here, processing characteristics of the processing is controlled by increasing or decreasing a ratio (Od/Cd) of a distance (Od) from the center of the rotation to the outer circumference edge to a distance (Cd) from the center of the rotation to the intermediate introduction part.

The present invention may be used for the fluid processing accompanied with separation of microparticles by using at least two kinds of fluids to be processed, as the fluid to be processed, a fluid to be processed which contains at least one kind of substance becoming a raw material of a substance to be separated and a fluid to be processed to separate the substance to be separated.

In this fluid processing accompanied with separation of microparticles, at least any one of following controls can be carried out: a crystallinity control in which crystallinity of the microparticles is increased or decreased by increasing or decreasing the ratio (Od/Cd) of the distance (Od) from the center of the rotation to the outer circumference edge relative to the distance (Cd) from the center of the rotation to the intermediate introduction part, a d/D control in which a ratio (d/D) of crystallite diameter (d) to particle diameter (D) of the microparticles is increased or decreased, and a CV value control in which particle size distribution of the microparticles is controlled.

In this fluid processing accompanied with separation of microparticles, the processing region is regulated by x (width), y (length), and z (height); and it is understood that the location and area of the processing region is changed by increasing or decreasing x (width) and y (length) among x (width), y (length), and z (height). By changing them, what can be carried out are: the crystallinity control in which crystallinity of the obtained microparticles is increased or decreased, the d/D control in which the ratio (d/D) of crystallite diameter (d) to particle diameter (D) of the microparticles is increased or decreased, and the CV value control in which particle size distribution of the microparticles is controlled.

More specifically, the microparticles are separated by a step of introducing the fluid to be processed, which contains at least one kind of substance becoming a raw material of a substance to be separated, from the introduction part into between the processing surfaces and a step of separating microparticles of the substance to be separated while making the thin film fluid of the fluid to be processed pass through the processing region.

At this time, in the case that, as the fluid to be processed, at least two kinds of fluids to be processed, i.e., the fluid to be processed which contains at least one kind of substance becoming a raw material of a substance to be separated and the fluid to be processed to separate the substance to be separated, are introduced separately from the respective introduction parts into between the processing surfaces, the foregoing y (length) is regulated by the distance (Cd) from the center of the rotation to the intermediate introduction part and the distance (Od) from the center of the rotation to the outer circumference edge, while the foregoing x (width) is regulated by the foregoing y (length) and the ratio of the circumference of a circle to its diameter.

Meanwhile, in the case that only one kind of fluid to be processed is used, the foregoing y (length) is regulated by the distance (Id) from the center of the rotation to the inside introduction part and the distance (Od) from the center of the rotation to the outer circumference edge, while the foregoing x (width) is regulated by the foregoing y (length) and the ratio of the circumference of a circle to its diameter.

And the area of the processing region is changed by increasing or decreasing the ratio (Od/Cd) of the distance (Od) from the center of the rotation to the outer circumference edge of the processing region to the distance (Cd) from the center of the rotation to the intermediate introduction part, or by increasing or decreasing the ratio (Od/Id) of the distance (Od) from the center of the rotation to the outer circumference edge of the processing region to the distance (Id) from the center of the rotation to the inside introduction part (meanwhile, hereunder, when explanation is made by meaning both the ratio (Od/Cd) and the ratio (Od/Id) collectively, the diameter ratios (Od/Cd·Id) are used).

By changing these diameter ratios (Od/Cd·Id), the crystallinity control in which crystallinity of the obtained microparticles is increased or decreased and the d/D control in which the ratio (d/D) of the crystallite diameter (d) to the particle diameter (D) of the microparticles is increased or decreased are carried out.

By changing the diameter ratios (Od/Cd·Id) in this way, a moving distance of the fluid to be processed to the discharge part in the outer circumference edge of the processing region is changed, and also a moving time to reach the discharge part is changed. Moreover, by increasing or decreasing the diameter ratios (Od/Cd·Id), not only the time and distance but also the location from the center of the rotation in the mixing region and processing region and the area (volume) thereof are changed. Especially, in the present invention, because the fluid to be processed is moved in the way that inside the radius direction is made as an upstream and outside thereof is made as a downstream, the processing region is enlarged by the square of the distance as it is moving toward the downstream, and also an energy from the processing surfaces increases with it. It is thought that under the condition of these changes, conditions of mixing and dispersion of the fluids to be processed are changed, as well as the reaction time which takes place by mixing of the fluids to be processed followed by the reaction, separation, and crystallization or crystallite growth in succession is changed during flowing from the introduction part to the discharge part, and therefore the crystallinity and the growing state of the particle diameter and crystallite diameter are changed.

According to the finding of the inventors of the present invention, the crystallinity control can be done in such a way that the crystallinity of the microparticles may increase by increasing the diameter ratios (Od/Cd·Id) and decrease by decreasing the diameter ratios (Od/Cd·Id). The d/D control can be done in such a way that by increasing the diameter ratios (Od/Cd·Id), the crystallite diameter (d) as well as the ratio (d/D) of the crystallite diameter (d) to the particle diameter (D) of the microparticles may increase, and that by decreasing the diameter ratios (Od/Cd·Id), the crystallite diameter (d) as well as the ratio (d/D) of the crystallite diameter (d) to the particle diameter (D) of the microparticles may decrease.

At this time, the change of the ratio (Od/Cd) is not particularly limited; however, the ratio is controlled preferably in such a way that the value thereof may be 1.1 or more, while more preferably within the range of 1.25 to 5.0. It was confirmed in this way that the crystallinity of the obtained microparticles is changed eminently, and that the ratio (d/D) of the crystallite diameter (d) to the particle diameter (D) of the microparticles is changed eminently.

Here, the intermediate introduction part is located in the downstream of the inside introduction part, and the thin film fluid in the downstream of the intermediate introduction part is constituted by the fluid to be processed which is formed by mixing the raw material fluid and the separating fluid.

More specifically, the fluid to be processed which is introduced from the inside introduction part into between the processing surfaces flows to the downstream as a spirally running thin film fluid with spreading while receiving the effects of rotation of the processing surfaces and of the shape of the processing surfaces (such as for example, a groove-like depression which functions as a micropump in the processing surfaces, and is formed as necessary). The intermediate introduction part may be one; but two or more of them may be arranged as well. The intermediate introduction part may be formed as a dot-like or circular hole or as a ring-like hole continuing in the peripheral direction, the holes being open to the processing surfaces. When these intermediate introduction parts are formed as plural holes, they may be formed not only in the same distance from the center of the rotation in the radius direction, but also as plural kinds of holes in different distances.

Especially in the case that three or more fluids to be processed are mixed, as the alternative way, different kinds of fluids to be processed may be introduced into respective plural holes having the different distances as the intermediate introduction parts.

The fluid to be processed which is introduced from the inside introduction part in the way as mentioned above flows with spreading while being mixed with the fluid to be processed which is introduced from the intermediate introduction part, and then discharged from the discharge part in the downstream end. Inventors of the present invention presume from the results of their research performed until now that after the mixing, the fluids to be processed react to separate the microparticles in the thin film fluid, whereby crystallization or growth of the crystallites of the separated microparticles takes place.

Alternatively, the present invention may be carried out by using one kind of fluid to be processed as the fluid to be processed. This fluid to be processed contains at least one kind of substance becoming a raw material of a substance to be separated; and this method comprises a step of separating microparticles of the substance to be separated by applying an energy to the fluid to be processed from the at least two processing surfaces in the processing region. Accordingly, the present invention may be carried out not only by using two or more fluids to be processed but also by using only one kind of fluid to be processed as the fluid to be processed. In addition to the kinetic energy by rotation of the processing surfaces, illustrative example of the energy applied to the fluid to be processed includes a thermal energy given from the processing surfaces to the fluid to be processed (namely, heating or cooling) and energies of an ultraviolet beam and a supersonic wave and the like.

In the case that two or more kinds of fluids to be processed are not mixed between the processing surfaces, the intermediate introduction part is not necessary; and usually, one kind of fluid to be process is introduced from the inside introduction part in the upstream end and discharged from the downstream end. Accordingly, the entire region from the upstream end to the downstream end is the processing region; and thus, there is no distinction between the mixing region and the unmixed region.

In this case, the change of the ratio (Od/Id) is not limited; however, the ratio is controlled preferably in such a way that the value thereof may be 1.1 or more, while more preferably in the range of 1.67 to 8.33. It was confirmed in this way that the crystallinity of the obtained microparticles is changed eminently, and that the ratio (d/D) of the crystallite diameter (d) to the particle diameter (D) of the microparticles is changed eminently.

In the present invention, it is thought that by changing the diameter ratios (Od/Cd·Id), the location of the processing region and the area (volume) thereof are changed, and as a result, conditions of mixing and dispersion of the fluids to be processed including the raw material fluid and the separating fluid are changed, and also the reaction time which takes place by mixing of the fluids to be processed followed by the reaction, separation, crystallization or crystallite's growth in succession is changed during running from the introduction part to the discharge part, and therefore, the growing state of the particle diameter and crystallite diameter are changed so that the crystallinity of the metal microparticles obtained by separation or the ratio (d/D) is changed. Accordingly, the present invention may be executed with various modified embodiments, provided that the similar controls can be made.

For example, not only by fixing constant the distance (Id) from the center of the rotation to the inside introduction part or the distance (Cd) from the center of the rotation to the intermediate introduction part while changing the distance (Od) to the outer circumference edge of the processing region, the diameter ratios (Od/Cd·Id) can be changed, but also by fixing constant the distance (Od) from the center of the rotation to the outer circumference edge of the processing region while changing the distance (Id) from the center of the rotation to the introduction part or the distance (Cd) from the center of the rotation to the intermediate introduction part, the diameter ratios (Od/Cd·Id) can be changed. In this case, too, because conditions of mixing and dispersion, as well as the reaction time of the fluid to be processed in the processing region, are changed due to the change of the area of the processing region, the ratio (d/D) of the microparticles can be controlled. In addition, both the distance (Cd) from the center of the rotation to the outer circumference edge of the processing region and the distance (Id) to the introduction part or the distance (Cd) to the intermediate introduction part from the center of the rotation can be changed as well.

In addition, it was confirmed that when carrying out the present invention, by changing the diameter ratios (Od/Cd·Id), at least any one of crystallinity and crystallite diameter can be changed without significantly changing the particle diameter. Accordingly, various kinds of microparticles having different crystallinity and crystallite diameter while having an intended particle diameter can be obtained. In other words, microparticles having various characteristics derived from crystallinity and crystallite diameter with various particle diameters can be obtained.

In the case that the two kinds of fluids to be process are used, the unmixed region may comprise a coercive introducing region which is located near to the center of the rotation and a thin film controlling region which is located apart from the center of the rotation. In this case, the coercive introducing region is formed in at least one processing surface in such away that a depression expressing a micropump effect may be extended from the upstream to the downstream; and the thin film controlling region is the region between the downstream end of the depression and the intermediate introduction part. And the at least one kind of fluid to be processed is coercively introduced into the coercive introducing region from the inside introduction part through the depression, and the fluid is adjusted to under state of spiral laminar flow between this coercive introducing region and the thin film controlling region, and then the fluid runs to the mixing region. The thin film controlling region is an important region to separate intended microparticles wherein the fluid to be processed which is introduced from the inside introduction part is mixed with the fluid to be processed which is introduced from the intermediate introduction part in an ideal state between the processing surfaces kept in a minute space. Especially in the coercive introducing region, there is a risk of generating pulsation or pressure variance by the micropump effect. This pulsation or pressure variance is not good from a viewpoint of carrying out the uniform fluid processing. Therefore, it is desirable to reduce the pulsation and pressure variance in the thin film controlling region, while more desirable to provide the thin film controlling region with an ample space in order to reduce the effects of the pulsation and pressure variance to a negligible level. On the other hand, as discussed above, the mixing region is the region in which mixing of the two kinds of fluids to be processed take place until separation. It is necessary that the both be set with a sufficient width in order to achieve the purpose thereof, and therefore, both the processing surfaces to constitute these regions need to be cautiously designed and precisely processed so that the processing surfaces may be flat with mirror-finish, or in some cases deliberately formed with a depression therein; and in addition, because they rotate relative to the other at a certain speed, the size thereof is restricted from various aspects. In the processing region between the at least two processing surfaces having this kind of restriction, it is extremely important to arrange the thin film controlling region and the mixing region in a good balance; and by changing the ratio of these widths, too, control of crystallinity of the microparticles (crystallinity control) and control of the ratio (d/D) of the crystallite diameter (d) of the microparticles to the particle diameter (D) of the microparticles can be made.

With regard to emulsification, dispersion, and pulverization processing, in the case that the two kinds of fluids to be processed are used, these processing may be carried out without pre-processing steps such as pre-emulsification, pre-dispersion, and pre-pulverization. In this way, in the precision processing (precision emulsification, precision dispersion, and precision pulverization), there is a merit that the particle size distribution after the processing is not influenced by the results after the pre-processing. In other words, the particle size distribution tends to be sharper as compared with the case that one fluid to be processed is used.

And by increasing or decreasing the ratio (Od/Cd), especially by controlling in such a way that the ratio (Od/Cd) may become larger, the particle diameter or the CV value may be made smaller.

In emulsification, dispersion, and pulverization, when the diameter ratios (Od/Cd·Id) are small, in some cases the operation readily becomes unstable, confirming such cases including formation of unintended very small particles due to cavitation etc. and formation of coarse particles due to a small processing area. If the rotation number was merely increased in order to pulverize these coarse particles, it led to the condition in which the cavitation was readily generated, therefore, control of the particle diameter so as to give a sharp particle size distribution was difficult. On the other hand, by increasing the diameter ratios (Od/Cd·Id), the operation becomes stable, and the controllabilities of the particle diameter and of the CV value are improved, therefore, the particle diameter can be made finer and the particle size distribution can be made sharper.

In the reaction process including organic reactions, too, in the case that the diameter ratios (Od/Cd·Id) are small and the reaction is insufficient, if the rotation number is merely increased, sometimes by-products are formed and the reaction efficiency is decreased due to cavitation; however, it was confirmed that by increasing the diameter ratios (Od/Cd·Id), the reaction yield is increased and purity of the reaction is increased.

Advantages

In the present invention, regardless of whether or not the introduction velocity of the fluid to be processed and the rotation speed of the processing surfaces are changed, the processing characteristics could be controlled by controlling the area, position, and ratio of each of the regions.

This is a graph showing change of the volume-average particle diameter in the results of Examples 68 to 75.

FIG. 31

This is a graph showing change of the CV value in the results of Examples 68 to 75.

FIG. 32

This is a graph showing change of the volume-average particle diameter in the results of Examples 76 to 83.

FIG. 33

This is a graph showing change of the CV value in the results of Examples 76 to 83.

FIG. 34

This is a graph showing change of the volume-average particle diameter in the results of Examples 84 to 91.

FIG. 35

This is a graph showing change of the CV value in the results of Examples 84 to 91.

FIG. 36

This is a graph showing change of the volume-average particle diameter in the results of Examples 92 to 99.

FIG. 37

This is a graph showing change of the CV value in the results of Examples 92 to 99.

FIG. 38

This is a graph showing change of the volume-average particle diameter in the results of Examples 100 to 107.

FIG. 39

This is a graph showing change of the CV value in the results of Examples 100 to 107.

FIG. 40

This is a graph showing change of the volume-average particle diameter in the results of Examples 108 to 115.

FIG. 41

This is a graph showing change of the CV value in the results of Examples 108 to 115.

FIG. 42

This is a graph showing change of the volume-average particle diameter in the results of Examples 116 to 123.

FIG. 43

This is a graph showing change of the CV value in the results of Examples 116 to 123.

FIG. 44

This is a graph showing change of the volume-average particle diameter in the results of Examples 124 to 131.

FIG. 45

This is a graph showing change of the CV value in the results of Examples 124 to 131.

FIG. 46

This is a graph showing change of the volume-average particle diameter in the results of Examples 132 to 137.

FIG. 47

This is a graph showing change of the CV value in the results of Examples 132 to 137.

BEST MODES FOR CARRYING OUT THE INVENTION

Hereunder, embodiments of the fluid processing apparatus will be explained by using the drawings.

Figure 1:
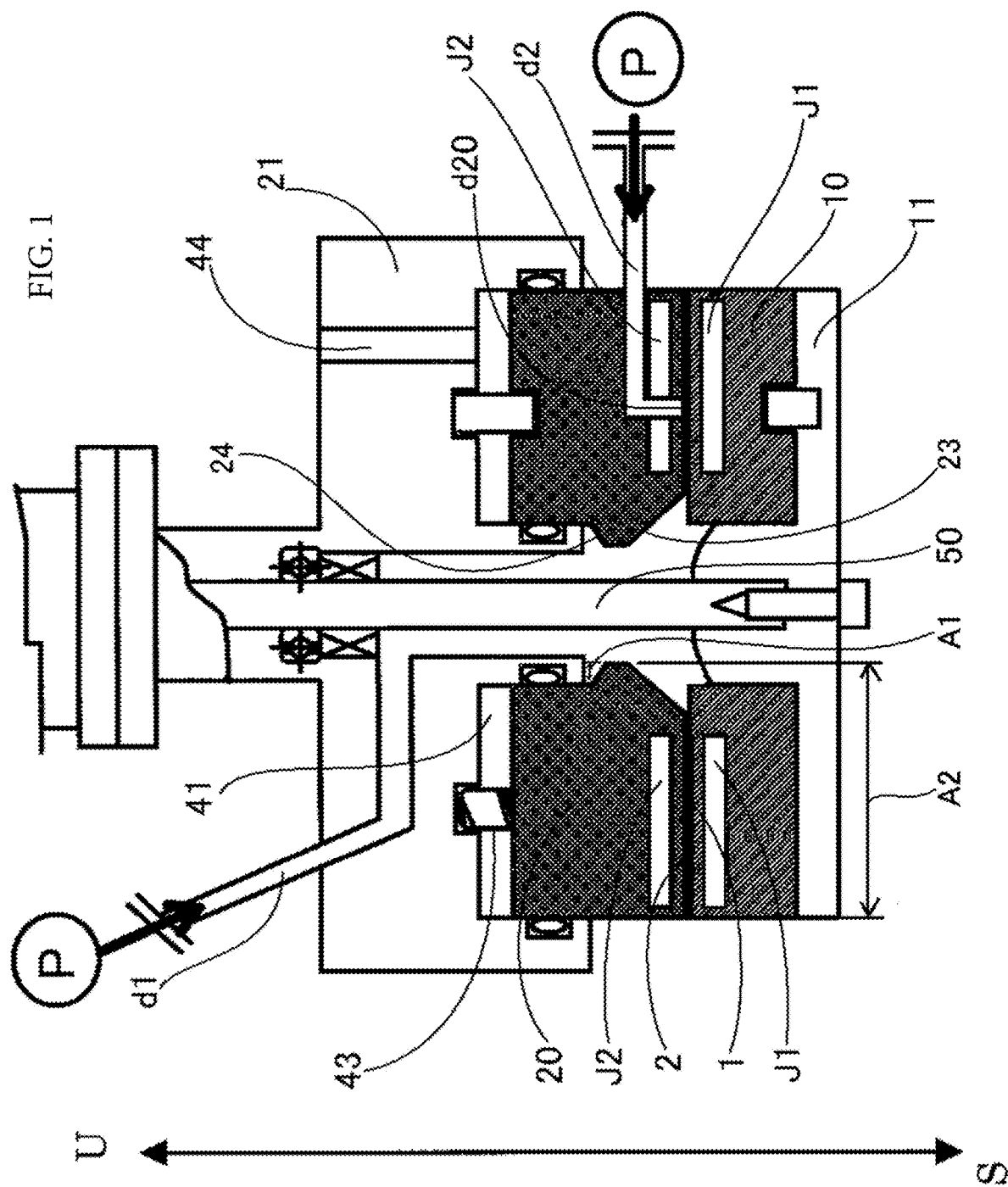
FIG. 1
This is a rough cross-section view of the fluid processing apparatus according to an embodiment of the present invention.
Figure 2:
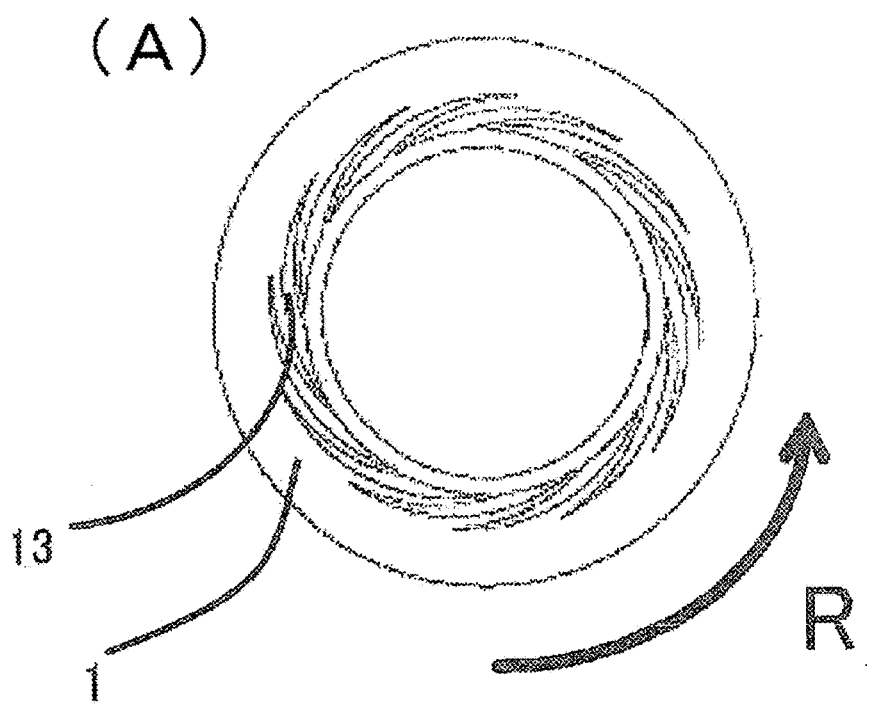
FIG. 2
(A) is a rough top view of the first processing surface of the fluid processing apparatus shown in FIG. 1; and (B) is an enlarged drawing of the essential part of the processing surface of the same apparatus.
Figure 2:
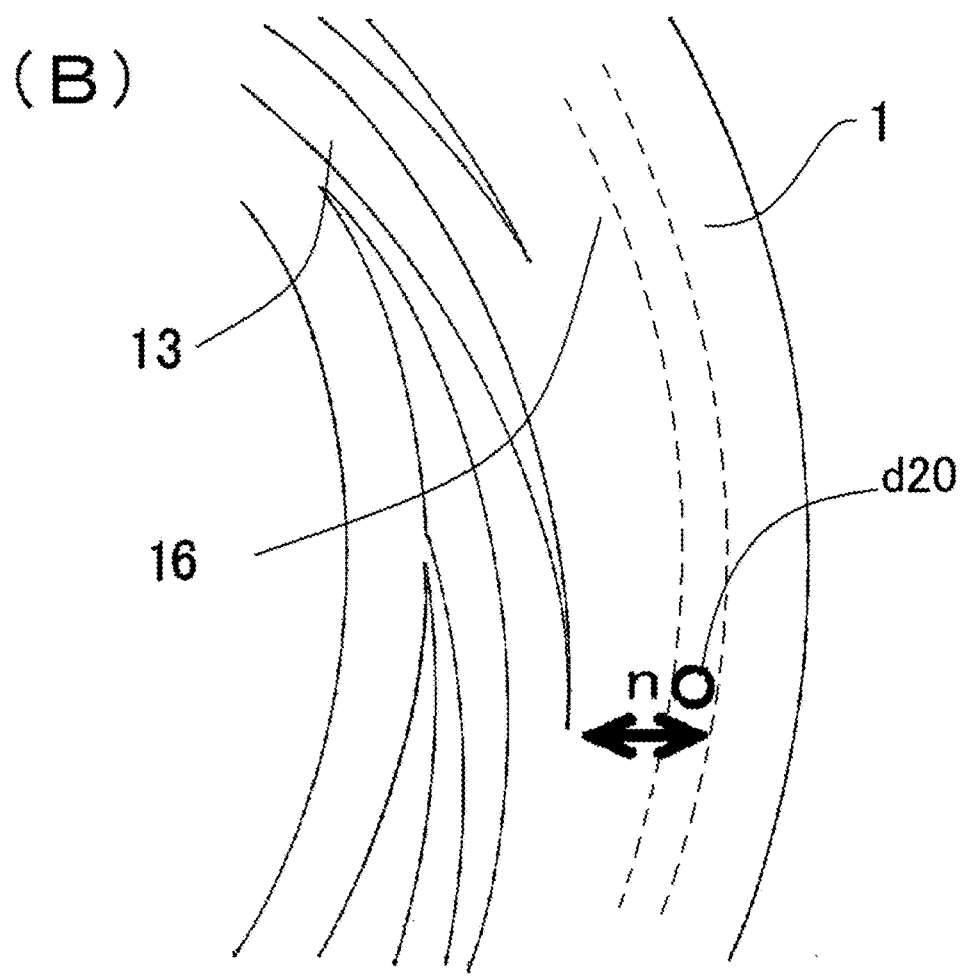
Figure 3:
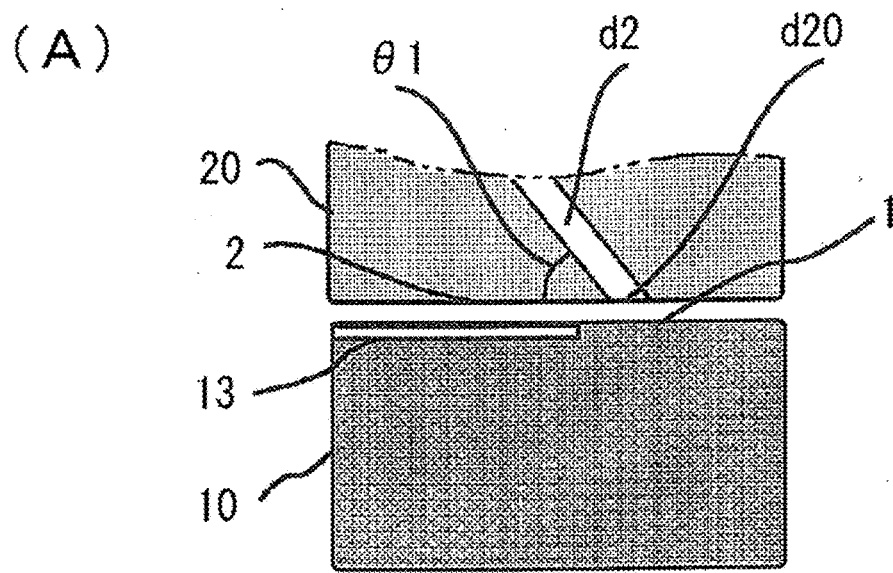
FIG. 3
(A) is a cross-section view of the half surface of between the processing surfaces; and (B) is an enlarged drawing of the essential part of the processing surface to explain the second introduction part.
Figure 3:
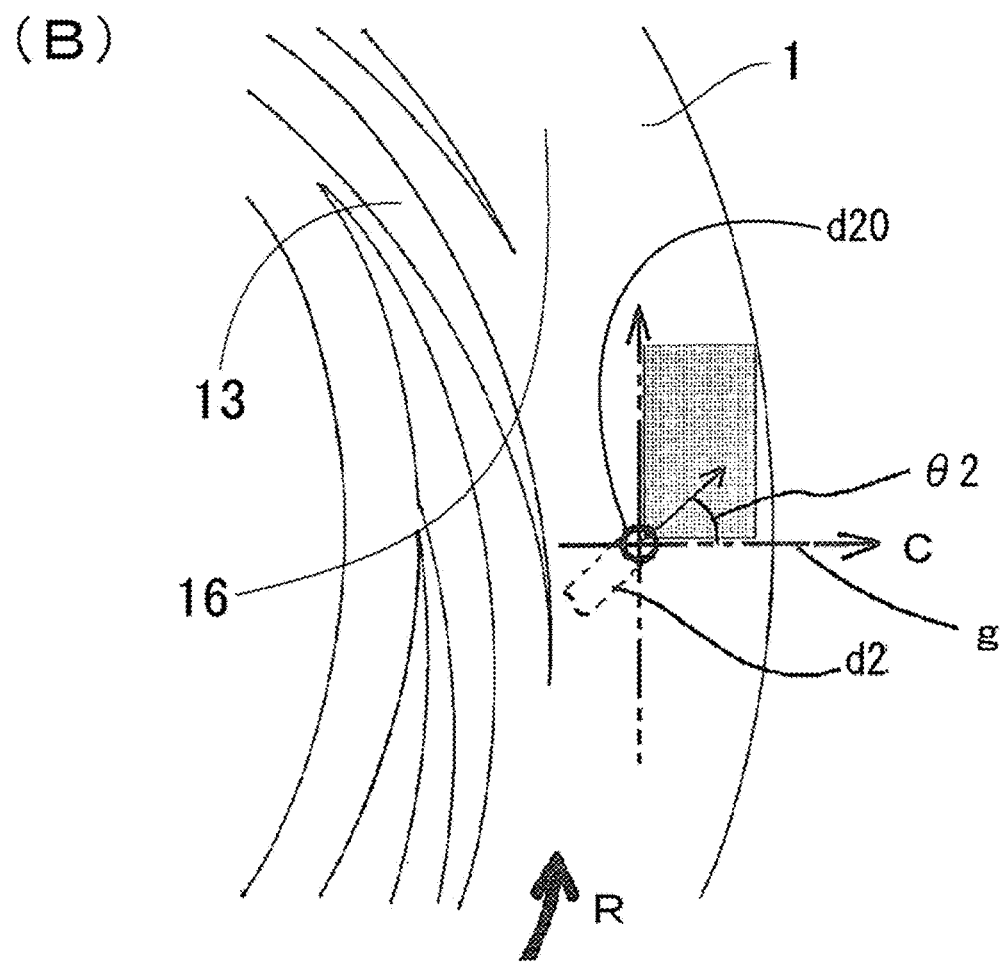

The fluid processing apparatus shown in FIG. 1 to FIG. 3 is the apparatus with which a substance to be processed is processed between processing surfaces in processing members arranged so as to be able to approach to and separate from each other, at least one of which rotates relative to the other; wherein, of the fluids to be processed, a first fluid to be processed, i.e., a first fluid, is introduced into between the processing surfaces, and a second fluid to be processed, i.e., a second fluid, is introduced into between the processing surfaces from a separate path that is independent of the flow path introducing the first fluid and has an opening leading to between the processing surfaces, whereby the first fluid and the second fluid are mixed and stirred between the processing surfaces. Meanwhile, in FIG. 1, a reference character U indicates an upside and a reference character S indicates a downside; however, up and down, front and back and right and left shown therein indicate merely a relative positional relationship and does not indicate an absolute position. In FIG. 2(A) and FIG. 3(B), reference character R indicates a rotational direction. In FIG. 3(C), reference character C indicates a direction of centrifugal force (a radius direction).

In this apparatus provided with processing surfaces arranged opposite to each other so as to be able to approach to and separate from each other, at least one of which rotates relative to the other, at least two kinds of fluids as fluids to be processed are used, wherein at least one fluid thereof contains at least one kind of substance to be processed, a thin film fluid is formed by converging the respective fluids between these processing surfaces, and the substance to be processed is processed in this thin film fluid. As mentioned above, not only this apparatus can process a plurality of the fluids to be processed, but also the single fluid to be processed.

This fluid processing apparatus is provided with two processing members of a first processing member 10 and a second processing member 20 arranged opposite to each other, wherein at least one of these processing members rotates. The surfaces arranged opposite to each other of the respective processing members 10 and 20 are made to be the respective processing surfaces. The first processing member 10 is provided with a first processing surface 1 and the second processing member 20 is provided with a second processing surface 2.

The processing surfaces 1 and 2 are connected to a flow path of the fluid to be processed and constitute part of the flow path of the fluid to be processed. Distance between these processing surfaces 1 and 2 can be changed as appropriate; and thus, the distance thereof is controlled so as to form a minute space usually in the range of 1 mm or less, for example, 0.1 μm to 50 μm. With this, the fluid to be processed passing through between the processing surfaces 1 and 2 becomes a forced thin film fluid forced by the processing surfaces 1 and 2.

With this apparatus, when a plurality of fluids to be processed are processed, the apparatus is connected to a flow path of the first fluid to be processed whereby forming part of the flow path of the first fluid to be processed; and part of the flow path of the second fluid to be processed other than the first fluid to be processed is formed. In this apparatus, the two paths converge into one, and two fluids to be processed are mixed between the processing surfaces 1 and 2 so that the fluids may be processed by reaction and so on. It is noted here that the term "process(ing)" includes not only the embodiment wherein a substance to be processed is reacted but also the embodiment wherein a substance to be processed is only mixed or dispersed without accompanying reaction.

To specifically explain, this apparatus is provided with a first holder 11 for holding the first processing member 10, a second holder 21 for holding the second processing member 20, a surface-approaching pressure imparting mechanism, a rotation drive mechanism, an inside introduction part d1, an intermediate introduction part d2, and a fluid pressure imparting mechanism p.

As shown in FIG. 2(A), in this embodiment, the first processing member 10 is a circular body, specifically a disk with a ring form. Similarly, the second processing member 20 is a circular disk. Material of the processing members 10 and 20 is not only metal but also carbon, ceramics, sintered metal, abrasion-resistant steel, sapphire, and other metal subjected to hardening treatment, and rigid material subjected to lining, coating, or plating. In the processing members 10 and 20 of this embodiment, at least part of the first and the second surfaces 1 and 2 arranged opposite to each other is mirror-polished.

Roughness of this mirror polished surface is not particularly limited; but surface roughness Ra is preferably 0.01 μm to 1.0 μm, or more preferably 0.03 μm to 0.3 μm.

At least one of the holders can rotate relative to the other holder by a rotation drive mechanism such as an electric motor (not shown in drawings). A reference numeral 50 in FIG. 1 indicates a rotary shaft of the rotation drive mechanism; in this embodiment, the first holder 11 attached to this rotary shaft 50 rotates, and thereby the first processing member 10 attached to this first holder 11 rotates relative to the second processing member 20. As a matter of course, the second processing member 20 may be made to rotate, or the both may be made to rotate. Further in this embodiment, the first and second holders 11 and 21 may be fixed, while the first and second processing members 10 and 20 may be made to rotate relative to the first and second holders 11 and 21.

At least any one of the first processing member 10 and the second processing member 20 is able to approach to and separate from at least any other member, thereby the processing surfaces 1 and 2 are able to approach to and separate from each other.

In this embodiment, the second processing member 20 approaches to and separates from the first processing member 10, wherein the second processing member 20 is accepted in an accepting part 41 arranged in the second holder 21 so as to be able to rise and set. However, as opposed to the above, the first processing member 10 may approach to and separate from the second processing member 20, or both the processing members 10 and 20 may approach to and separate from each other.

This accepting part 41 is a concave portion for mainly accepting that side of the second processing member 20 opposite to the second processing surface 2, and this concave portion is a groove being formed into a circle, i.e., a ring when viewed in a plane. This accepting part 41 accepts the second processing member 20 with sufficient clearance so that the second processing member 20 may rotate. Meanwhile, the second processing member 20 may be arranged so as to be movable only parallel to the axial direction; alternatively, the second processing member 20 may be made movable, by making this clearance larger, relative to the accepting part 41 so as to make the center line of the processing member 20 inclined, namely unparallel, to the axial direction of the accepting part 41, or movable so as to depart the center line of the processing member 20 and the center line of the accepting part 41 toward the radius direction.

It is preferable that the second processing member 20 be accepted by a floating mechanism so as to be movable in the three dimensional direction, as described above.

The fluids to be processed are introduced into between the processing surfaces 1 and 2 from the inside introduction part d1 and the intermediate introduction part d2, the flow paths through which the fluids flow, under the state that pressure is applied thereto by a fluid pressure imparting mechanism p consisting of various pumps, potential energy, and so on.

In this embodiment, the inside introduction part d1 is a path arranged in the center of the circular, second holder 21, and one end thereof is introduced into between the processing surfaces 1 and 2 from inside the circular, processing members 10 and 20. Through the intermediate introduction part d2, the first fluid to be processed and the second fluid to be processed for mixing are introduced into between the processing surfaces 1 and 2. In this embodiment, the intermediate introduction part d2 is a path arranged inside the second processing member 20, and one end thereof is open at the second processing surface 2. The first fluid to be processed which is pressurized with the fluid pressure imparting mechanism p is introduced from the inside introduction part d1 to the space inside the processing members 10 and 20 so as to pass through between the first and processing surfaces 1 and 2 to outside the processing members 10 and 20. From the intermediate introduction part d2, the second fluid to be processed which is pressurized with the fluid pressure imparting mechanism p is provided into between the processing surfaces 1 and 2, whereat this fluid is converged with the first fluid to be processed, and there, various fluid processing such as mixing, stirring, emulsification, dispersion, reaction, deposition, crystallization, and separation are effected, and then the fluid thus processed is discharged from the processing surfaces 1 and 2 to outside the processing members 10 and 20. Meanwhile, an environment outside the processing members 10 and 20 may be made negative pressure by a vacuum pump.

The surface-approaching pressure imparting mechanism mentioned above supplies the processing members with force exerting in the direction of approaching the first processing surface 1 and the second processing surface 2 each other. In this embodiment, the surface-approaching pressure imparting mechanism is arranged in the second holder 21 and biases the second processing member 20 toward the first processing member 10.

The surface-approaching pressure imparting mechanism is a mechanism to generate force (hereinafter, surface-approaching pressure) to press the first processing surface 1 of the first processing member 10 and the second processing surface 2 of the second processing member 20 in the direction to make them approach to each other. The mechanism generates a thin film fluid having minute thickness in a level of nanometer or micrometer by the balance between the surface-approaching pressure and the force to separate the processing surfaces 1 and 2 from each other, i.e., the force such as the fluid pressure. In other words, the distance between the processing surfaces 1 and 2 is kept in a predetermined minute distance by the balance between these forces.

In the embodiment shown in FIG. 1, the surface-approaching pressure imparting mechanism is arranged between the accepting part 41 and the second processing member 20. Specifically, the surface-approaching pressure imparting mechanism is composed of a spring 43 to bias the second processing member 20 toward the first processing member 10 and a biasing-fluid introduction part 44 to introduce a biasing fluid such as air and oil, wherein the surface-approaching pressure is provided by the spring 43 and the fluid pressure of the biasing fluid. The surface-approaching pressure may be provided by any one of this spring 43 and the fluid pressure of this biasing fluid; and other forces such as magnetic force and gravitation may also be used. The second processing member 20 recedes from the first processing member 10 thereby making a minute space between the processing surfaces by separating force, caused by viscosity and the pressure of the fluid to be processed applied by the fluid pressure imparting mechanism p, against the bias of this surface-approaching pressure imparting mechanism. By this balance between the surface-approaching pressure and the separating force as mentioned above, the first processing surface 1 and the second processing surface 2 can be set with the precision of a micrometer level; and thus the minute space between the processing surfaces 1 and 2 may be set. The separating force mentioned above includes fluid pressure and viscosity of the fluid to be processed, centrifugal force by rotation of the processing members, negative pressure when negative pressure is applied to the biasing-fluid introduction part 44, and spring force when the spring 43 works as a pulling spring. The separating force includes not only the force generated by introducing the fluid to be processed from the inside introduction part d1 into between the processing surfaces 1 and 2, but also the force generated by introducing the fluid to be processed from the intermediate introduction part d2 therein. This surface-approaching pressure imparting mechanism may be arranged also in the first processing member 10, in place of the second processing member 20, or in both the processing members.

To specifically explain the separating force, the second processing member 20 has the second processing surface 2 and a separation controlling surface 23 which is positioned inside the processing surface 2 (namely at the entering side of the fluid to be processed into between the first and second processing surfaces 1 and 2) and next to the second processing surface 2. In this embodiment, the separation controlling surface 23 is an inclined plane, but may be a horizontal plane. The pressure of the fluid to be processed acts to the separation controlling surface 23 to generate force directing to separate the second processing member 20 from the first processing member 10. Therefore, the second processing surface 2 and the separation controlling surface 23 constitute a pressure receiving surface to generate the separating force.

In the example shown in FIG. 1, an approach controlling surface 24 is formed in the second processing member 20. This approach controlling surface 24 is a plane opposite, in the axial direction, to the separation controlling surface 23 (upper plane in FIG. 1) and, by action of pressure applied to the fluid to be processed, generates force of approaching the second processing member 20 toward the first processing member 10.

Meanwhile, the pressure of the fluid to be processed exerted on the second processing surface 2 and the separation controlling surface 23, i.e., the fluid pressure, is understood as force constituting an opening force in a mechanical seal. The ratio (area ratio A1/A2) of a projected area A1 of the approach controlling surface 24 projected on a virtual plane perpendicular to the direction of approaching and separating the processing surfaces 1 and 2, that is, in the direction of rising and setting of the second processing member 20 (axial direction in FIG. 1), to a total area A2 of the projected area of the second processing surface 2 of the second processing member 20 and the separation controlling surface 23 projected on the virtual plane is called as balance ratio K, which is important for control of the opening force. This opening force can be controlled by the pressure of the fluid to be processed, i.e., the fluid pressure, by changing the balance line, i.e., by changing the area A1 of the approach controlling surface 24.

Sliding surface actual surface pressure P, i.e., the fluid pressure out of the surface-approaching pressures, is calculated according to the following equation:

$$P=P1\times(K-k)+Ps$$

Here, P1 represents the pressure of a fluid to be processed, i.e., the fluid pressure, K represents the balance ratio, k represents an opening force coefficient, and Ps represents a spring and back pressure.

By controlling this balance line to control the sliding surface actual surface pressure P, the space between the processing surfaces 1 and 2 is formed as a desired minute space, thereby forming a fluid film of the fluid to be processed so as to make the processed substance such as a product fine and to effect uniform processing by reaction.

Meanwhile, the approach controlling surface 24 may have a larger area than the separation controlling surface 23, though this is not shown in the drawing.

The fluid to be processed becomes a forced thin film fluid by the processing surfaces 1 and 2 that keep the minute space therebetween, whereby the fluid is forced to move out from the circular, processing surfaces 1 and 2. However, the first processing member 10 is rotating; and thus, the mixed fluid to be processed does not move linearly from inside the circular, processing surfaces 1 and 2 to outside thereof, but does move spirally from the inside to the outside thereof by a resultant vector acting on the fluid to be processed, the vector being composed of a moving vector toward the radius direction of the circle and a moving vector toward the circumferential direction.

Meanwhile, a rotary shaft 50 is not only limited to be placed vertically, but may also be placed horizontally, or at a slant. This is because the fluid to be processed is processed in a minute space between the processing surfaces 1 and 2 so that the influence of gravity can be substantially eliminated. In addition, this surface-approaching pressure imparting mechanism can function as a buffer mechanism of micro-vibration and rotation alignment by concurrent use of the foregoing floating mechanism with which the second processing member 20 may be held displaceably.

In the movement of fluid, the dimensionless number which expresses the ratio of inertia force to viscosity force is called as Reynolds number, which is expressed by the following equation.

$$\text{Reynolds number } Re=\text{inertia force/viscosity force}=\rho VL/\mu=VL/\nu$$

Here, $\nu=\mu/\rho$ shows dynamic viscosity, V shows representative velocity, L shows representative length, $\rho$ shows density, and $\mu$ shows viscosity.

At the borderline of the critical Reynolds number; namely below the critical Reynolds number is the laminar flow, while above the critical Reynolds number is the turbulent flow.

Because the space between the processing surfaces 1 and 2 of the fluid processing apparatus is controlled so narrow that holding amount of the fluid that kept between the processing surfaces 1 and 2 is extremely small. Therefore, the representative length L is very short, so that the centrifugal force of the forced thin film fluid which passes through between the processing surfaces 1 and 2 is so small that the effect of the viscosity force in the forced thin film fluid becomes large.

The centrifugal force, one of the inertia forces in rotation movement, is a force acting from a center to an outside. The centrifugal force can be expressed by the following equation.

$$\text{Centrifugal force } F=ma=mv^2/R$$

Here, "a" shows acceleration, "m" shows mass, "v" shows velocity, and R shows radius.

As mentioned above, holding amount of the fluid kept between the processing surfaces 1 and 2 is so small so that the ratio of the velocity relative to the fluid mass becomes very large, so that the said mass can be neglected. Accordingly, the effect of gravity can be neglected in the forced thin film fluid. Because of this, a composite metal compound or a metal which contains different elements having different specific gravities can be prepared, even though these are intrinsically difficult to be obtained as the microparticle.

In the first and second processing members 10 and 20, the temperature thereof may be controlled by cooling or heating at least any one of them; in FIG. 1, an embodiment having temperature regulating mechanisms J1 and J2 in the first and second processing members 10 and 20 is shown. Alternatively, the temperature may be regulated by cooling or heating the introducing fluid to be processed. These temperatures may be used to separate the processed substance or may be set so as to generate Benard convection or Marangoni convection in the fluid to be processed between the first and second processing surfaces 1 and 2.

As shown in FIG. 2, in the first processing surface 1 of the first processing member 10, a groove-like depression 13 extended toward an outer side from the central part of the first processing member 10, namely in a radius direction, may be formed. The depression 13 may be, as a plane view, curved or spirally extended on the first processing surface 1 as shown in FIG. 2(B), or, though not shown in the drawing, may be extended straight radially, or bent at a right angle, or jogged; and the concave portion may be continuous, intermittent, or branched. In addition, this depression 13 may be formed also on the second processing surface 2, or on both the first and second processing surfaces 1 and 2. By forming the depression 13 as mentioned above, the micro-pump effect can be obtained so that the fluid to be processed may be sucked into between the first and second processing surfaces 1 and 2.

By the micropump effect generated by the depression 13, the dynamic pressure due to the fluid to be processed is generated. This dynamic pressure has an effect to separate between the processing surfaces 1 and 2 in the direction to widen them; and thus, this dynamic pressure also acts as one of the above-mentioned separating force.

In the embodiment formed with the depression 13, the processing surfaces 1 and 2 rotate relative to the other, thereby causing the merit to actively aspirate the fluid to be processed into between the processing surfaces 1 and 2. On the other hand, because the portion having the depression 13 with the groove-like shape and the portion not having it (the portion which becomes a projecting portion relative to the depression 13) are arranged in the circumferential direction, there is a risk that the fluid to be processed in the processing surfaces 1 and 2 has the pressure variance by rotation of the processing surfaces 1 and 2 relative to the other.

Accordingly, in the embodiment not formed with the depression 13, the micropump effect cannot be expected, but there is a merit that it is not necessary to take into consideration the pressure variance due to this effect. To make the depression 13 as the micropump requires a very precise work thereby increasing the production cost thereof; however, because the work of making this is not necessary, a low cost apparatus can be provided. In addition, almost all of the processing surfaces 1 and 2 can be used substantially for fluid processing, thereby leading to resource saving.

Especially, in the case that the intermediate introduction part d2 is formed and through it the fluid to be processed is introduced, the force applied from the fluid to be processed to the processing surfaces 1 and 2 can be used as the separating force; and thus, execution of the embodiment without the depression 13 becomes easier. However, even in the case that the intermediate introduction part d2 is not formed, the embodiment without the depression 13 can be executed.

It is preferable that the base edge of this depression 13 reach the inner periphery of the first processing member 10. The front edge of the depression 13 is extended to the direction of the outer periphery of the first processing surface 1; the depth thereof (cross section area) is made gradually shallower (smaller) from the base edge to the front edge.

Between the front edge of the depression 13 and the outer peripheral of the first processing surface 1 is formed the flat plane 16 not having the depression 13.

When an opening d20 of the intermediate introduction part d2 is arranged in the second processing surface 2, the arrangement is done preferably at a position opposite to the flat surface 16 of the first processing surface 1 arranged at a position opposite thereto.

This opening d20 is arranged preferably in the downstream (outside in this case) of the depression 13 of the first processing surface 1. The opening is arranged especially preferably at a position opposite to the flat surface 16 located nearer to the outer diameter than a position where the direction of flow upon introduction by the micro-pump effect is changed to the direction of a spiral and laminar flow formed between the processing surfaces. Specifically, in FIG. 2(B), a distance n from the outermost side of the depression 13 arranged in the first processing surface 1 in the radius direction is preferably about 0.5 mm or more. Especially in the case of separating microparticles from a fluid, it is preferable that mixing of a plurality of fluids to be processed and separation of the microparticles therefrom be effected under the condition of a laminar flow. Shape of the opening d20 may be circular as shown in FIG. 2(B) and FIG. 3(B), or a concentric circular ring shape which encircles the central opening of the processing surface 2 having a form of a ring-like disk, though this is not shown by a drawing. In the case that the opening is made in the circular ring shape, the opening having the circular ring shape may be any of continuous and discontinuous.

This intermediate introduction part d2 may have directionality. For example, as shown in FIG. 3(A), the direction of introduction from the opening d20 of the second processing surface 2 is inclined at a predetermined elevation angle ($\theta 1$) relative to the second processing surface 2. The elevation angle ($\theta 1$) is set at more than 0° and less than 90°, and when the reaction speed is high, the angle ($\theta 1$) is preferably set in the range of 1° to 45°.

In addition, as shown in FIG. 3(B), introduction from the opening d20 of the second processing surface 2 has directionality in a plane along the second processing surface 2. The direction of introduction of this second fluid is in the outward direction departing from the center in a radial component of the processing surface and in the forward direction in a rotation component of the fluid between the rotating processing surfaces. In other words, a predetermined angle ($\theta 2$) exists facing the rotation direction R from a reference line g, which is the line to the outward direction and in the radius direction passing through the opening d20. This angle ($\theta 2$) is also set preferably at more than 0° and less than 90°.

This angle ($\theta 2$) can vary depending on various conditions such as the type of fluid, the reaction speed, viscosity, and the rotation speed of the processing surface. In addition, it is also possible not to give the directionality to the intermediate introduction part d2 at all.

In the embodiment shown in FIG. 1, kinds of the fluid to be processed and numbers of the flow path thereof are set two respectively; but they may be one, or three or more. In the embodiment shown in FIG. 1, the intermediate fluid is introduced into between the processing surfaces 1 and 2 from the introduction part d2; but this introduction part may be arranged in the first processing member 10 or in both. Alternatively, a plurality of introduction parts may be arranged relative to one fluid to be processed. The opening for introduction arranged in each processing member is not particularly restricted in its form, size, and number; and these may be changed as appropriate.

Meanwhile, because it is good enough only if the processing could be effected between the processing surfaces 1 and 2, as opposed to the foregoing method, a method wherein the second fluid is introduced from the inside introduction part d1 and a solution containing the first fluid is introduced from the intermediate introduction part d2 may also be used. That is, the expression "first" or "second" for each fluid has a meaning for merely discriminating an $n^{th}$ fluid among a plurality of the fluids present; and therefore, a third or more fluids can also exist. In this case, it is possible to form outside the intermediate introduction part d2 a third introduction part, a fourth introduction part, and even further higher introduction parts, but these should be understood also as the intermediate introduction parts. The embodiment having the introduction part which is higher than the third introduction part may be exemplified by the case that plural introduction parts having a ring-like shape are concentrically formed. Alternative example may be the embodiment wherein plural introduction parts having a dot-like shape or a linear shape are disposed in the form of a ring and there are plural groups comprising the introduction parts having a ring-like shape which are arranged in the form of a ring with different diameters.

In the above-mentioned apparatus, a processing such as separation/precipitation and crystallization is effected while the fluids are being mixed forcibly and uniformly between the processing surfaces 1 and 2 which are disposed in a position they are faced with each other so as to be able to approach to and separate from each other, at least one of which rotates relative to the other, as shown in FIG. 1. Particle diameter and monodispersity of the processed substance to be processed can be controlled by appropriately controlling rotation speed of the processing members 10 and 20, distance between the processing surfaces 1 and 2, concentration of raw materials in the fluids to be processed, kind of solvents in the fluids to be processed, and so forth.

Figure 4:
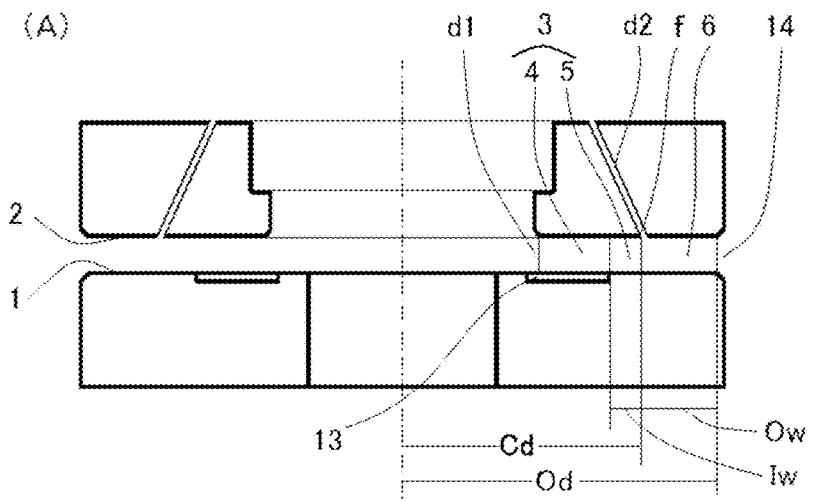
FIG. 4
(A) is a schematic drawing showing the processing region of the fluid processing apparatus shown in FIG. 1; (B) is a schematic drawing showing the mixing region of the same apparatus; and (C) is a schematic drawing showing the processing region of the fluid processing apparatus according to other embodiment.
Figure 4:
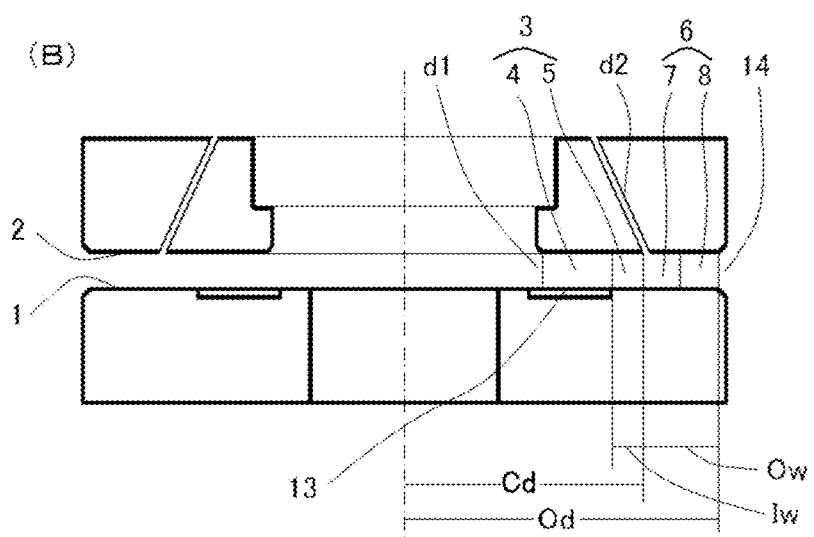
Figure 4:
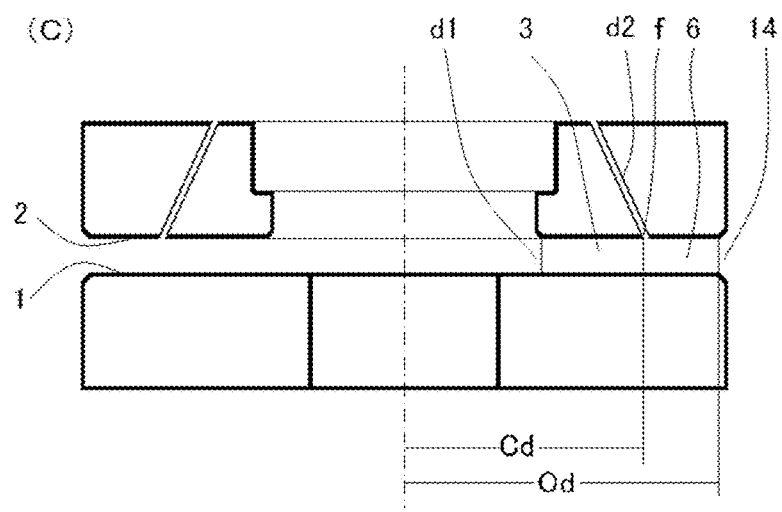
Figure 5:
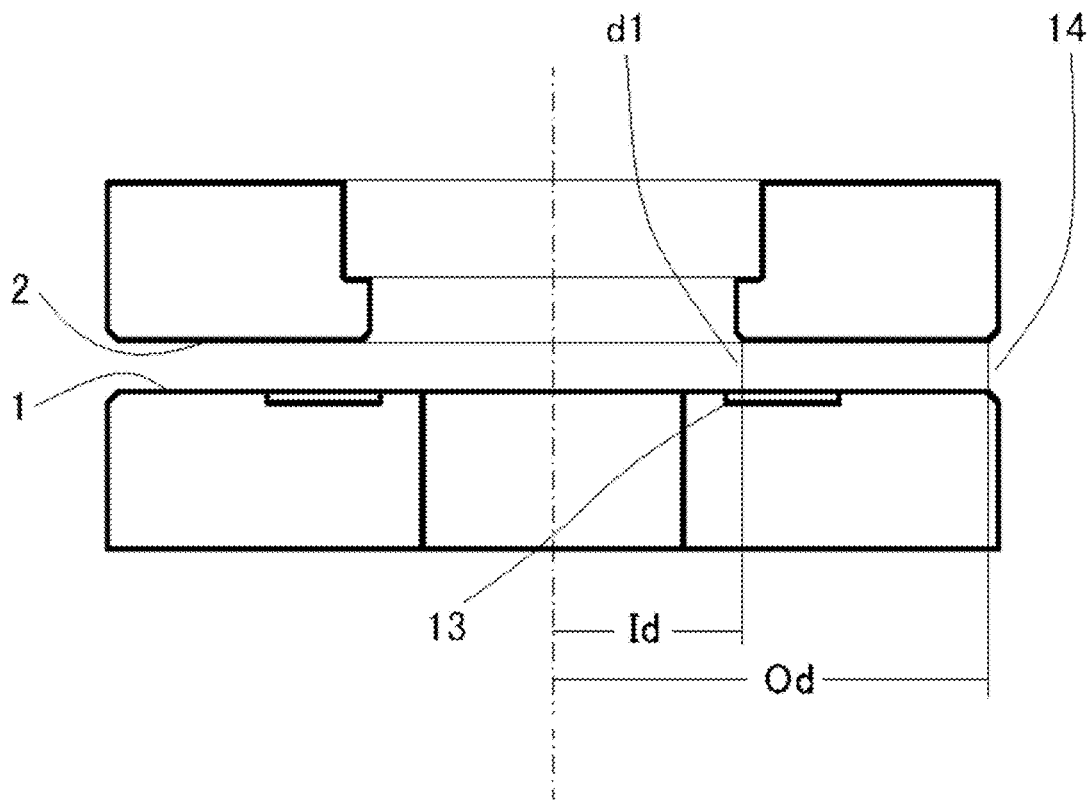
FIG. 5
(A) is a schematic drawing showing the processing region of the fluid processing apparatus according to other embodiment; and (B) is a schematic drawing of the processing region according to still other embodiment.
Figure 5:
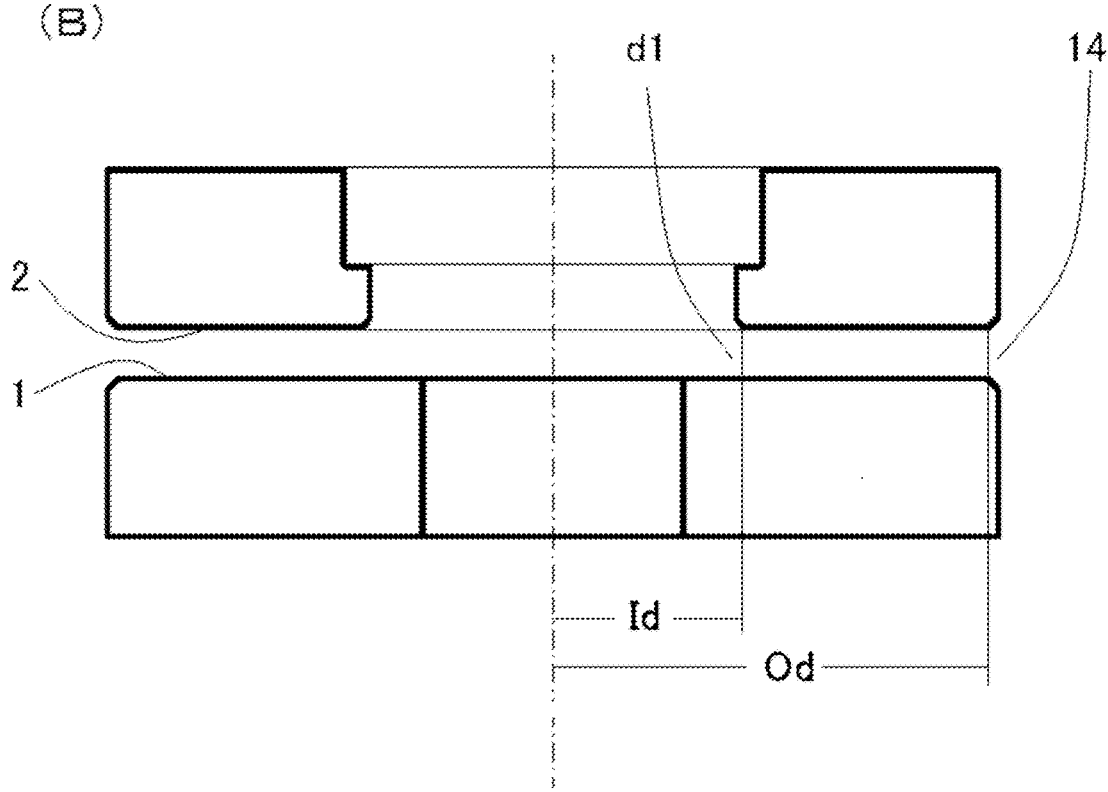

In the present invention, when the fluid to be processed is processed by using the fluid to be processed, the processing region between the processing surfaces 1 and 2 which rotate relative to the other is understood as following, explained by referring to FIG. 4 and FIG. 5. In FIG. 4 the embodiment is shown that is provided with the inside introduction part d1 and the intermediate introduction part d2 which is disposed in the circumferential side of the former; and this embodiment is suitable to process the fluid to be processed by using two or more kinds of fluids to be processed. In FIG. 5 the embodiment is shown that is not provided with the intermediate introduction part d2 but provided only with the inside introduction part d1; and this embodiment is suitable to process the fluid to be processed by using one kind of fluid to be processed.

Meanwhile, FIG. 4 and FIG. 5 are schematic drawings of the apparatuses of the embodiments of the present invention, not showing the size of each part accurately.

Firstly, by referring to FIG. 4(A), in the case that the fluid to be process is processed by using two or more kinds of fluids to be processed, explanation will be made as to the processing region between the processing surfaces 1 and 2 which rotate relative to the other. Illustrative example of the processing of the fluids to be processed includes, as mentioned before, separation processing of microparticles, reaction processing, and emulsification, mixing, and dispersion processing, wherein the fluids to be processed which are suitable for the processing thereof is used. For example, in the case of separation processing of microparticles, two kinds of fluids to be processed, i.e., a raw material fluid which contains at least one kind of substance becoming a raw material of a substance to be separated and a separating fluid for the second fluid to separate the substance to be separated, are used.

The processing region is understood as the region that it is roughly classified into the unmixed region 3 which is inside the radius direction of the rotation and the mixing region 6 which is outside thereof. The inner edge of the unmixed region 3 is regulated by the inside introduction part d1, and the boundary between the unmixed region 3 and the mixing region 6 is regulated by the intermediate introduction part d2. The outer edge of the mixing region 6 is the outer edge of the processing surfaces 1 and 2, and outside thereof the discharge part 14 is formed.

The inside introduction part d1 and the discharge part 14 are tapered, formed in the innermost and outermost peripherals of the processing surfaces 1 and 2, respectively. In some cases, the processing surfaces 1 and 2 are intentionally formed with the depression and the like; in general, however, they have flat, smooth and plane surfaces to each other, wherein the distance between these flat surfaces regulates the thin film fluid to an intended film thickness. On the other hand, because the inside introduction part d1 and the discharge part 14 are tapered, the distance thereof becomes gradually wider, and therefore, the fluid to be processed cannot maintain the intended film thickness of the thin film fluid. Therefore, the processing region of the processing surfaces 1 and 2 is the region except for the inside introduction part d1 and the discharge part 14, both of them being tapered. In other words, the unmixed region 3 is the inside ring-like region present from the inside introduction part d1 (not including the inside introduction part d1) to the intermediate introduction part d2 (not including the intermediate introduction part d2). And the mixing region 6 is the outside ring-like region present from the intermediate introduction part d2 (including the intermediate introduction part d2) to the discharge part 14 (not including the discharge part 14).

Accordingly, the distance (Od) from the center of the rotation to the outer circumference edge (hereunder, this is sometimes referred to as the discharge part radius (Od)) is the distance from the center of the rotation to before the discharge part 14.

And the distance (Cd) from the center of the rotation to the intermediate introduction part (hereunder, this distance is sometimes referred to as the confluence part radius (Cd)) is the distance from the center of the rotation to before the intermediate introduction part d2. The confluence part radius (Cd) is the distance from the center of the rotation of the processing surfaces 1 and 2 to the nearest point "f" to the center (hereunder this point is referred to as the nearest point "f"), and this can be applied to the case that as the intermediate introduction part there are plural introduction parts including the third or higher introduction parts as mentioned before; and among these intermediate introduction parts, the distance to the nearest point "f" of the intermediate introduction part whose diameter from the center of the rotation is the shortest is taken as the confluence part radius (Cd).

Further, the unmixed region 3 can be understood as the region that when the groove-like depression 13 is arranged, it is divided into the coercive introducing region 4 inside and the thin film controlling region 5 outside. In the coercive introducing region 4, the depression 13 which expresses the micropump effect is formed; and the first fluid is coercively introduced from the inside introduction part d1 into between the processing surfaces by the pressure thereof and the micropump effect due to the groove, whereby it becomes the thin film fluid. The thin film controlling region 5 is the region in which the introduced first fluid is changed to a spiral flow by receiving the effects including a centrifugal force due to rotation of the processing surfaces whereby running out to the outside direction under the laminar flow condition. In the coercive introducing region 4, there are risks of causing the pulsation and pressure variance by the micropump effect; and therefore, by making the thin film controlling region 5 not having the depression 13 large enough, the pulsation and pressure variance can be reduced in the thin film controlling region. It is the most desirable to reduce the effects of the pulsation and pressure variance to a negligible level. Specifically, as mentioned before, preferably the distance "n" to the radius direction from the outermost position of the depression 13 formed in the first processing surface 1 is about 0.5 mm or more.

It is thought that, in the outside this region, the first fluid becomes a stable spiral laminar flow of thin film fluid. To this stable thin film fluid, the second fluid is introduced from the inside introduction part d1. In this way, the thin film fluid is formed from the first fluid and the second fluid, and then, under the laminar condition both the fluids flow spirally toward outside direction in the mixing region 6 so as to flow out from the discharge part 14.

These first fluid and second fluids are mixed in the thin film fluid under the laminar flow condition, whereby various processing are performed in the mixed fluid to be processed.

For example, in the case of separation process of microparticles, these microparticles are separated in the thin film fluid formed by the mixed fluid to be processed.

It is thought that in the separation of microparticles and growth of the separated microparticles, a chemical energy of the substances constituting the first and second fluids, a mechanical energy of the flowing fluids, a rotation energy of the processing surfaces, and a temperature energy applied as needed to the processing surfaces are involved. In accordance with the given conditions as mentioned above, microparticles are separated and grown in the thin film fluid; and then, the intended microparticles are discharged from the discharge part 14. The microparticles under the growing process are generally in the state of coexistence of amorphous and crystalline in the microparticles; and in the crystalline part, single or plural crystals are generated, so that the particles grow with growing of these crystals.

In the case that the unmixed region 3 has the coercive introducing region 4 provided with the groove-like depression 13, in the way as mentioned above, the first fluid which forms the thin film fluid under the excellent laminar flow condition introduced from the inside introduction part d1 is mixed with the second fluid which is introduced from the intermediate introduction part d2; and therefore, the thin film controlling region 5 needs to have enough area as mentioned before. On the other hand, because the area of the processing surfaces 1 and 2 is regulated by mechanical restriction, if the area of the thin film controlling region 5 is made more than necessity thereof, the area of the mixing region 6 cannot be secured satisfactorily. Therefore, by changing the width ratio (Ow/Iw) of the width (Ow) of the mixing region in the radius direction of the rotation to the width (Iw) of the thin film controlling region 5 in the radius direction of the rotation while setting this ratio appropriately, the growing process of the particles and crystallites which are separated and grown in the thin film fluid until the intended microparticles are discharged from the discharge part 14 can be controlled.

According to new finding of inventors of the present invention, it became clear that growth of the crystals continues even after substantial termination of the particle growth (growth of the particle diameter). Accordingly, it became clear that the mixing region 6 can be classified into the inside early region 7 (upstream side) and the outside late region 8, as shown in FIG. 4(B). In the separated microparticles, in the early region 7, with separation and growth of the particles, the crystallites are formed, and progress of crystallization and growth of the crystallites in the microparticles take place; and in the late region 8, after growth of the particles is substantially completed, mainly progress of crystallization and growth of the crystallites in the microparticles take place. Accordingly, in the late region 8, the energies mentioned before are used mainly for progress of crystallization and growth of the crystallites. Meanwhile, in the apparatus used in the present invention, the energies as mentioned above (especially the rotation energy of the processing surfaces as expressed by the circumferential velocity) become larger along the direction to the outer radius. And the area of the mixing region 6 (the early region 7 and the late region 8) increases with the square of the distance. It is thought that in the late region 8, under these conditions, the energies are mainly consumed only for progress of crystallization and growth of the crystallites.

In the case that microparticles are separated by using two or more kinds of fluids to be processed, it became clear during the course of the research to complete the present invention that the region of the late region 8 satisfies the condition that the ratio (Od/Cd) of the discharge part radius (Od) to the confluence part radius (Cd) is 1.25 or more. And it became clear that the width rate (Ow/Iw) satisfies preferably the condition of 2.0 or more.

Specifically, in the existing production apparatus by the applicant of the present application, the ratio (Od/Cd) was less than 1.25 and the width ratio (Ow/Iw) was less than 2.0. In this existing apparatus, as shown in Examples described later, only progress of crystallization and growth of the crystallites take place slowly with growth of the particles. In other words, in the existing apparatus, the mixing region 6 is constituted only by the early region 7, or even if the late region 8 is present, the region thereof is only very small as compared with the early region 7; and therefore, inventors of the present invention did not recognize existence of the late region 8 but understood it only as the mixing region 6.

By carrying out at least any one control out of the crystallinity control in which by changing the ratio (Od/Cd) and the width ratio (Ow/Iw), crystallinity of the obtained microparticles is increased or decreased and the d/D control in which the ratio (d/D) of the crystallite diameter (d) to the particle diameter (D) of the microparticles is increased or decreased, the area of not only the early region 7 but also the late region 8 can be changed.

In view of the generation process of the microparticles and crystallites, it is preferable to carry out these controls by controlling the ratio (Od/Cd) within the range of 1.25 to 5.0 under the condition that the late region 8 is present. And in view of the generation and growing process of the microparticles and crystallites, it is preferable to carry out these controls by controlling the width ratio (Ow/Iw) within the range of 2.0 to 150.0 under the condition that the late region 8 is present.

On the other hand, by controlling the ratio (Od/Cd) within the range of 1.1 to 5.0, the control can be carried out from under the condition that the late region 8 is not present to under the condition that the late region 8 is present. And by controlling the width ratio (Ow/Iw) within the range of 2.0 to 150.0, the control can be carried out from under the condition that the late region 8 is not present to under the condition that the late region 8 is present. It can be said that the wide range of the control like this is desirable because change of the crystallinity and change of d/D can be realized more dynamically.

Meanwhile, it is not necessary to set the upper limits of the ratio (Od/Cd) and the width ratio (Ow/Iw). However, it was confirmed that in the present technology level of the rotation control, if the ratio (Od/Cd) becomes more than 5.0 and the width ratio (Ow/Iw) becomes more than 150.0, there are some cases that the crystallinity is decreased and the ratio d/D is decreased. These may be presumably caused also for the reason as follows: while it can be presumed that growth of the crystallites is completed, because the discharge part radius (Od), especially the difference between discharge part radius (Od) and the confluence part radius (Cd), becomes larger, or the difference between the width (Iw) of the thin film controlling region and the width (Ow) of the mixing region becomes larger, operation including the rotation movement of the processing surfaces which are disposed in a position they are faced with each other via the thin film fluid becomes stable, and as a result, the desirable processing conditions cannot be maintained. Therefore, there also may be the case that if the mechanical precision is further improved, the change of crystallinity as well as change of the d/D can be realized even if the ratio (Od/Cd) becomes more than 5.0 and the width ratio (Ow/Iw) becomes more than 150.0.

Meanwhile, as shown in FIG. 4(C), the present invention may be executed without forming the depression 13, in other words, without forming the coercive introducing region 4. In this case, too, the unmixed region 3 and the mixing region 6 are present similarly to the before-mentioned; and processing characteristics of the various processing to the fluid to be processed can be controlled by increasing or decreasing the ratio (Od/Id) of the discharge part radius (Od) to the distance (Id) from the center of the rotation to the inside introduction part (hereunder, this distance is sometimes referred to as the introduction part radius).

Meanwhile, as a result of not forming the coercive introducing region 4 having the depression 13 as mentioned before, the micropump effect cannot be expected; however, there is a merit that there is no necessity to take the pressure variance due to this into account.

In the above, explanation was made with focusing on the fluid processing which is accompanied with separation; however, in any of the cases shown by drawings of FIG. 4, the same controlling concept may also be applied to other fluid processing such as reaction, emulsification, dispersion, and pulverization. By increasing or decreasing the ratio (Od/Cd), the width ratio (Ow/Iw), or the ratio (Od/Id), purity and yield of the reaction are changed. Specifically, by increasing the ratio (Od/Cd), the width ratio (Ow/Iw), or the ratio (Od/Id), purity and yield of the reaction increase. And by increasing or decreasing the ratio (Od/Cd), the width ratio (Ow/Iw), or the ratio (Od/Id), the particle diameter control to control the particle diameter of the microparticles obtained by emulsification, dispersion, pulverization, or the like as well as the CV value control to control the particle size distribution of the obtained microparticles can be carried out. Specifically, by increasing or decreasing the ratio (Od/Cd), the width ratio (Ow/Iw), and the ratio (Od/Id), the particle diameter of the microparticles obtained by emulsification, dispersion, pulverization, or the like can be made smaller, and the CV value control to control the particle size distribution of the obtained microparticles can be improved.

Next, with referring to FIG. 5, explanation will be made as to the examples in which fluid processing is carried out by using only one kind of fluid to be processed which contains at least one kind of substance becoming a raw material of a substance to be separated. In the examples of FIG. 5, there is no intermediate introduction part d2 shown in FIG. 4. And even in the case of using the apparatus formed with the intermediate introduction part d2, the fluid to be processed is introduced only from the inside introduction part d1 into between the processing surfaces 1 and 2 without using the intermediate introduction part d2.

FIG. 5(A) is the example in which the groove-like depression 13 expressing the micropump effect is formed; and the FIG. 5(B) is the example in which the groove-like depression 13 is not formed.

In the cases of using the apparatuses shown in FIG. 5, by changing the ratio (Od/Id) of the distance (Od) from the center of the rotation to the circumference edge of the processing region to the distance (Id) from the center of the rotation to the inside introduction part, the radius ratio can be changed as well. In these cases, too, the upstream end of the processing region does not include the inside introduction part d1, and the downstream end of the processing region does not include the discharge part 14.

And by changing the ratio (Od/Id), various fluid processing can be controlled with regard to various fluids to be processed similar to the before-mentioned.

For example, in the fluid processing which is accompanied with separation, by applying an energy such as a thermal energy to the fluid to be processed which is introduced into between the processing surfaces 1 and 2 from the inside introduction part d1, microparticles of the substance to be separated can be separated. In this case, the intermediate introduction part d2 is not necessary, and therefore, the region beyond the inside introduction part d1 to before the discharge part 14 becomes the processing region. In this case, too, similarly to the case that two or more kinds of fluids to be processed are used, particles are separated and grown in the thin film fluid, and the intended microparticles are discharged from the discharge part 14. Accordingly, in the inside region corresponding to the early region 7, separation and growth of particles as well as generation of crystallites, progress of crystallization of microparticles, and growth of the crystallites take place; and in the outside region corresponding to the late region 8, after growth of the particles is substantially completed, mainly progress of crystallization and growth of crystallites take place in the microparticles. As a result, in the case that microparticles are separated by using one kind of fluid to be processed, by changing the ratio (Od/Id) of the distance (Od) from the center of the rotation of the processing surfaces to the discharge part 14 to the distance (Id) from the said center of the rotation thereof to the inside introduction part d1, any one of the controls, out of the crystallinity control to increase or decrease the crystallinity of the microparticles, the d/D control to increase or decrease the ratio (d/D) of the crystallite diameter (d) to the particle diameter (D) of the microparticles, and the CV value control to control the particle size distribution of the microparticles, can be carried out.

According to the finding of inventors of the present invention, when the ratio (Od/Id) of the distance (Od) from the center of the rotation of the processing surfaces to the discharge part 14 to the distance (Id) from the said center of the rotation to the inside introduction part d1 satisfies the condition of 1.67 or more, the outside region corresponding to the late region 8 mentioned before can be obtained. Therefore, in the case that microparticles are separated by using one kind of fluid to be processed, by controlling the ratio (Od/Id) within the range of 1.67 to 8.33, the foregoing control can be carried out under the condition that the region corresponding to the late region 8 is present. On the other hand, by controlling the ratio (Od/Id) within the range of 1.67 to 8.33, the control from the condition that the region corresponding to the late region 8 is not present to the condition that the said region is present becomes possible, so that change of the crystallinity and the change of d/D can be realized more dynamically.

Meanwhile, each of the foregoing embodiments may be carried out by introducing one, or two or more kinds of fluids to be processed only from the intermediate introduction part d2 without introducing the fluid to be processed from the inside introduction part d1. In this case, the introduction part is not the inside introduction part d1 but only the intermediate introduction part d2.

Meanwhile, the crystallite diameter can be confirmed by the X-ray diffraction measurement. If a substance has crystallinity, the X-ray diffraction measurement gives the peak at the position determined by the crystal type. And from the half width of this peak, the crystallite diameter can be calculated in accordance with the Scherrer's equation.

Scherrer's equation:

$$\text{Crystallite diameter}(d) = K \cdot \lambda / (\beta \cdot \cos\theta)$$

Here, K is the Scherrer's constant with K=0.9, and X-ray (CuKα1) wavelength (λ)=1.54056 Å (1 Å=1×10$^{-10}$ m). The Bragg angle (θ) derived from the CuKα1 beam and the half width ($\beta_0$) are calculated by the profile fitting method (Pearson-XII function or Pseudo-Voigt function). The half width β used in the calculation is corrected from the half width $\beta_i$ derived from the apparatus, which is previously obtained from the standard Si.

$$\beta = \sqrt{\beta_0^2 - \beta_i^2} \qquad \text{[Equation 1]}$$

Also the crystallinity can be calculated by the heretofore known analysis method using the diffraction pattern obtained from the X-ray diffraction measurement result. As a general method, calculation thereof can be carried out by using X'Pert High Score Plus (manufactured by PANalytical B. V.), the diffraction software of the X-ray diffraction pattern.

Next, examples of the processing which can be carried out by using the fluid processing apparatus and processing method according to the present applied invention will be shown. Meanwhile, application of the fluid processing apparatus according to the present applied invention is not limited only to the examples shown below, but it can be applied not only to the reactions carried out by an existing microreactor or micromixer but also to other various reactions and processing including mixing and dispersion, such as for example, various heretofore known fluid processing shown in Patent Documents 1, 2, and 7.

A reaction to obtain pigment particles by mixing an acidic pigment solution, prepared by dissolving at least one kind of pigment in a strong acid such as sulfuric acid, nitric acid, and hydrochloric acid, with a solution including water (acid pasting method).

A reaction to precipitate pigment particles by pouring a pigment solution, prepared by dissolving at least one kind of pigment in an organic solvent, into a poor solvent which is a poor solvent to the said pigment and is compatible with the organic solvent used to prepare the pigment solution (reprecipitation method).

A reaction to obtain pigment particles by mixing a pigment solution, obtained by dissolving at least one kind of pigment either into a pH adjusting acidic or alkaline solution or into a mixed solution of the said pH adjusting solution with an organic solvent, with a pigment-separating solution not showing solubility to the pigment contained in the pigment solution or showing smaller solubility to the pigment than the solvent contained in the pigment solution, and yet being capable of changing pH of the pH adjusting solution.

A reaction to carry metal fine particles on a carbon black surface by a liquid phase reduction method (illustrative example of the metal includes at least one metal selected from the group consisting of platinum, palladium, gold, silver, rhodium, iridium, ruthenium, osmium, cobalt, manganese, nickel, iron, chromium, molybdenum, and titanium).

A reaction to produce crystals formed of a fullerene molecule and a fullerene nanowhisker/nanofiber nanotube by mixing a solution containing a first solvent having dissolved therein the fullerene with a second solvent having smaller solubility of the fullerene than the first solvent.

A reaction to reduce a metal compound (illustrative example of the metal includes a precious metal such as gold, silver, ruthenium, rhodium, palladium, osmium, iridium, and platinum, or copper, or a metal alloy of two or more metals mentioned above).

A reaction to hydrolyze a ceramic raw material (illustrative example of the ceramic raw material includes at least one kind selected from Al, Ba, Mg, Ca, La, Fe, Si, Ti, Zr, Pb, Sn, Zn, Cd, As, Ga, Sr, Bi, Ta, Se, Te, Hf, Mg, Ni, Mn, Co, S, Ge, Li, B, and Ce).

A reaction to separate titanium dioxide superfine particles by hydrolysis of a titanium compound (illustrative example of the titanium compound includes at least one kind selected from tetraalkoxy titanium such as tetramethoxy titanium, tetraethoxy titanium, tetra-n-propoxy titanium, tetraisopropoxy titanium, tetra-n-butoxy titanium, tetraisobutoxy titanium, and tetra-t-butoxy titanium, or a derivative of them; and titanium tetrachloride, titanyl sulfate, titanium citrate, and titanium tetranitrate).

A producing reaction to co-precipitate and separate fine particles of a compound semiconductor by joining with an ion-containing fluid, which is a semiconductor raw material and contains different elements (illustrative example of the compound semiconductor includes a compound semiconductor of the II-VI groups, a compound semiconductor of the III-V groups, a compound semiconductor of the IV group, a compound semiconductor of the I-III-VI groups).

A reaction to produce semiconductor fine particles by reducing a semiconductor element (illustrative example of the semiconductor element includes an element selected form the group consisting of silicon (Si), germanium (Ge), carbon (C), and tin (Sn)).

A reaction to produce magnetic fine particles by reducing a magnetic raw material (illustrative example of the magnetic raw material includes at least one kind selected from nickel, cobalt, iridium, iron, platinum, gold, silver, manganese, chromium, palladium, yttrium, and lanthanide (neodymium, samarium, gadolinium, and terbium)).

A reaction to separate biologically ingestible fine particles by mixing a fluid which at least one kind of raw material of the biologically ingestible fine particles is dissolved in a first solvent with a solvent capable of becoming a second solvent having lower solubility than the first solvent.

Alternatively, a reaction to separate biologically ingestible fine particles by a neutralization reaction caused by mixing a fluid containing at least one kind of an acidic substance or a cationic substance with a fluid containing at least one kind of a basic substance or an anionic substance.

A treatment to obtain microemulsion particles by mixing a fluid to be processed that contains an oil phase component which contains a fat-soluble pharmacologically active substance with a fluid to be processed comprising at least aqueous dispersion solvent, or by mixing a fluid to be processed that contains a aqueous phase component which contains a water-soluble pharmacologically active substance with a fluid to be processed comprising at least an oil-based dispersion solvent.

Alternatively, a treatment to obtain a liposome by mixing a dispersed phase of a fluid to be processed with a continuous phase of a fluid to be processed, wherein at least anyone of the dispersed phase or the continuous phase contains one or more kind of phospholipid, the dispersed phase contains a pharmacologically active substance, and the continuous phase is comprised of at least an aqueous dispersion solvent.

A treatment to obtain resin fine particles by mixing a fluid which a resin is dissolved in a solvent that is solubility and compatibility in the resin with an aqueous solvent, thereby effecting separation or emulsification.

Alternatively, a treatment to obtain resin fine particles by mixing a resin in the molten state obtained by heating with an aqueous solvent, thereby effecting emulsification and dispersion.

Reaction process accompanied with or not accompanied with separation of microparticles by a reaction of various chemical reactions, especially a compound starting raw material (particularly, an organic compound), with various reactants, the reactions such as Friedel-Crafts reaction, nitration reaction, addition reaction, elimination reaction, transfer reaction, polymerization reaction, condensation reaction, coupling reaction, acylation, carbonylation, aldehyde synthesis, peptide synthesis, aldol reaction, indole reaction, electrophilic substitution reaction, nucleophilic substitution reaction, Wittig reaction, Michael addition reaction, enamine synthesis, ester synthesis, enzymatic reaction, diazo coupling reaction, oxidation reaction, reducing reaction, multistep reaction, selective addition reaction, Suzuki-Miyaura coupling reaction, Kumada-Corriu reaction, methathesis reaction, isomerization reaction, radical polymerization reaction, anionic polymerization reaction, cationic polymerization reaction, metal-catalyzed polymerization reaction, consecutive reaction, polymer synthesis, acetylene coupling reaction, episulfide synthesis, episulfide synthesis, Bamberger rearrangement, Chapman rearrangement, Claisen condensation, quinoline synthesis, Paal-Knorr furan synthesis, Paal-Knorr pyrole synthesis, Passerini reaction, Paterno-Buchi reaction, carbonyl-ene reaction (Prins reaction), Jacobsen rearrangement, Koenigs-Knorr glucosidation reaction, Leuckart-Wallach reaction, Horner-Wadsworth-Emmons reaction, Gassman reaction, Noyori assymmetric hydrogenation reaction, Perkin reaction, Petasis reaction, Tishchenko reaction, Tishchenko reaction, Ullmann coupling, Nazarov cyclization, Tiffeneau-Demjanov rearrangement, template synthesis, oxidation using selenium dioxide, Reimer-Tiemann reaction, Grob cleavage reaction, haloform reaction, Malaprade glycol oxidative cleavage, Hofmann elimination, thiocarbonylation by using Lawesson reagent, Lossen rearrangement, cyclic ketone synthesis by using FAMSO, Favorskii rearrangement, Feist-Benary furan synthesis, Gabriel amine synthesis, Glaser reaction, Grignard reaction, Cope elimination, Cope rearrangement, diimide reduction of alkynes, Eschenmoser aminomethylation reaction, [2+2] photocyclization reaction, Appel reaction, aza-Wittig reaction, Bartoli indole synthesis, Carroll rearrangement, Chichibabin reaction, Clemmensen reduction, Combes quinoline synthesis, Tsuzi-Trost reaction, TEMPO oxidation, dihydroxylation by using osmium tetraoxide, Fries rearrangement, Neber rearrangement, Barton-McCombie deoxygenation, Barton decarboxylation, Seyferth-Gilbert alkyne synthesis, Pinnick (Kraus) oxidation, Itoh-Saegusa oxidation, Eschenmoser cleavage reaction, Eschenmoser-Claisen rearrangement, Doering-LaFlammeallene synthesis, Corey-Chakovsky reaction, acyloin condensation, Wolff-Kishner reduction, IBX oxidation, Parkin-Doering oxidation, Reissert reaction, Jacobsen's kinetic optical resolution hydrolysis, benzilic acid rearrangement, Hiyama cross-coupling, Luche reduction, oxymerculation, Vilismeier-Haak reaction, Wolff rearrangement, Kolbe-Schmitt reaction, Corey-Kim oxidation, Cannizzaro reaction, Henry reaction, transformation of an alcohol to an alkane, Arndt-Eistert synthesis, hydroformylation reaction, Peterson olefination, decarbonylation reaction, Curtius rearrangement, Wohl-Zeigler bromination at allyl position, Pfitzner-Moffatt oxidation, McMurry coupling, Barton reaction, Balz-Shiemann reaction, Masamune-Bergman reaction, Dieckmann condensation, pinacol coupling, Williamson ether synthesis, iodolactonization reaction, Harries ozone decomposition, oxidation by active manganese dioxide, alkyne cyclotrimerization reaction, Kumada-Tamao-Corriu cross-coupling, syn-β elimination of a sulfoxide and a selnoxide, Fisher indole synthesis, Oppenauer oxidation, Darzens condensation reaction, Alder ene reaction, Sarett-Collins oxidation, Nozaki-Hiyama-Kishi coupling reaction, Weinreb ketone synthesis, DAST fluorination, Corey-Winter olefin synthesis, Hosomi-Sakurai reaction, alcohol oxidation by using PCC (PDC), Jones oxidation, Keck allylation reaction, cyanide addition by using Nagata reagent, Negishi coupling, Ireland-Claisen rearrangement, Baeyer-Villiger oxidation, p-methoxybenzyl (PMB or MPM), dimethoxybenzyl (DMB) protection, deprotection, Wacker oxidation, Myers assymmetric alkylation, Yamaguchi macrolactonization, Mukaiyama-Corey macrolactonization, Bode peptide synthesis, Lindlar reduction, homogeneous hydrogenation, orthometallation, Wagner-Meerwein rearrangement, Wurtz reaction, ketone synthesis by using 1,3-dithiane, Michael addition, ketone synthesis by Stork enamine, Pauson-Khand cyclopentene synthesis, and Tebbe reaction.

Illustrative example of the emulsification, dispersion, and pulverization processing includes stirring, emulsification, dispersion, and pulverization processing used for the fluid to be processed such as suspension, emulsion, solid particles, polymer solution, and slurry, in various industrial fields including coating, ink, magnetic material, ceramics, battery, adhesive, electronic material, liquid crystal color filter, pharmaceutical product, cosmetics, fragrance, and food product.

Hereinafter, the present invention will be explained in more detail by Examples; but the present invention is not limited only to these Examples.

It is to be noted here that the term "from the center" in the following Examples means "from the first introduction part d1" of the fluid processing apparatus shown in FIG. 1; the first fluid means the first fluid to be processed that is introduced through the first introduction part d1 of the processing apparatus as described before; and the second fluid means the second fluid to be processed that is introduced through the second introduction part d2 of the processing apparatus shown in FIG. 1, as described before.

Accordingly, the confluence part radius (Cd) is the distance from the center of the rotation to the second introduction part d2, and the discharge part radius (Od) is the distance from the center of the rotation to the outer edge of the processing surfaces.

Measurement of the X-ray diffraction lattice (XRD) was made by using the X-ray diffraction analysis instrument X'pert PRO MPD (manufactured by PANalytical B. V.). The measurement conditions of the nickel microparticles in Examples 1 to 13 were as follows: Cu anticathode, tube voltage of 45 kV, tube current of 40 mA, 0.016 step/10 sec, and the measurement range of 10 to 100°/2θ (Cu). The crystallite diameter of the obtained nickel microparticles was calculated by using the peak confirmed by the XRD measurement at 47.3° of the silicon polycrystal plate with applying the Scherrer's equation to the peak appeared near to 44.5° in the obtained nickel diffraction pattern. The crystallinity was calculated by the Rietveld method using the diffraction software of the X-ray diffraction pattern (X'pert High Score Plus; manufactured by PANalytical B. V.) and the constant background method against the standard Example.

The measurement conditions of microparticles of copper phthalocyanine (hereunder, CuPc) in Examples 20 to 27 were as follows: Cu anticathode, tube voltage of 45 kV, tube current of 40 mA, 0.016 step/10 sec, and the measurement range of 10 to 60°/2θ (Cu). The crystallite diameter of the obtained CuPc microparticles was calculated by using the peak confirmed by the XRD measurement at 47.3° of the silicon polycrystal plate with applying the Scherrer's equation to the peak appeared near to 6.9° in the obtained CuPc diffraction pattern. The crystallinity was calculated by the constant background method against the standard Example.

Observation by the Scanning Electron Microscope:

Observation by the scanning electron microscope (SEM) was made by using the field-emission-type scanning electron microscope (FE-SEM) (JSM-7500F, manufactured by JEOL Ltd.). The observation condition with the magnification of 10,000 or more was used. The particle diameter was the average value of the diameters of 50 or more particles.

Transmission Electron Microscope:

Observation by the transmission electron microscope (TEM) was made by using the transmission electron microscope JEM-2100 (manufactured by JEOL Ltd.). Observation condition with the magnification of 30,000 or more was used. The particle diameter was the average value of the diameters of 50 or more of the primary particles.

Firstly, in Examples 1 to 27, by using the apparatus shown in FIG. 1, FIG. 4(A), and FIG. 4(B), a metal solution and a reducing agent solution are mixed in a thin film fluid formed between the processing surfaces 1 and 2 to separate metal microparticles in the thin film fluid.

Examples 1 to 5

Figure 6:
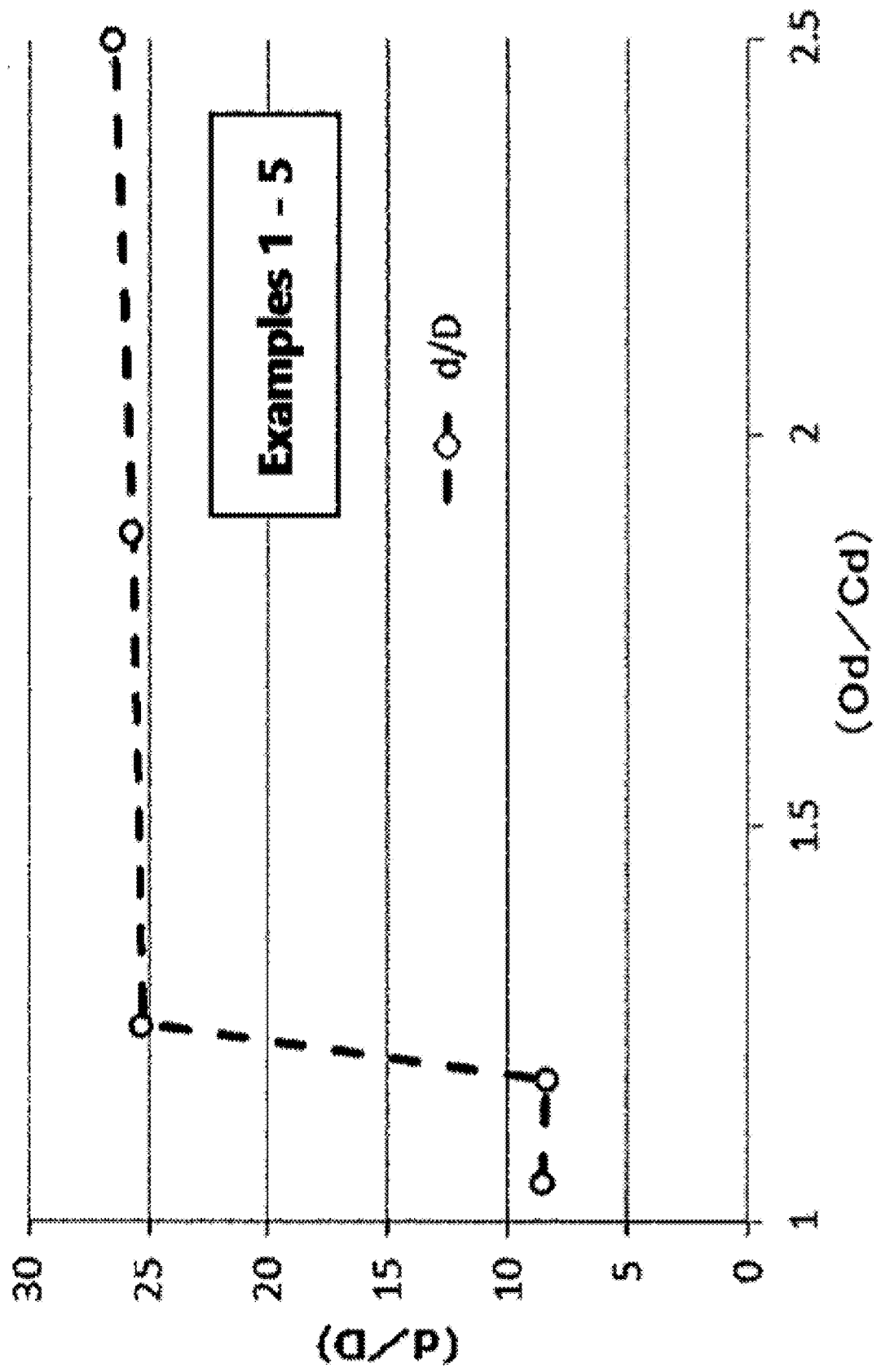
FIG. 6
This is a graph showing change of the ratio (d/D) of the crystallite diameter to the particle diameter in the results of Examples 1 to 5.
Figure 7:
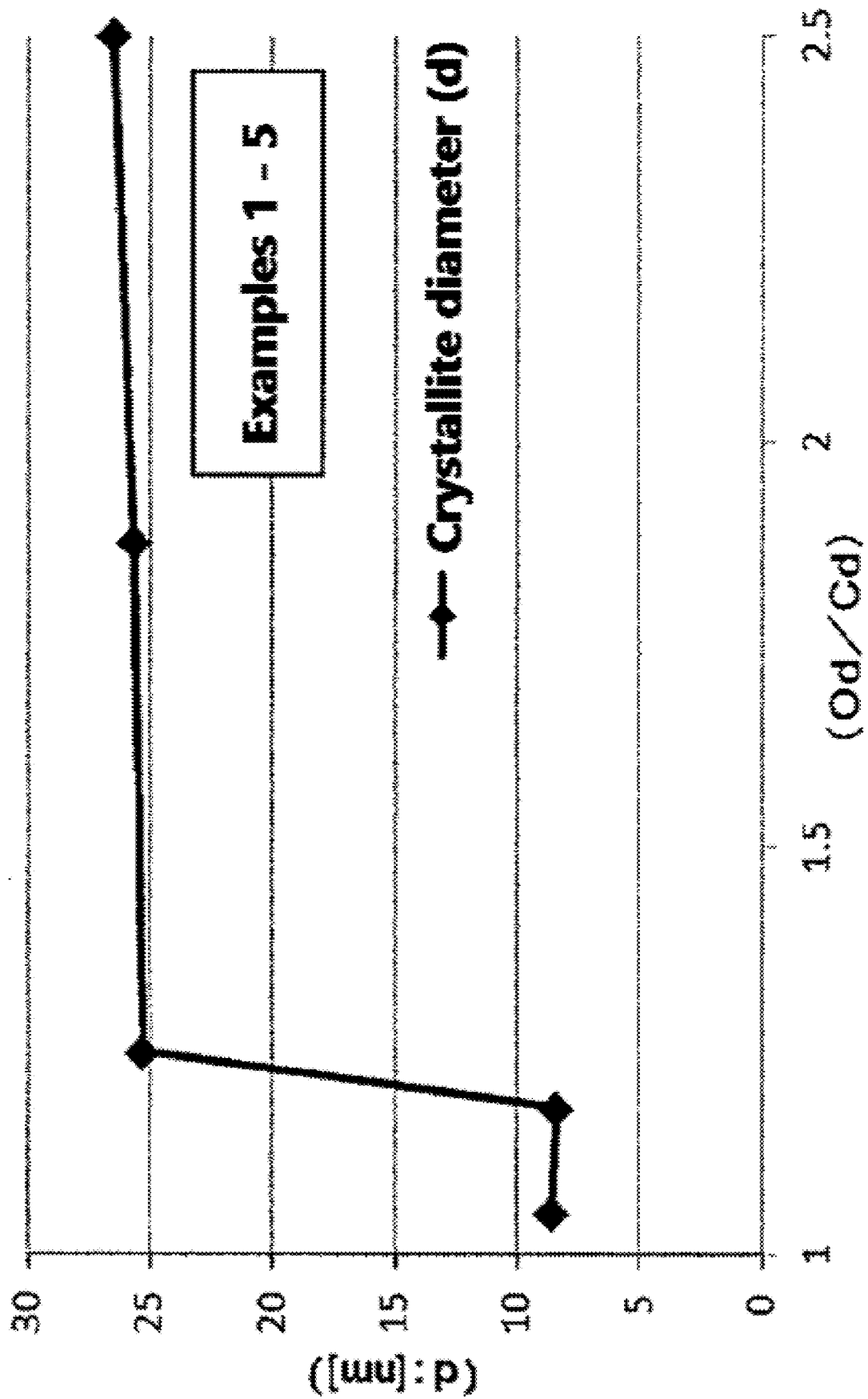
FIG. 7
This is a graph showing change of the crystallite diameter (d) in the results of Examples 1 to 5.
Figure 8:
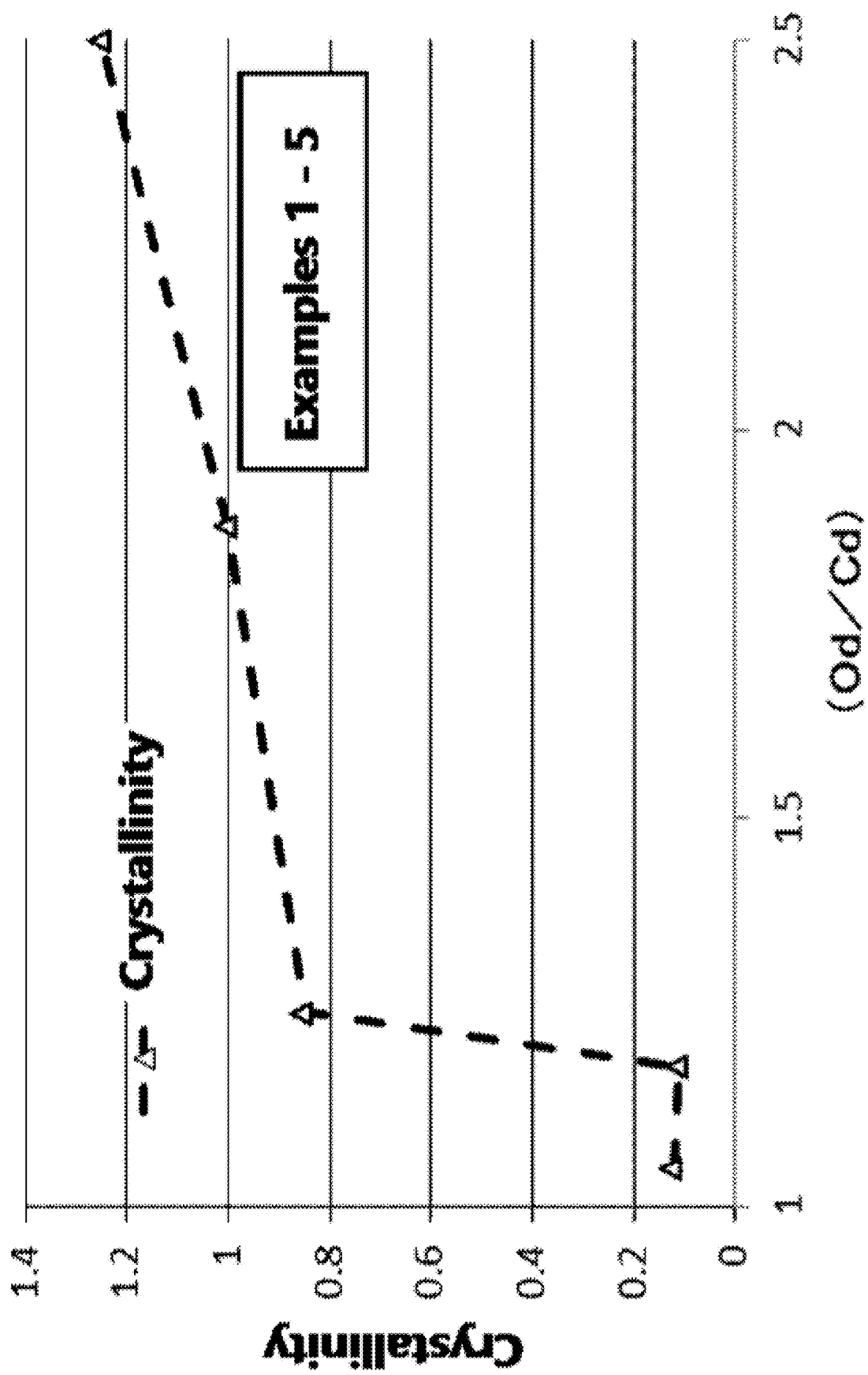
FIG. 8
This is a graph showing change of the crystallinity in the results of Examples 1 to 5.

While supplying the nickel solution (0.20M nickel sulfate hexahydrate ($Ni(SO_4)_2 \cdot 6H_2O$)/13.4% by weight of pure water ($H_2O$)/0.8% by weight of polyethylene glycol 600 (PEG 600) in ethylene glycol (EG)) as the first fluid from the center with the supply pressure of 0.44 MPaG, the rotation number of 3600 rpm, temperature of 135° C., and 800 mL/minute, the reducing agent solution (70% by weight of hydrazine monohydrate (HMH)/10% by weight of potassium hydroxide (KOH) in pure water ($H_2O$)) with the temperature of 30° C. was introduced as the second fluid into between the processing surfaces 1 and 2 at 60 mL/minute, whereby the first fluid and the second fluid were mixed in the thin film fluid. The respective supply temperatures of the first fluid and the second fluid were measured just before the first fluid and the second fluid were introduced into the processing apparatus (in more detail, just before introduction into between the processing surfaces 1 and 2). Also pH of the first fluid was 4.12 and pH of the second fluid was 14 or more (the pH test paper was used). The temperature of the solution ejected from the processing surfaces was about 90° C. The solution after this processing was allowed to stand until room temperature, and then, the nickel microparticles were settled and the supernatant solution thereof was removed. Thereafter, washing operation with pure water was repeated for 3 times, and then the microparticles were dried at 25° C. under atmospheric pressure. As a result of the XRD measurement of the nickel microparticle powders after drying, it was confirmed that the nickel microparticles were obtained. By changing the ratio (Od/Cd) of the confluence part radius (Cd) at the point where the fluids to be processed are joined together between the processing surfaces to the discharge part radius (Od) formed between the processing surfaces, the particle diameter and the crystallite diameter were confirmed. With regard to Examples 1 to 5, the process conditions of the first fluid and the second fluid are shown in Table 1; the supply conditions of the first fluid and the second fluid are shown in Table 2; the ratio (Od/Cd), the rotation number of the processing members, the circumferential velocity of the processing members (circumferential velocity of the outer circumference of the processing members), the particle diameter (D) of the obtained microparticles calculated by the method in the SEM observation, the crystallite diameter (d) calculated by the method in the XRD measurement, the ratio (d/D), and with regard to the crystallinity, the ratio relative to the crystallinity of Example 4 (crystallinity of each Example relative to the crystallinity of Example 4 as 1) are shown in Table 3. The crystallinity was calculated by the Rietveld method using the XRD measurement result of Example 2; and with regard to Examples 1 to 5 (except for Example 4), it was calculated by the constant background method against Example 4 as the standard. With regard to the results of Examples 1 to 5 shown in Table 3, the graph in which (Od/Cd) is plotted in the horizontal axis and the ratio (d/D) of the crystallite diameter to the particle diameter is plotted in the vertical axis is shown in FIG. 6; the graph in which (Od/Cd) is plotted in the horizontal axis and the crystallite diameter (d) is plotted in the vertical axis is shown in FIG. 7; and the graph in which (Od/Cd) is plotted in the horizontal axis and the crystallinity is plotted in the vertical axis is shown in FIG. 8.

TABLE 1

| | First fluid recipe | | | | | Second fluid recipe | | | |
|---|---|---|---|---|---|---|---|---|---|
| | EG | PEG 600 | PW | NiSO$_4$•6H$_2$O | | Concentration [wt %] | | | |
| Example | Concentration [wt %] | | | Concentration [mol/L] | [pH] | HMH | KOH | PW | [pH] |
| 1 to 5 | 81.1 | 0.8 | 13.4 | 0.20 | 4.12 | 70.0 | 10.0 | 20.0 | 14< |

TABLE 2

| | First fluid | | Second fluid | |
|---|---|---|---|---|
| Example | Supply flow rate [ml/min] | Supply temperature [° C.] | Supply flow rate [ml/min] | Supply temperature [° C.] |
| 1 to 5 | 800 | 135 | 60 | 30 |

TABLE 3

| Example | Od/Cd | Ow/Iw | Rotation number [rpm] | Circumferential velocity [m/sec] | SEM particle diameter (D) [nm] | Crystallite diameter (d) [nm] | d/D | Crystallinity |
|---|---|---|---|---|---|---|---|---|
| 1 | 1.05 | 0.43 | 3600 | 15.8 | 107.4 | 8.6 | 0.080 | 0.12 |
| 2 | 1.18 | 1.92 | 3600 | 17.8 | 106.8 | 8.4 | 0.079 | 0.11 |
| 3 | 1.25 | 2.73 | 3600 | 18.8 | 108.3 | 25.3 | 0.234 | 0.85 |
| 4 | 1.88 | 9.92 | 3600 | 28.3 | 106.4 | 25.7 | 0.242 | 1 |
| 5 | 2.5 | 17.11 | 3600 | 37.7 | 105.4 | 26.5 | 0.251 | 1.25 |

Meanwhile, in each Example (Examples 1 to 19 and later-mentioned Examples 28 to 59), the confluence part radius (Cd) was fixed at 38.331 mm, while the discharge part radius (Od) was changed so as to give the respective ratios.

Figure 9:
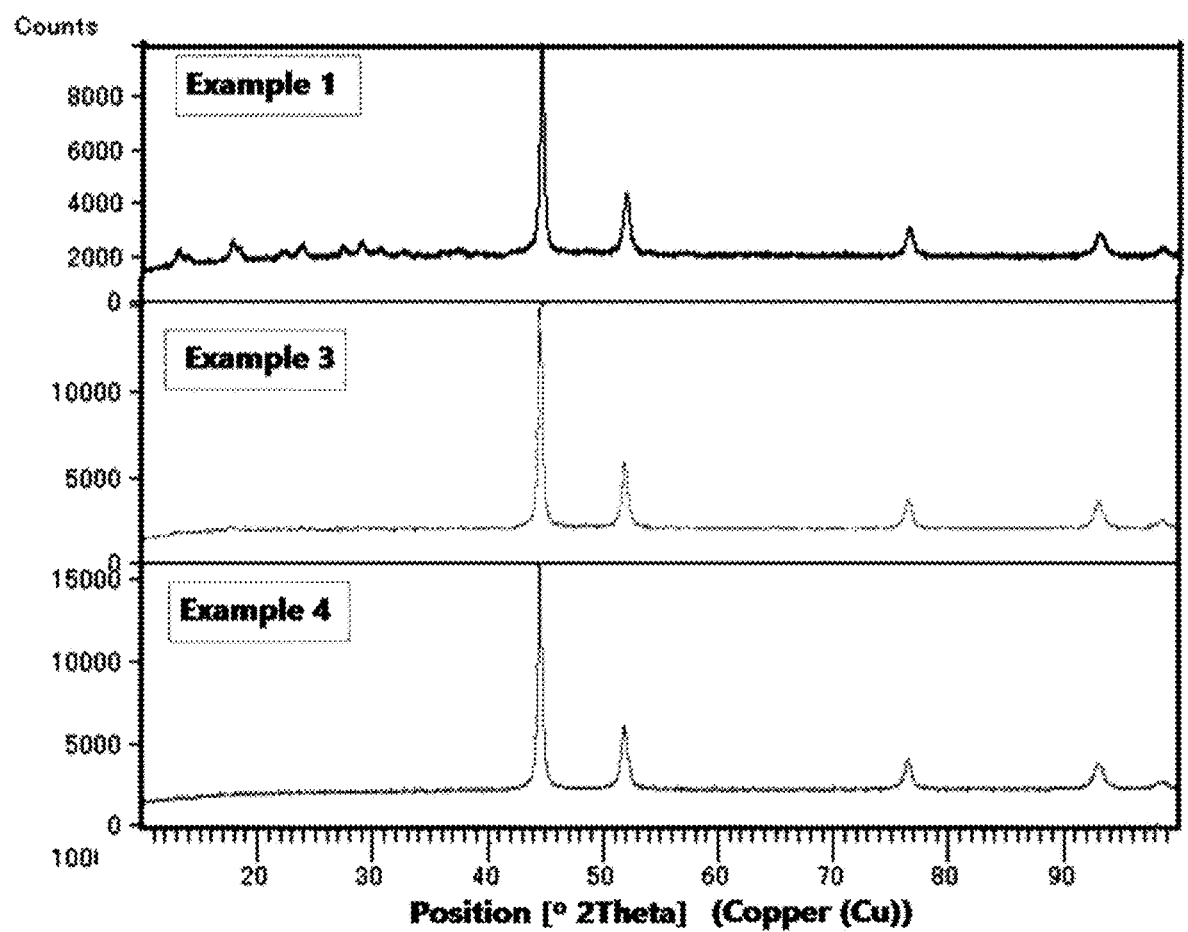
FIG. 9
This is the XRD measurement results of Examples 1, 3, and 4.

From Table 3 and FIG. 6 to FIG. 8, under the condition of the constant rotation number of the processing members in each Example, it was confirmed that by controlling the ratio (Od/Cd), growth of the crystallites and the crystallinity of the nickel microparticles can be controlled with controlling the particle diameter thereof. In addition, it was confirmed that comparing with the growing degree of the crystallite diameter, the growing degree of the particle diameter can be controlled much more. Accordingly, it was confirmed that the ratio (d/D) of the crystallite diameter to the particle diameter of the nickel microparticles can be controlled. From FIG. 6 and FIG. 7, it can be seen that by increasing the ratio (Od/Cd), the ratio (d/D) is prone to increase. In addition, it was confirmed that by increasing the ratio (Od/Cd), the crystallite diameter (d) of the separated nickel microparticles is prone to increase. Moreover, from FIG. 8, it was confirmed that by increasing the ratio (Od/Cd), the crystallinity is prone to increase. Furthermore, from the XRD measurement result shown in FIG. 9, in Example 1, the peaks other than metal Ni can be seen; and it was suggested that by increasing Od/Cd, contamination of impurities can be reduced. In other words, it is thought that by increasing the ratio (Od/Cd), between the processing surfaces, the intended reaction can be facilitated much more than before, and the separation reaction of the microparticles can be carried out with high accuracy.

Examples 6 to 13

Figure 10:
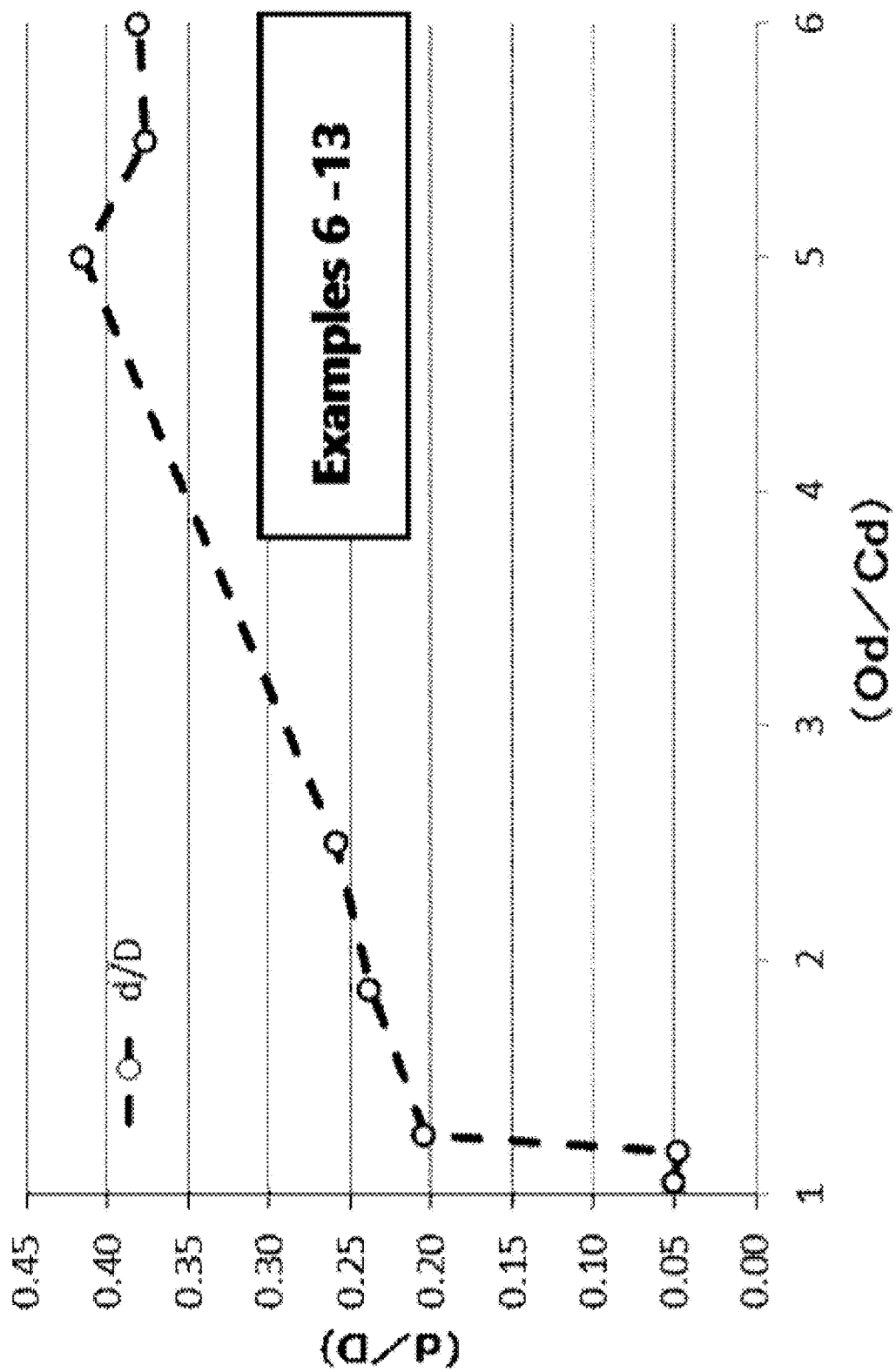
FIG. 10
This is a graph showing change of the ratio (d/D) of the crystallite diameter to the particle diameter in the results of Examples 6 to 13.
Figure 11:
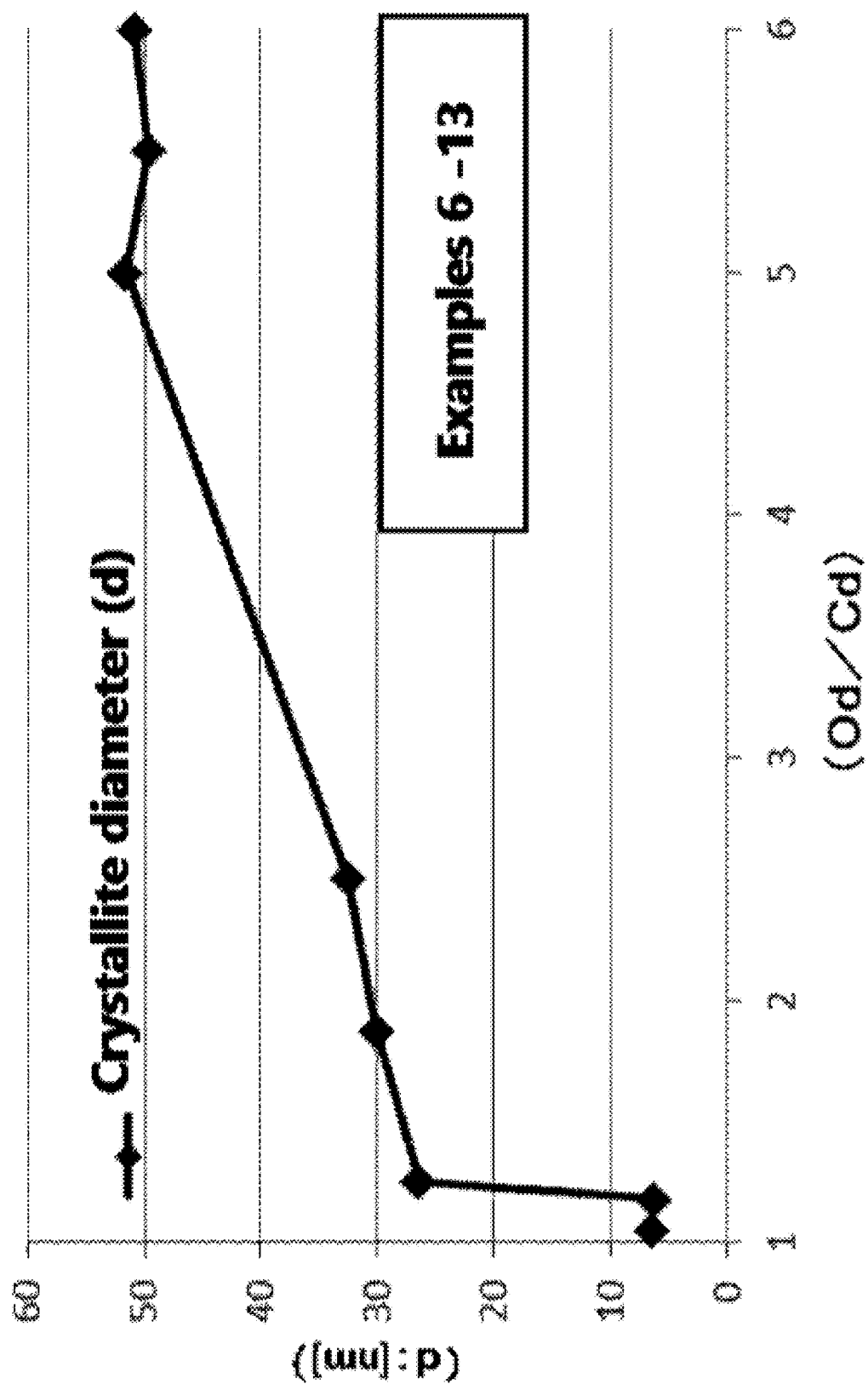
FIG. 11
This is a graph showing change of the crystallite diameter (d) in the results of Examples 6 to 13.
Figure 12:
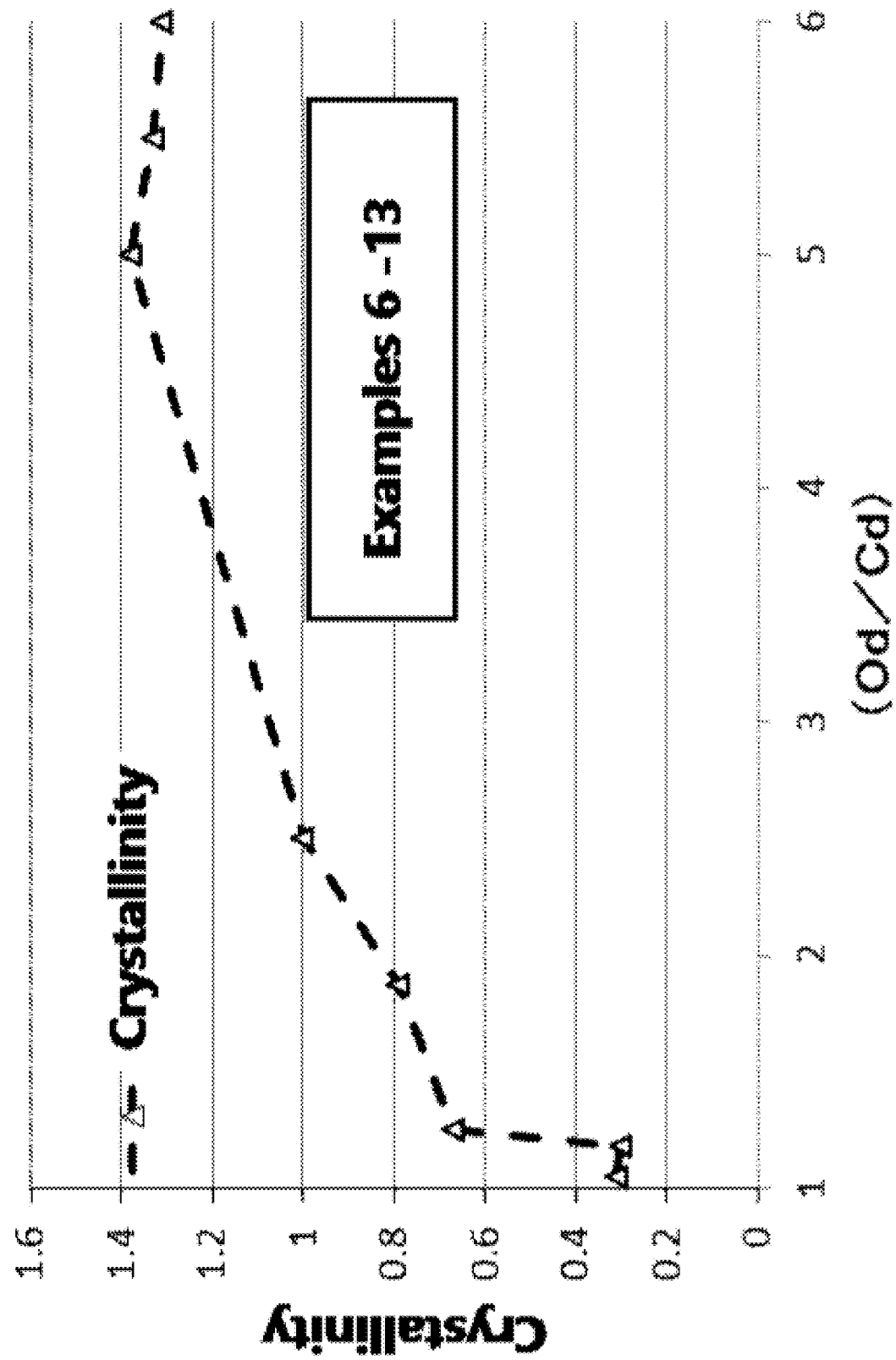
FIG. 12
This is a graph showing change of the crystallinity in the results of Examples 6 to 13.
Figure 13:
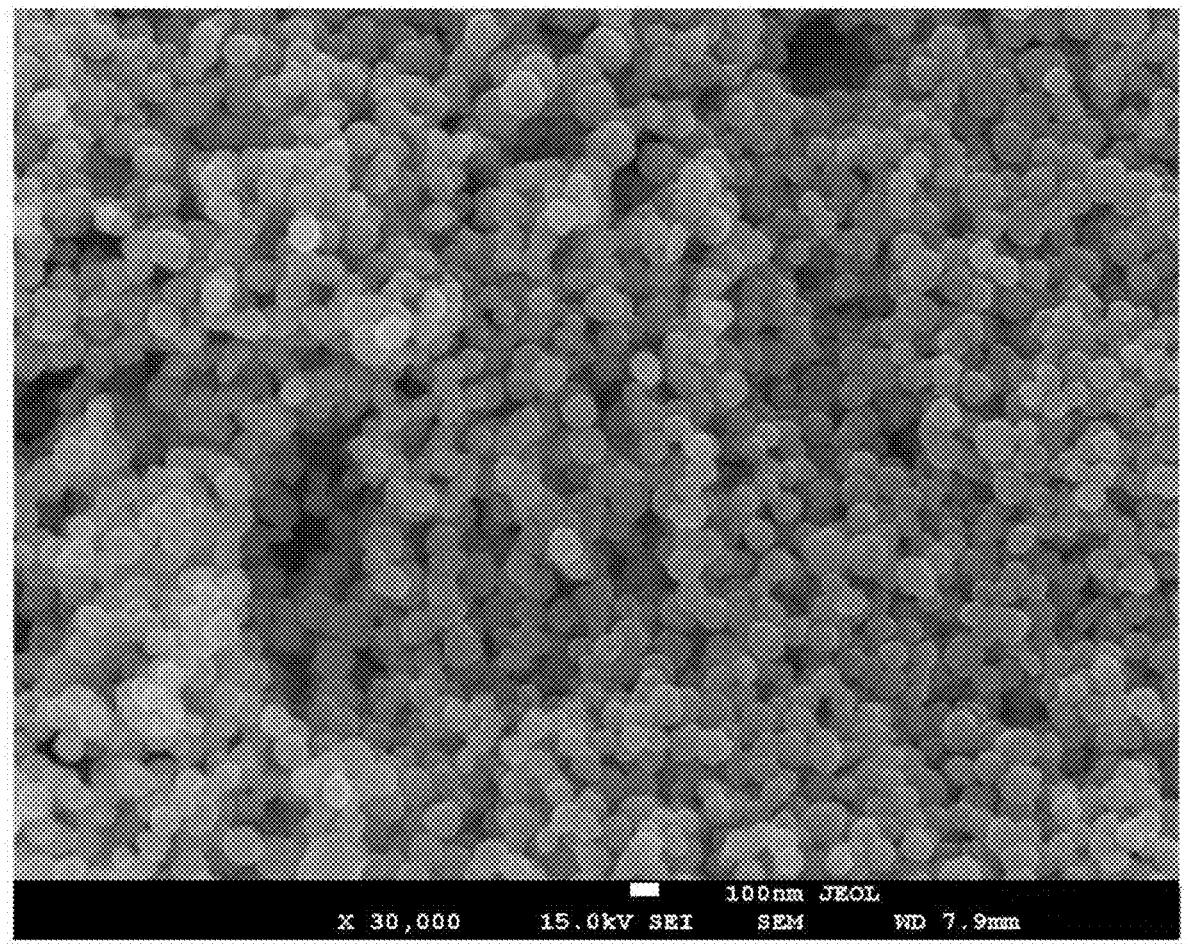
FIG. 13
This is a SEM picture of the nickel microparticles obtained in Example 9.

Procedure of Examples 1 to 5 was repeated except that the recipes of the first fluid and the second fluid were changed as shown in Table 4, the supply conditions of the first fluid and the second fluid were changed as shown in Table 5, the ratio (Od/Cd), rotation number of the processing members, and the circumferential velocity of the processing members (circumferential velocity of the outer circumference of the processing members) were changed as shown in Table 6, and thereby the dry powders of the nickel microparticles were obtained. In Table 6, the particle diameter (D) of the obtained microparticles calculated by the method in the SEM observation, the crystallite diameter (d) calculated by the method in the XRD measurement, (d/D), and with regard to the crystallinity, the ratio relative to the crystallinity of Example 10 (crystallinity of each Example relative to the crystallinity of Example 10 as 1) are shown. The crystallinity was calculated by the Rietveld method using the XRD measurement result of Example 10; and with regard to Examples 6 to 13 (except for Example 10), it was calculated by the constant background method against Example 10 as the standard. With regard to the results of Examples 6 to 13 shown in Table 6, the graph in which the ratio (Od/Cd) is plotted in the horizontal axis and the ratio (d/D) of the crystallite diameter to the particle diameter is plotted in the vertical axis is shown in FIG. 10; the graph in which (Od/Cd) is plotted in the horizontal axis and the crystallite diameter (d) is plotted in the vertical axis is shown in FIG. 11; and the graph in which (Od/Cd) is plotted in the horizontal axis and the crystallinity is plotted in the vertical axis is shown in FIG. 12. The SEM picture (magnification of 30,000) of the nickel microparticles obtained in Example 9 is shown in FIG. 13.

TABLE 4

| | First fluid recipe | | | | | Second fluid recipe | | | |
|---|---|---|---|---|---|---|---|---|---|
| | EG | PEG 600 | PW | $NiSO_4 \cdot 6H_2O$ | | Concentration [wt %] | | | |
| Example | Concentration [wt %] | | | Concentration [mol/L] | [pH] | HMH | KOH | PW | [pH] |
| 6 to 13 | 81.1 | 0.8 | 13.4 | 0.20 | 4.12 | 70.0 | 10.0 | 20.0 | 14< |

TABLE 5

| | First fluid | | Second fluid | |
|---|---|---|---|---|
| Example | Supply flow rate [ml/min] | Supply temperature [° C.] | Supply flow rate [ml/min] | Supply temperature [° C.] |
| 6 to 13 | 400 | 135 | 30 | 30 |

TABLE 6

| Example | Od/Cd | Ow/Iw | Rotation number [rpm] | Circumferential velocity [m/sec] | SEM particle diameter (D) [nm] | Crystallite diameter (d) [nm] | d/D | Crystallinity |
|---|---|---|---|---|---|---|---|---|
| 6 | 1.05 | 0.43 | 4274 | 18.8 | 128.6 | 6.4 | 0.05 | 0.31 |
| 7 | 1.18 | 1.92 | 3820 | 18.8 | 131.2 | 6.3 | 0.05 | 0.30 |
| 8 | 1.25 | 2.73 | 3600 | 18.8 | 129.3 | 26.4 | 0.20 | 0.67 |
| 9 | 1.88 | 9.92 | 2400 | 18.8 | 126.4 | 30.1 | 0.24 | 0.79 |
| 10 | 2.50 | 17.11 | 1800 | 18.8 | 125.4 | 32.5 | 0.26 | 1.00 |
| 11 | 5.00 | 45.88 | 900 | 18.8 | 124.3 | 51.6 | 0.42 | 1.38 |
| 12 | 5.50 | 51.63 | 818 | 18.8 | 131.8 | 49.6 | 0.38 | 1.33 |
| 13 | 6.00 | 57.39 | 750 | 18.8 | 133.4 | 50.8 | 0.38 | 1.31 |

Examples 14 to 19

From Table 6 and FIG. 10 to FIG. 12, under the condition of the constant circumferential velocity of the processing members in each Example, it was confirmed that by controlling the ratio (Od/Cd) within the range of 1.25 to 5.00, growth of the crystallites and the crystallinity of the nickel microparticles can be controlled with controlling the particle diameter thereof. In addition, it was confirmed that comparing with the growing degree of the crystallite diameter, the growing degree of the particle diameter can be controlled much more. Accordingly, it was confirmed that the ratio (d/D) of the crystallite diameter to the particle diameter of the nickel microparticles can be controlled. From FIG. 10 and FIG. 11, it can be seen that by increasing the ratio (Od/Cd), the ratio (d/D) is prone to increase. In addition, it was confirmed that by increasing the ratio (Od/Cd), the crystallite diameter (d) of the separated nickel microparticles is prone to increase. Moreover, from FIG. 12, it can be seen that by increasing the ratio (Od/Cd), the crystallinity is prone to increase. However, in the region where the ratio (Od/Cd) is beyond 5.00, there was no particular tendency to be seen in the relationship between the ratio (Od/Cd) and the ratio (d/D) or the crystallinity.

Figure 14:
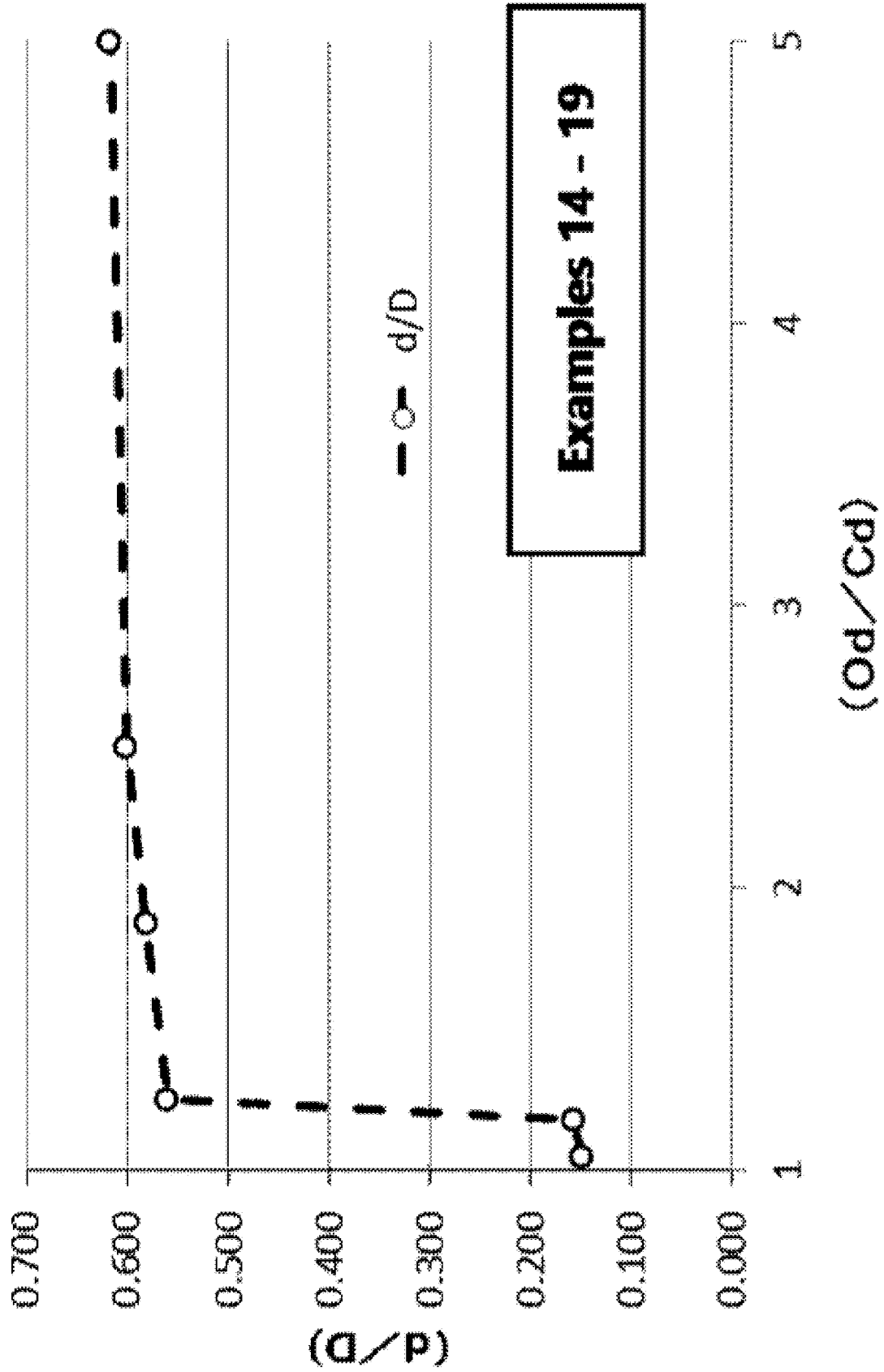
FIG. 14
This is a graph showing change of the ratio (d/D) of the crystallite diameter to the particle diameter in the results of Examples 14 to 19.
Figure 15:
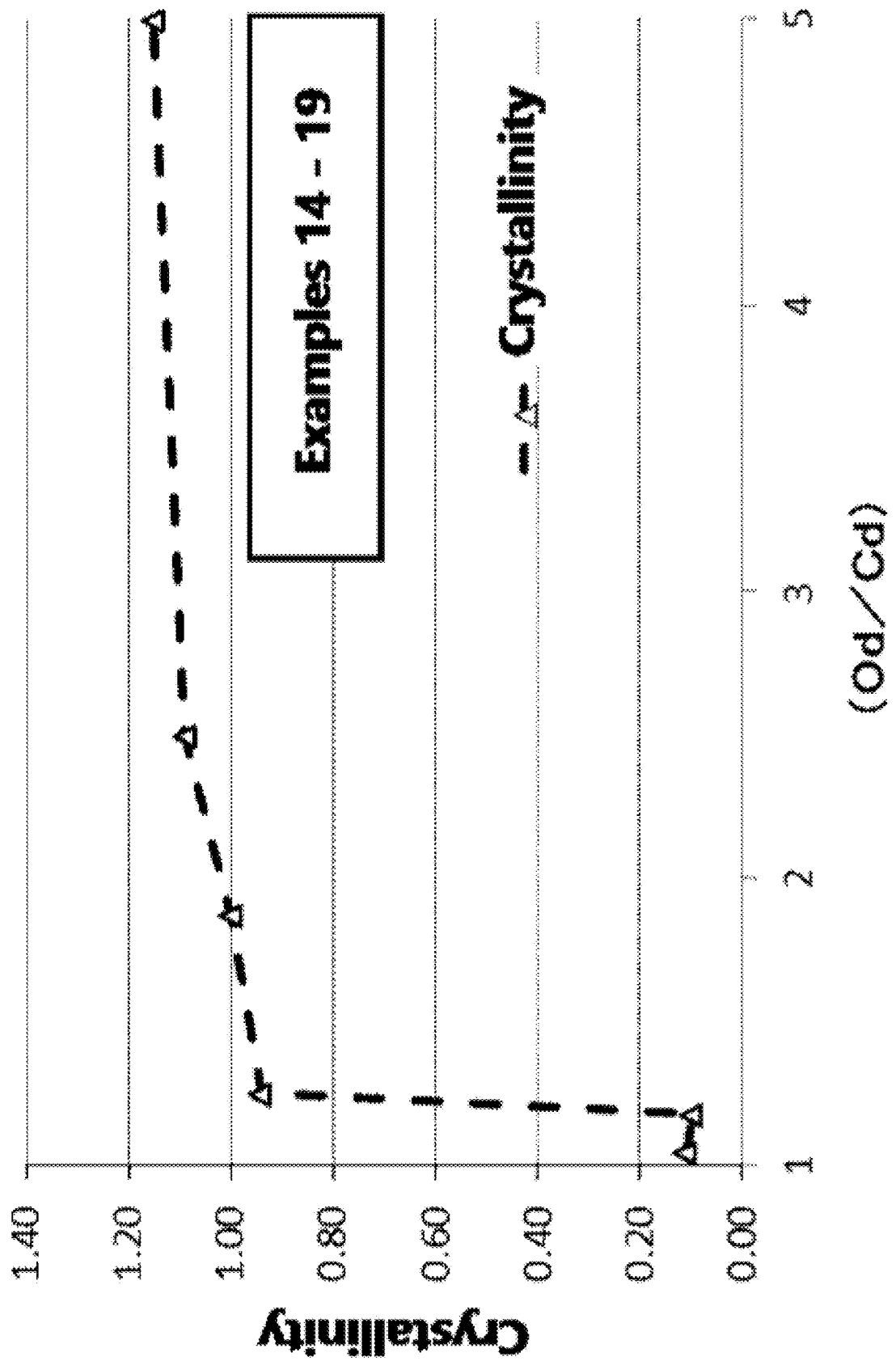
FIG. 15
This is a graph showing change of the crystallinity in the results of Examples 14 to 19.

While supplying the aqueous solution containing 0.17% by weight of silver nitrate ($AgNO_3$)—0.50% by weight of gelatin (alkaline-treated) as the first fluid from the center with the supply pressure of 0.30 MPaG, the rotation number of 1700 rpm, the temperature of 20° C., and 1000 mL/minute, the reducing agent solution (aqueous solution of 20.0% by weight of hydrazine monohydrate—3.0% by weight of potassium hydroxide—0.50% by weight of gelatin (alkaline-treated)) with the temperature of 20° C. was introduced as the second fluid into between the processing surfaces 1 and 2 at 50 mL/minute, whereby the first fluid and the second fluid were mixed in the thin film fluid. The respective supply temperatures of the first fluid and the second fluid were measured just before the first fluid and the second fluid were introduced into the processing apparatus (in more detail, just before introduction into between the processing surfaces 1 and 2). Also pH of the first fluid was 5.10 and pH of the second fluid was 14 or more (the pH test paper was used). The temperature of the solution ejected from the processing surfaces was about 20° C. By changing the ratio (Od/Cd) of the confluence part radius (Cd) at the point where the fluids to be processed are joined together between the processing surfaces to the discharge part radius (Od) formed between the processing surfaces, the particle diameter and the crystallite diameter were confirmed. With regard to Examples 10 to 13, the process conditions of the first fluid and the second fluid are shown in Table 7; the supply conditions of the first fluid and the second fluid are shown in Table 8; the ratio (Od/Cd), the rotation number of the processing members, the circumferential velocity of the processing members (circumferential velocity of the outer circumference of the processing members), the particle diameter (D) of the obtained microparticles calculated by the method in the TEM observation, the crystallite diameter (d) calculated by the method in the XRD measurement, the ratio (d/D), and with regard to the crystallinity, the ratio relative to the crystallinity of Example 17 (crystallinity of each Example relative to the crystallinity of Example 17 as 1) are shown in Table 9. The crystallinity was calculated by the Rietveld method using the XRD measurement result of Example 11; and with regard to Examples 14 to 19 (except for Example 17), it was calculated by the constant background method against Example 17 as the standard. With regard to the results of Examples 14 to 19 shown in Table 9, the graph in which (Od/Cd) is plotted in the horizontal axis and the ratio (d/D) of the crystallite diameter to the particle diameter is plotted in the vertical axis is shown in FIG. 14; and the graph in which (Od/Cd) is plotted in the horizontal axis and the crystallinity is plotted in the vertical axis is shown in FIG. 15.

TABLE 7

| | First fluid recipe | | | | | | Second fluid recipe | | |
|---|---|---|---|---|---|---|---|---|---|
| Example | AgNO$_3$ | Gelatin (alkaline-treated) Concentration [wt %] | PW | [pH] | HMH | KOH | Gelatin (alkaline-treated) Concentration [wt %] | PW | [pH] |
| 14 to 19 | 0.17 | 0.50 | 99.33 | 5.10 | 20.0 | 3.0 | 0.50 | 76.5 | 14< |

TABLE 8

| | First fluid | | Second fluid | |
|---|---|---|---|---|
| Example | Supply flow rate [ml/min] | Supply temperature [° C.] | Supply flow rate [ml/min] | Supply temperature [° C.] |
| 14 to 19 | 1000 | 20 | 50 | 20 |

TABLE 9

| Example | Od/Cd | Ow/Iw | Rotation number [rpm] | Circumferential velocity [m/sec] | TEM particle diameter (D) [nm] | Crystallite diameter (d) [nm] | d/D | Crystallinity |
|---|---|---|---|---|---|---|---|---|
| 14 | 1.05 | 0.43 | 1700 | 7.5 | 51.2 | 7.6 | 0.148 | 0.11 |
| 15 | 1.18 | 1.92 | 1700 | 8.4 | 50.1 | 7.9 | 0.158 | 0.10 |
| 16 | 1.25 | 2.73 | 1700 | 8.9 | 49.8 | 27.9 | 0.560 | 0.94 |
| 17 | 1.88 | 9.92 | 1700 | 13.4 | 49.2 | 28.6 | 0.581 | 1 |
| 18 | 2.50 | 17.11 | 1700 | 17.8 | 48.9 | 29.4 | 0.601 | 1.09 |
| 19 | 5.00 | 45.88 | 1700 | 35.5 | 47.8 | 29.5 | 0.617 | 1.15 |

From Table 9 and FIG. 14 to FIG. 15, under the condition of the constant rotation number of the processing members in each Example, it was confirmed that by controlling the ratio (Od/Cd), growth of the crystallites and the crystallinity of the silver microparticles can be controlled with controlling the particle diameter thereof. In addition, it was confirmed that comparing with the growing degree of the crystallite diameter, the growing degree of the particle diameter can be controlled much more. Accordingly, it was confirmed that the ratio (d/D) of the crystallite diameter to the particle diameter of the silver microparticles can be controlled. From FIG. 14, it can be seen that by increasing the ratio (Od/Cd), the ratio (d/D) is prone to increase. In addition, from FIG. 15, it can be seen that by increasing the ratio (Od/Cd), the crystallinity is prone to increase.

Examples 20 to 27

CuPc

In Examples 20 to 27, in a similar manner to Examples 1 to 13, by using the apparatus based on the same principle as the apparatus shown in Patent Document 3, an organic substance solution and a separating solvent were mixed in the thin film fluid formed between the processing surfaces 1 and 2, thereby separating organic substance microparticles in the thin film fluid.

Figure 16:
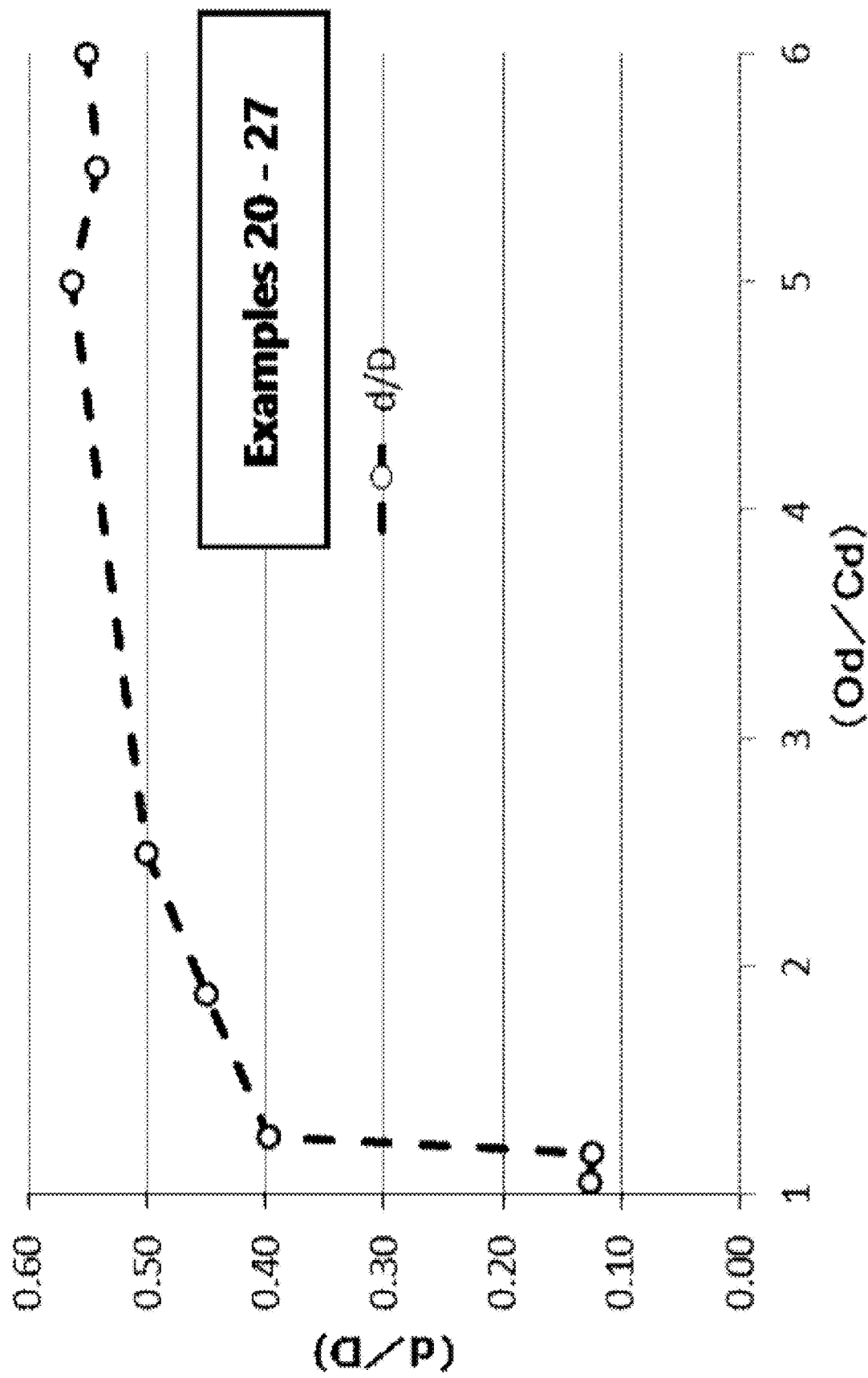
FIG. 16
This is a graph showing change of the ratio (d/D) of the crystallite diameter to the particle diameter in the results of Examples 20 to 27.
Figure 17:
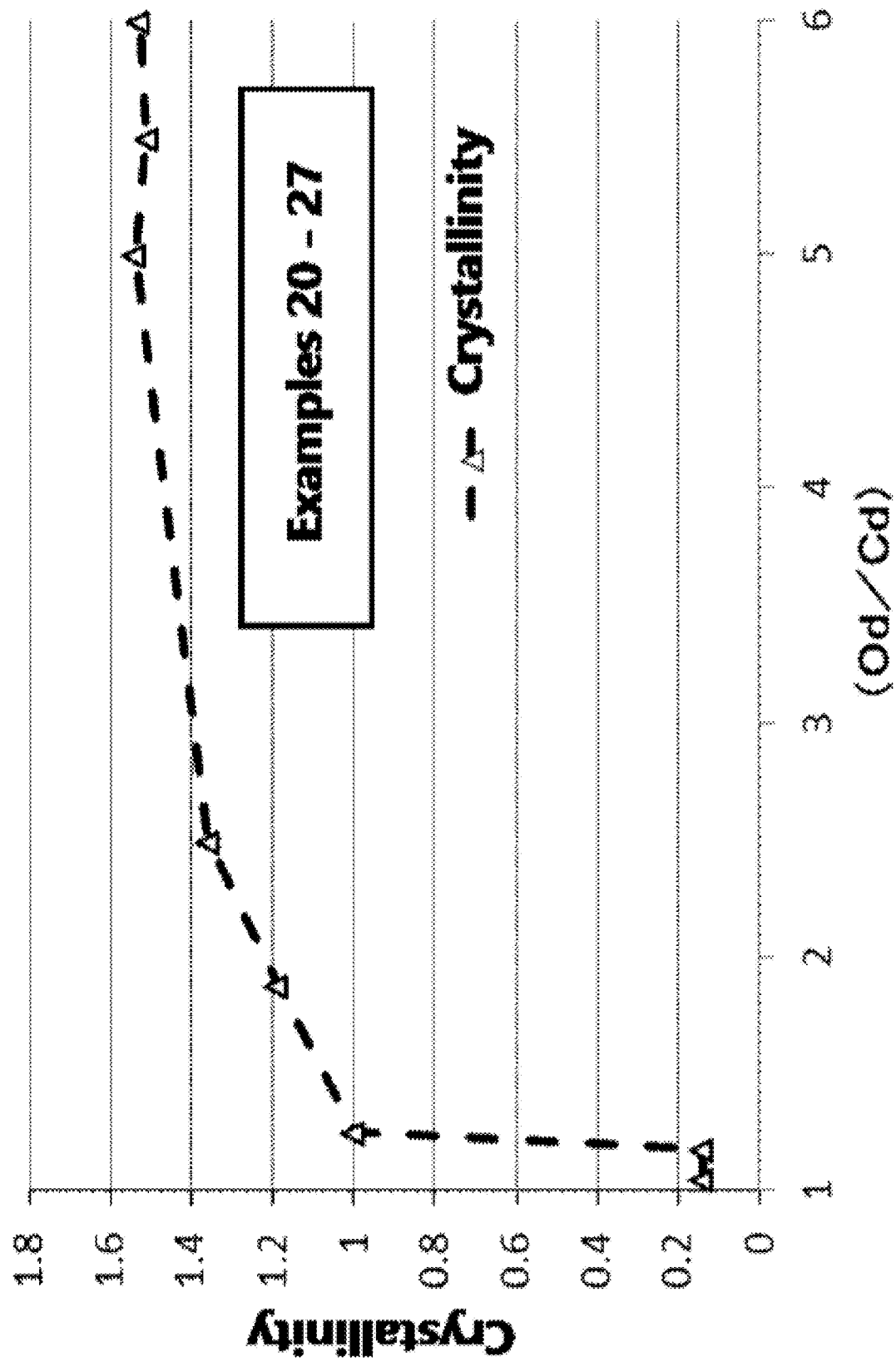
FIG. 17
This is a graph showing change of the crystallinity in the results of Examples 20 to 27.
Figure 18:
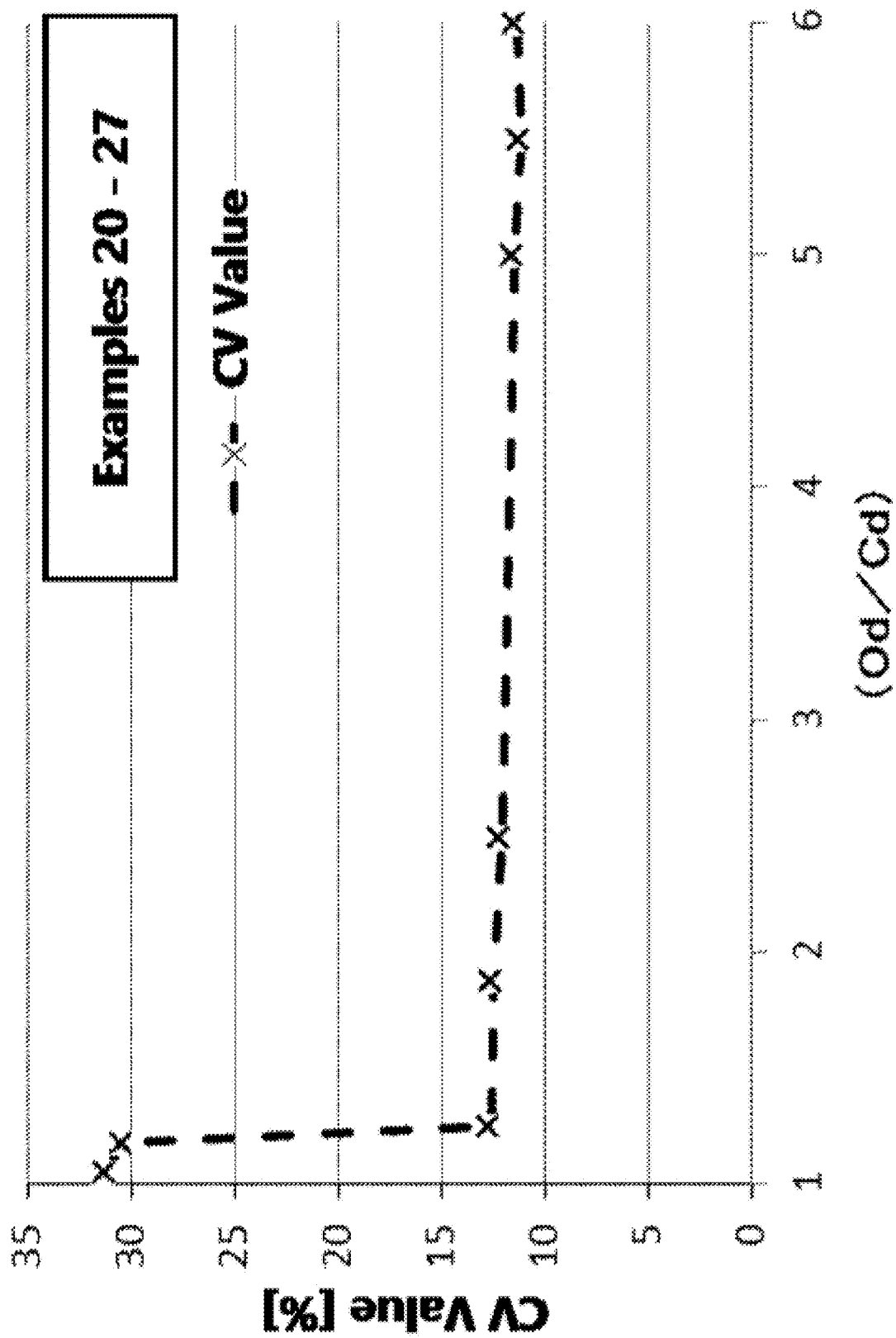
FIG. 18
This is a graph showing change of the CV value in the results of Examples 20 to 27.
Figure 19:
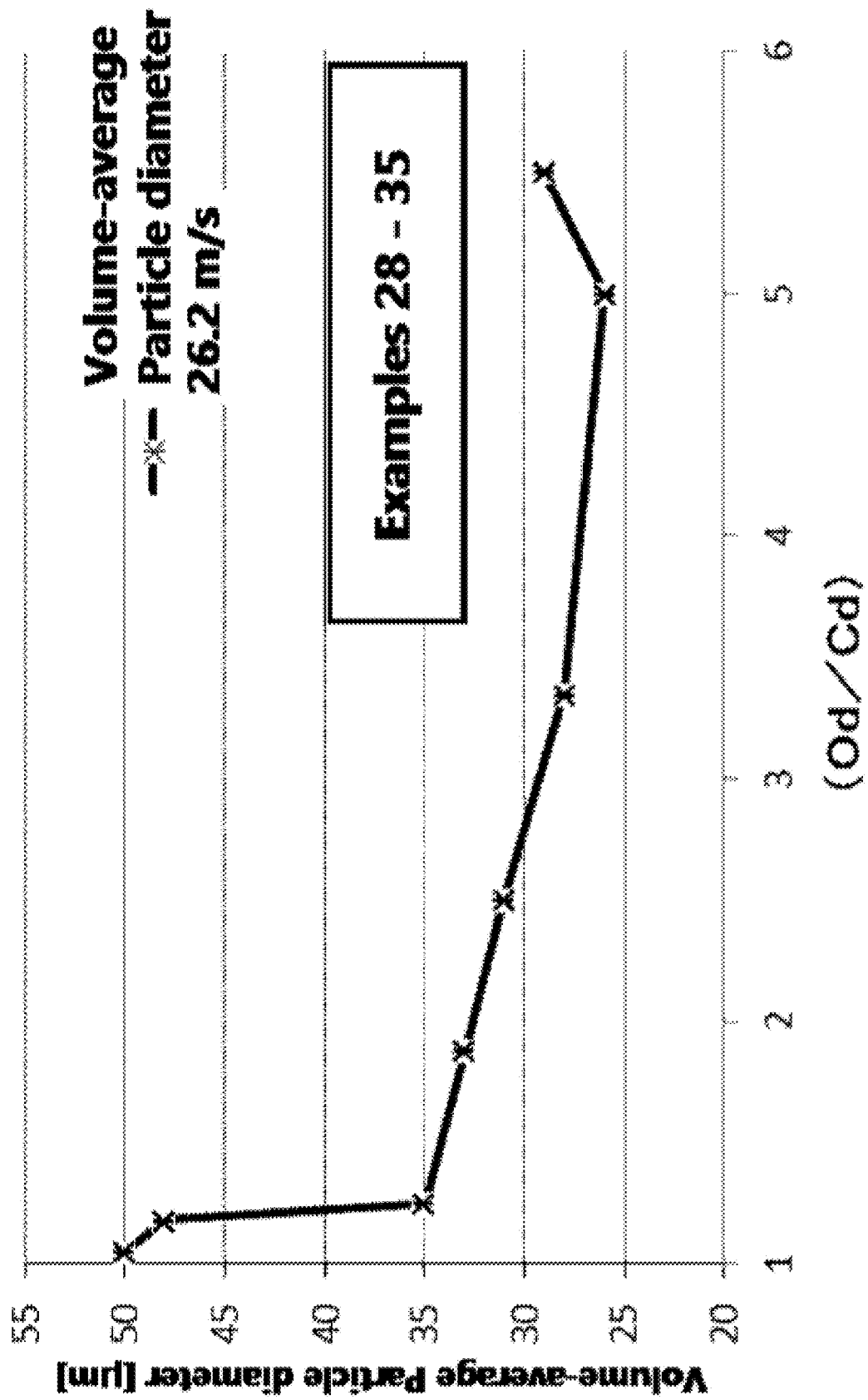
FIG. 19
This is a graph showing change of the volume-average particle diameter in the results of Examples 28 to 35.
Figure 20:
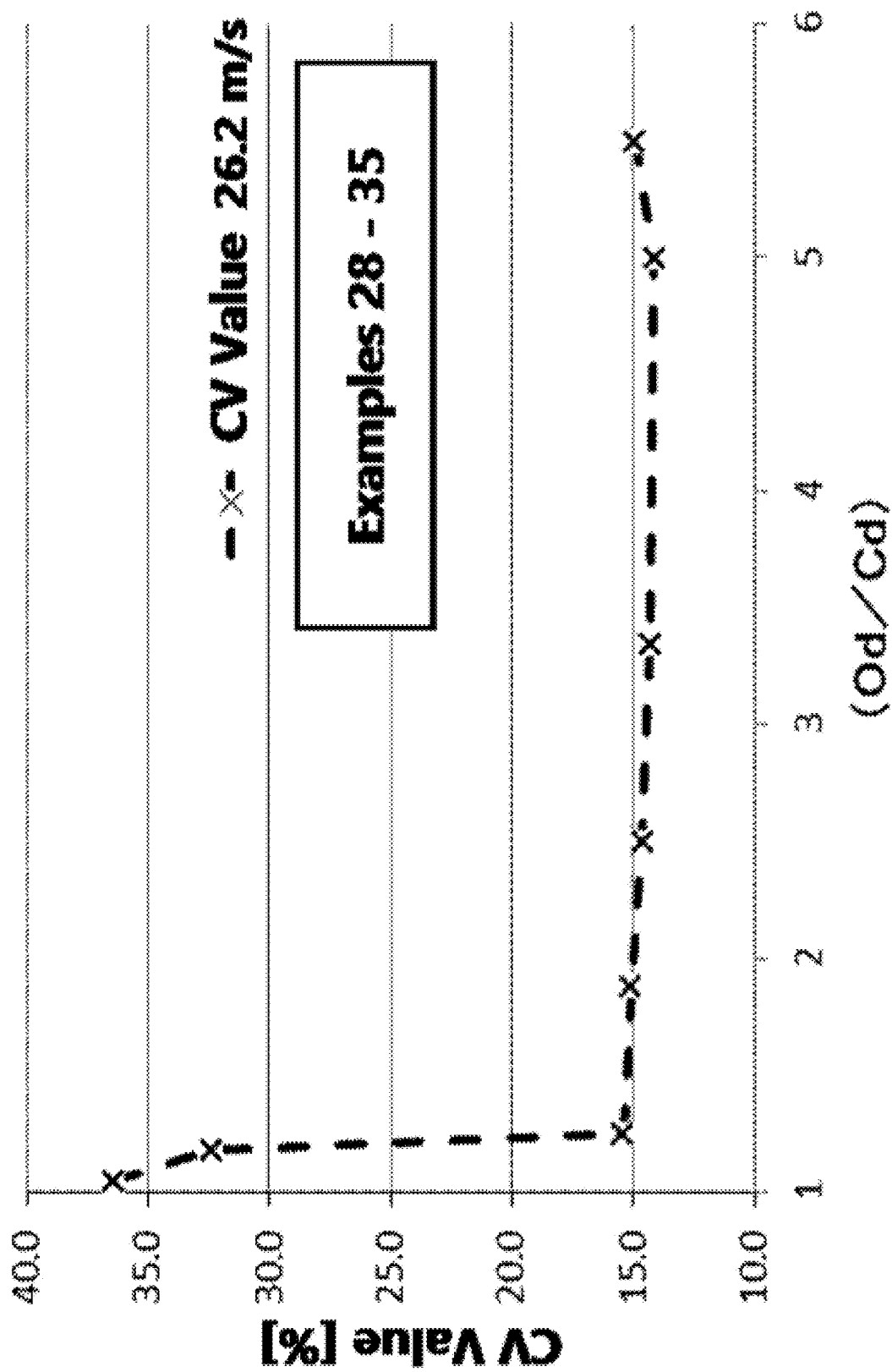
FIG. 20
This is a graph showing change of the CV value in the results of Examples 28 to 35.
Figure 21:
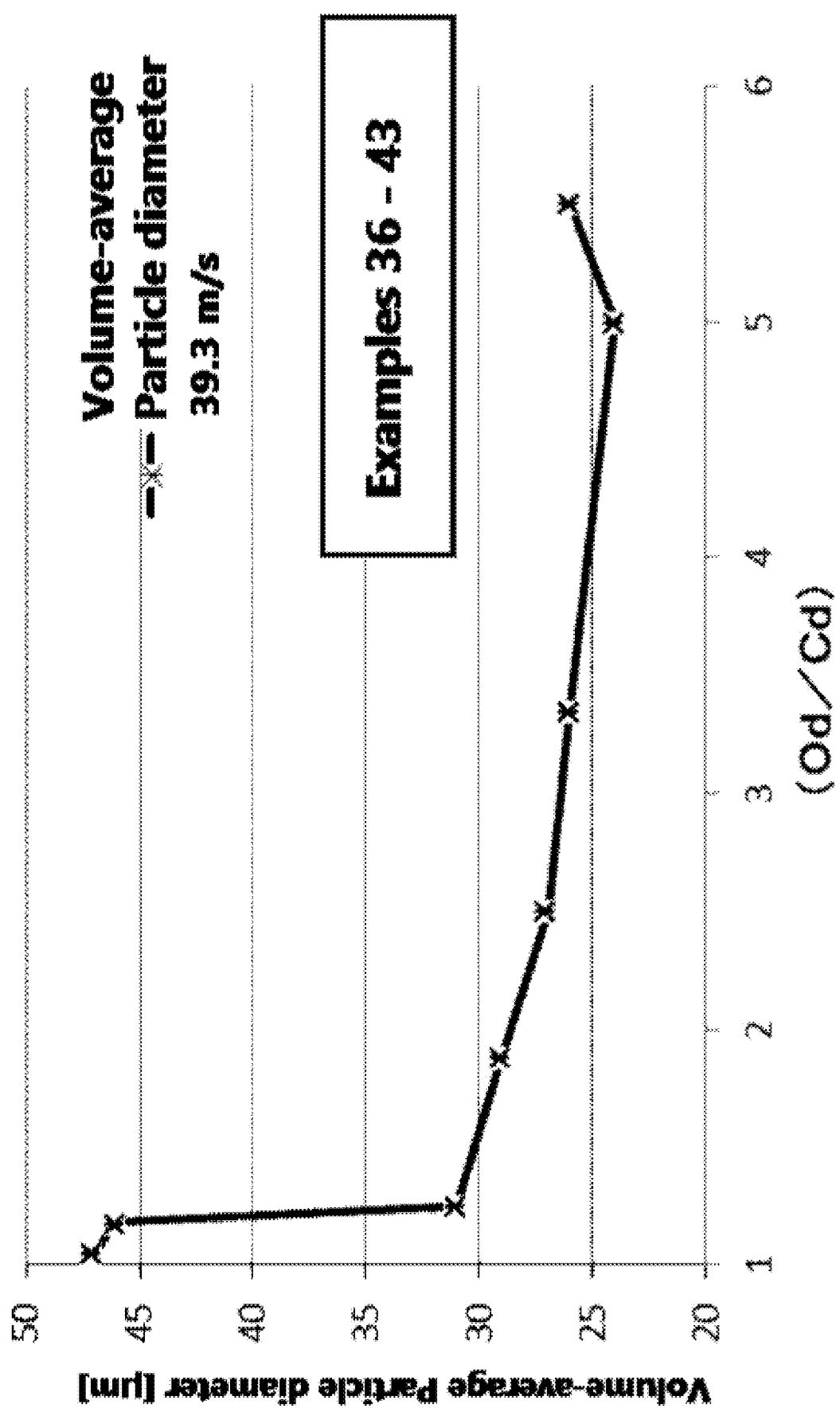
FIG. 21
This is a graph showing change of the volume-average particle diameter in the results of Examples 36 to 43.
Figure 22:
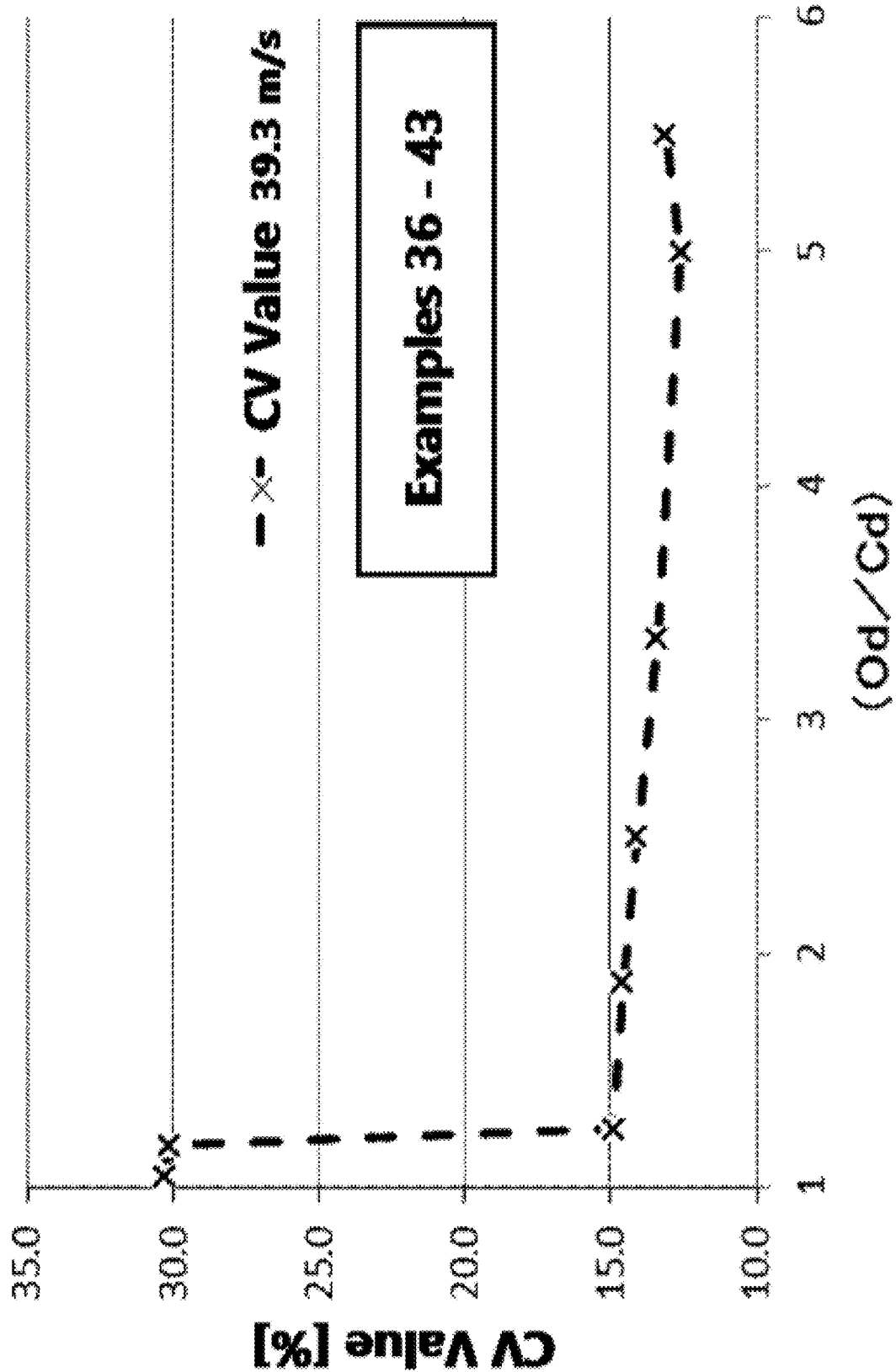
FIG. 22
This is a graph showing change of the CV value in the results of Examples 36 to 43.
Figure 23:
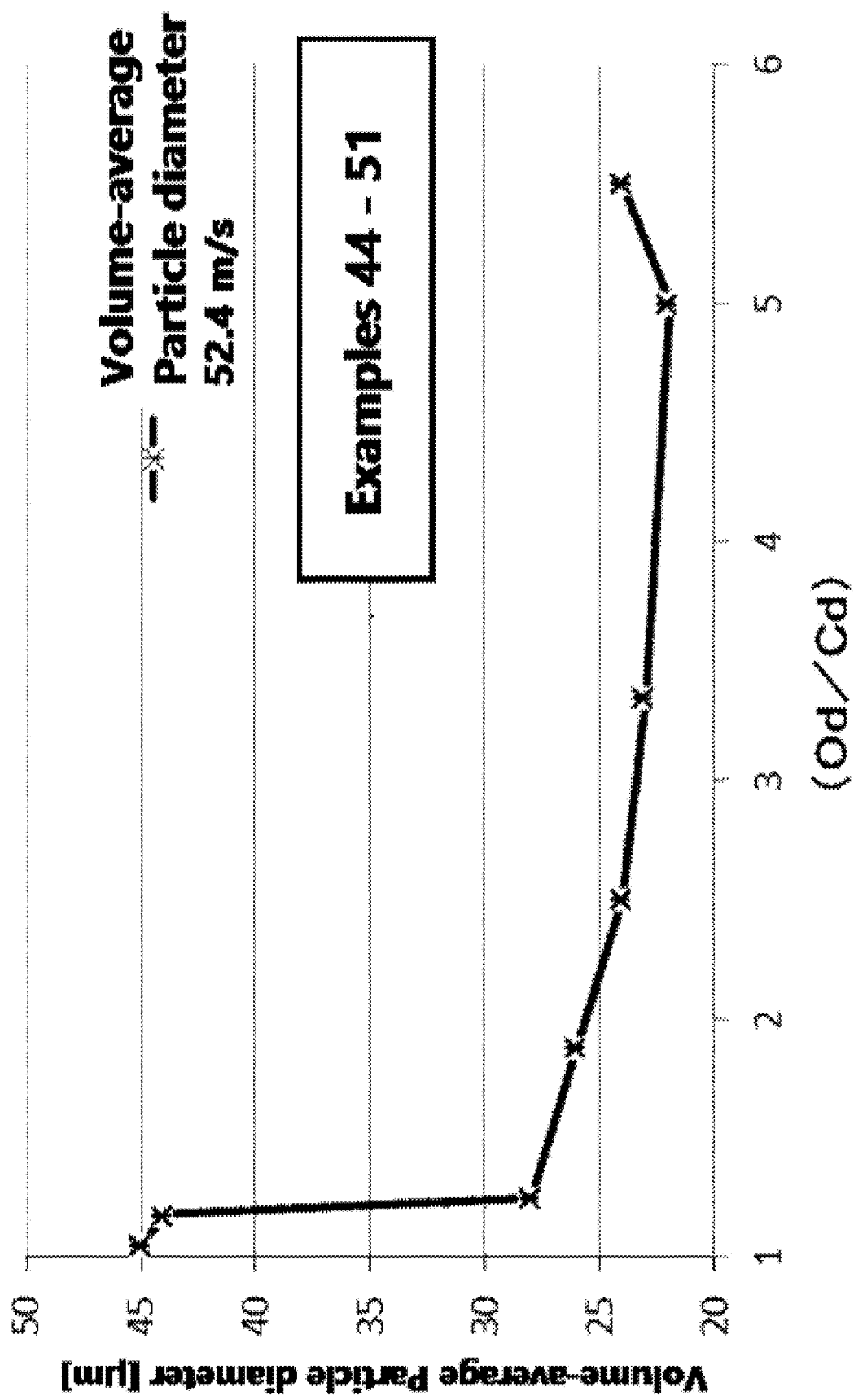
FIG. 23
This is a graph showing change of the volume-average particle diameter in the results of Examples 44 to 51.
Figure 24:
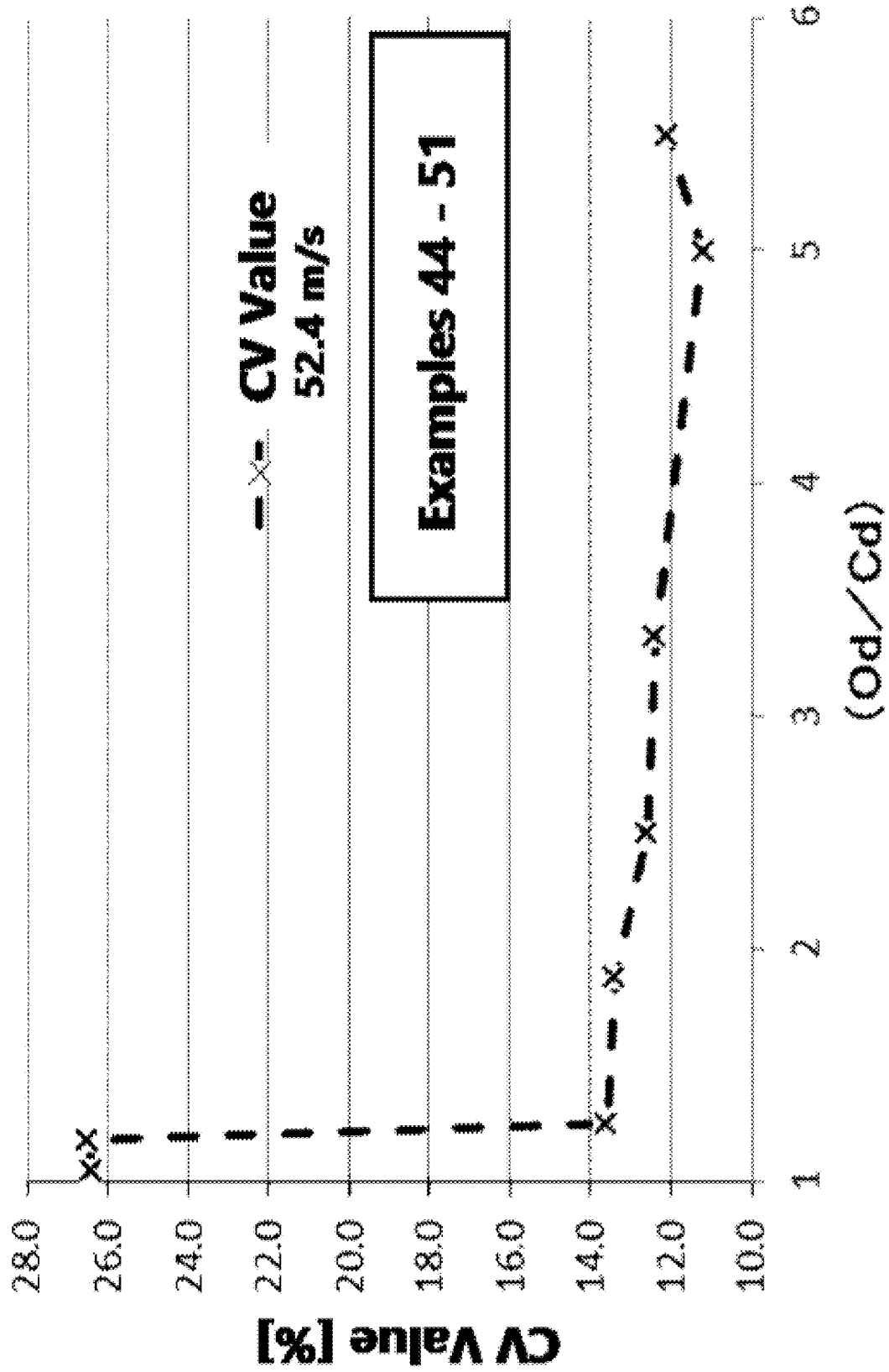
FIG. 24
This is a graph showing change of the CV value in the results of Examples 44 to 51.

While supplying the separating solvent (pure water) as the first fluid from the center with the supply pressure of 0.44 MPaG, the organic substance solution (3% by weight of copper phthalocyanine pigment powder/97% by weight of concentrated sulfuric acid (98% by weight of concentrated sulfuric acid was used)) was introduced as the second fluid into between the processing surfaces 1 and 2, whereby the first fluid and the second fluid were mixed in the thin film fluid. The process conditions of the first fluid and the second fluid are shown in Table 10; the supply conditions of the first fluid and the second fluid are shown in Table 11; the ratio (Od/Cd), the rotation number of the processing members, the circumferential velocity of the processing members (circumferential velocity of the outer circumference of the processing members), the particle diameter (D) of the obtained microparticles calculated by the method in the TEM observation, the crystallite diameter (d) calculated by the method in the XRD measurement, the ratio (d/D), and with regard to the crystallinity, the ratio relative to the crystallinity of Example 22 (crystallinity of each Example relative to the crystallinity of Example 22 as 1) are shown in Table 12. With regard to Examples 20 to 27 (except for Example 22), the crystallinity was calculated by the constant background method against Example 22 as the standard. The respective supply temperatures of the first fluid and the second fluid were measured just before the first fluid and the second fluid were introduced into the processing apparatus (in more detail, just before introduction into between the processing surfaces 1 and 2). Also pH of the first fluid was 6.89 and pH of the second fluid was 1 or less (the pH test paper was used). The temperature of the solution ejected from the processing surfaces was about 20° C. The CuPc microparticles in the solution after processing were settled and the supernatant solution thereof was removed. Thereafter, the microparticles were collected by using a filter cloth (opening of 1 μm); and washing operation with pure water was repeated for 5 times, and then a part of the wet cake of the obtained CuPc microparticles was dried at 25° C. under atmospheric pressure. As a result of the XRD measurement of the CuPc microparticle powders after drying, it was confirmed that the CuPc microparticles were obtained. A part of the obtained wet cake was diluted by an aqueous solution containing a surfactant (Neogen R-K), and then it was dispersed by using a high-speed emulsification/dispersion apparatus (CLM-0.8S, manufactured by M. Technique Co., Ltd.) to obtain the dispersion solution. By changing the ratio (Od/Cd) of the confluence part radius (Cd) at the point where the fluids to be processed are joined together between the processing surfaces to the discharge part radius (Od) formed between the processing surfaces, the particle diameter and the crystallite diameter were confirmed. In Table 12, the obtained results of Examples 20 to 27 are shown. With regard to the results thereof, the graph in which (Od/Cd) is plotted in the horizontal axis and the ratio (d/D) of the crystallite diameter to the particle diameter is plotted in the vertical axis is shown in FIG. 16; the graph in which (Od/Cd) is plotted in the horizontal axis and the crystallinity is plotted in the vertical axis is shown in FIG. 17; and the graph in which (Od/Cd) is plotted in the horizontal axis and the CV value is plotted in the vertical axis is shown in FIG. 18.

TABLE 10

| | First fluid recipe | | Second fluid recipe | |
|---|---|---|---|---|
| Example | Pure water Concentration [wt %] | [pH] | CuPc 98 wt% $H_2SO_4$ Concentration [wt %] | [pH] |
| 20 to 27 | 100.00 | 6.89 | 3.0   97.0 | <1 |

TABLE 11

| | First fluid | | Second fluid | |
|---|---|---|---|---|
| Example | Supply flow rate [ml/min] | Supply temperature [° C.] | Supply flow rate [ml/min] | Supply temperature [° C.] |
| 20 to 27 | 900 | 20 | 30 | 25 |

TABLE 12

| Example | Od/Cd | Ow/Iw | Rotation number [rpm] | Circumferential velocity [m/sec] | TEM particle diameter (D) [nm] | Crystallite diameter (d) [nm] | d/D | Crystallinity | C.V. value [%] |
|---|---|---|---|---|---|---|---|---|---|
| 20 | 1.05 | 0.44 | 4274 | 27.0 | 16.6 | 2.1 | 0.13 | 0.14 | 31.2 |
| 21 | 1.18 | 1.81 | 3820 | 27.2 | 16.8 | 2.1 | 0.13 | 0.14 | 30.4 |
| 22 | 1.25 | 2.55 | 3600 | 27.1 | 18.4 | 7.3 | 0.40 | 1 | 12.6 |
| 23 | 1.88 | 9.14 | 2400 | 27.2 | 16.9 | 7.6 | 0.45 | 1.19 | 12.5 |
| 24 | 2.50 | 15.73 | 1800 | 27.2 | 17.2 | 8.6 | 0.50 | 1.36 | 12.1 |
| 25 | 5.00 | 42.09 | 900 | 27.3 | 16.7 | 9.4 | 0.56 | 1.54 | 11.5 |
| 26 | 5.50 | 47.36 | 818 | 27.3 | 16.8 | 9.1 | 0.54 | 1.51 | 11.2 |
| 27 | 6.00 | 52.64 | 750 | 27.3 | 16.7 | 9.2 | 0.55 | 1.53 | 11.4 |

Meanwhile, in Examples 20 to 27, the confluence part radius (Cd) was fixed at 58 mm, while the discharge part radius (Od) was changed so as to give the respective ratios.

From Table 12 and FIG. 16, FIG. 17, and FIG. 18, under the condition of the constant circumferential velocity of the processing members, it was confirmed that by controlling the ratio (Od/Cd), growth of the crystallites and the crystallinity of the CuPc microparticles can be controlled with controlling the particle diameter thereof. In addition, it was confirmed that comparing with the growing degree of the crystallite diameter, the growing degree of the particle diameter can be controlled much more. Accordingly, it was confirmed that the ratio (d/D) of the crystallite diameter to the particle diameter of the CuPc microparticles can be controlled. From FIG. 16 and FIG. 17, it can be seen that by increasing the ratio (Od/Cd), the ratio (d/D) is prone to increase; and in addition, it can be seen that by increasing the ratio (Od/Cd), the crystallinity thereof is prone to increase. From FIG. 18, it can be seen that by increasing the ratio (Od/Cd), the CV value can be decreased. And it was confirmed that these tendencies can be maintained even if the confluence part radius (Cd) is changed.

Moreover, in each Example shown above, as shown in Table 3, Table 6, Table 9, and Table 12, it was confirmed that by increasing or decreasing the width ratio (Ow/Iw) of the width (Ow) of the mixing region to the width (Iw) of the thin film controlling region, the crystallinity control to increase or decrease the crystallinity of the microparticles, the d/D control to increase or decrease the ratio (d/D) of the crystallite diameter (d) to the particle diameter (D) of the microparticles, and the CV value control to control the particle size distribution of the microparticles can be carried out.

Examples 28 to 51

In Examples 28 to 51, examples of obtaining an emulsion from two kinds of fluids to be processed by using the apparatus shown in FIG. 1, FIG. 4(A), and FIG. 4(B) are shown. The emulsification was carried out by using the aqueous solution of 2% Tween 80 as the first fluid, and the liquid paraffin as the second fluid. The process conditions and results thereof are shown in Table 13 to Table 15. Examples 28 to 35 belong to the group with the circumferential velocity of 26.2 m/sec, Examples 36 to 43 belong to the group with the circumferential velocity of 39.3 m/sec, and Examples 44 to 51 belong to the group with the circumferential velocity of 52.4 m/sec. In FIG. 19 to FIG. 24, the ratio Od/Cd is plotted in the horizontal axis, and the volume-average particle diameter and the CV value are plotted in the vertical axis in each group.

When the ratio Od/Cd was small, unintended (uncontrollable) downsizing of the particles due to cavitation, generation of coarse particles due to short processing time, and the like were confirmed, suggesting possibility that the processing could not be carried out stably; on the other hand, when the ratio Od/Cd was changed so as to give a large value thereof, the particle diameter could be controlled and the CV value could be decreased. With regard to the rotation number, even at a low rotation number, the particle diameter equivalent to that of the particles obtained at a high rotation number was obtained; and thus, it became clear that the intended particles can be obtained with a low energy.

TABLE 13

| | First fluid recipe | | Second fluid recipe |
|---|---|---|---|
| Example | Pure water Concentration [wt %] | Tween 80 Concentration [wt %] | Liquid paraffin Concentration [wt %] |
| 28 to 51 | 98.0 | 2.0 | 100.0 |

TABLE 14

| | First fluid | | Second fluid | |
|---|---|---|---|---|
| Example | Supply flow rate [ml/min] | Supply temperature [° C.] | Supply flow rate [ml/min] | Supply temperature [° C.] |
| 28 to 51 | 50 | 20 | 1 | 20 |

TABLE 15

| Example | Od/Cd | Ow/Iw | Rotation number [rpm] | Circumferential velocity [m/sec] | Volume-average particle diameter [μm] | CV value [%] |
|---|---|---|---|---|---|---|
| 28 | 1.05 | 0.43 | 5957 | 26.2 | 0.50 | 36.4 |
| 29 | 1.18 | 1.92 | 5301 | 26.2 | 0.48 | 32.4 |
| 30 | 1.25 | 2.73 | 5000 | 26.2 | 0.35 | 15.4 |
| 31 | 1.88 | 9.98 | 3327 | 26.2 | 0.33 | 15.1 |
| 32 | 2.50 | 17.11 | 2502 | 26.2 | 0.31 | 14.6 |
| 33 | 3.35 | 26.89 | 1867 | 26.2 | 0.28 | 14.3 |
| 34 | 5.00 | 45.88 | 1251 | 26.2 | 0.26 | 14.1 |
| 35 | 5.50 | 51.63 | 1137 | 26.2 | 0.29 | 14.9 |
| 36 | 1.05 | 0.43 | 8935 | 39.3 | 0.47 | 30.3 |
| 37 | 1.18 | 1.92 | 7951 | 39.3 | 0.46 | 30.1 |
| 38 | 1.25 | 2.73 | 7500 | 39.3 | 0.31 | 14.9 |
| 39 | 1.88 | 9.98 | 4991 | 39.3 | 0.29 | 14.6 |
| 40 | 2.50 | 17.11 | 3753 | 39.3 | 0.27 | 14.1 |
| 41 | 3.35 | 26.89 | 2801 | 39.3 | 0.26 | 13.4 |
| 42 | 5.00 | 45.88 | 1876 | 39.3 | 0.24 | 12.6 |
| 43 | 5.50 | 51.63 | 1706 | 39.3 | 0.26 | 13.1 |
| 44 | 1.05 | 0.43 | 11914 | 52.4 | 0.45 | 26.4 |
| 45 | 1.18 | 1.92 | 10601 | 52.4 | 0.44 | 26.5 |
| 46 | 1.25 | 2.73 | 10000 | 52.4 | 0.28 | 13.6 |
| 47 | 1.88 | 9.98 | 6654 | 52.4 | 0.26 | 13.4 |
| 48 | 2.50 | 17.11 | 5004 | 52.4 | 0.24 | 12.6 |
| 49 | 3.35 | 26.89 | 3734 | 52.4 | 0.23 | 12.4 |
| 50 | 5.00 | 45.88 | 2502 | 52.4 | 0.22 | 11.2 |
| 51 | 5.50 | 51.63 | 2274 | 52.4 | 0.24 | 12.1 |

Examples 52 to 59

In Examples 52 to 59, examples of obtaining an organic compound by the organic reaction (Friedel-Craft alkylation reaction) from two kinds of fluids to be processed by using the apparatus shown in FIG. 1, FIG. 4(A), and FIG. 4(B) are shown.

Figure 25:
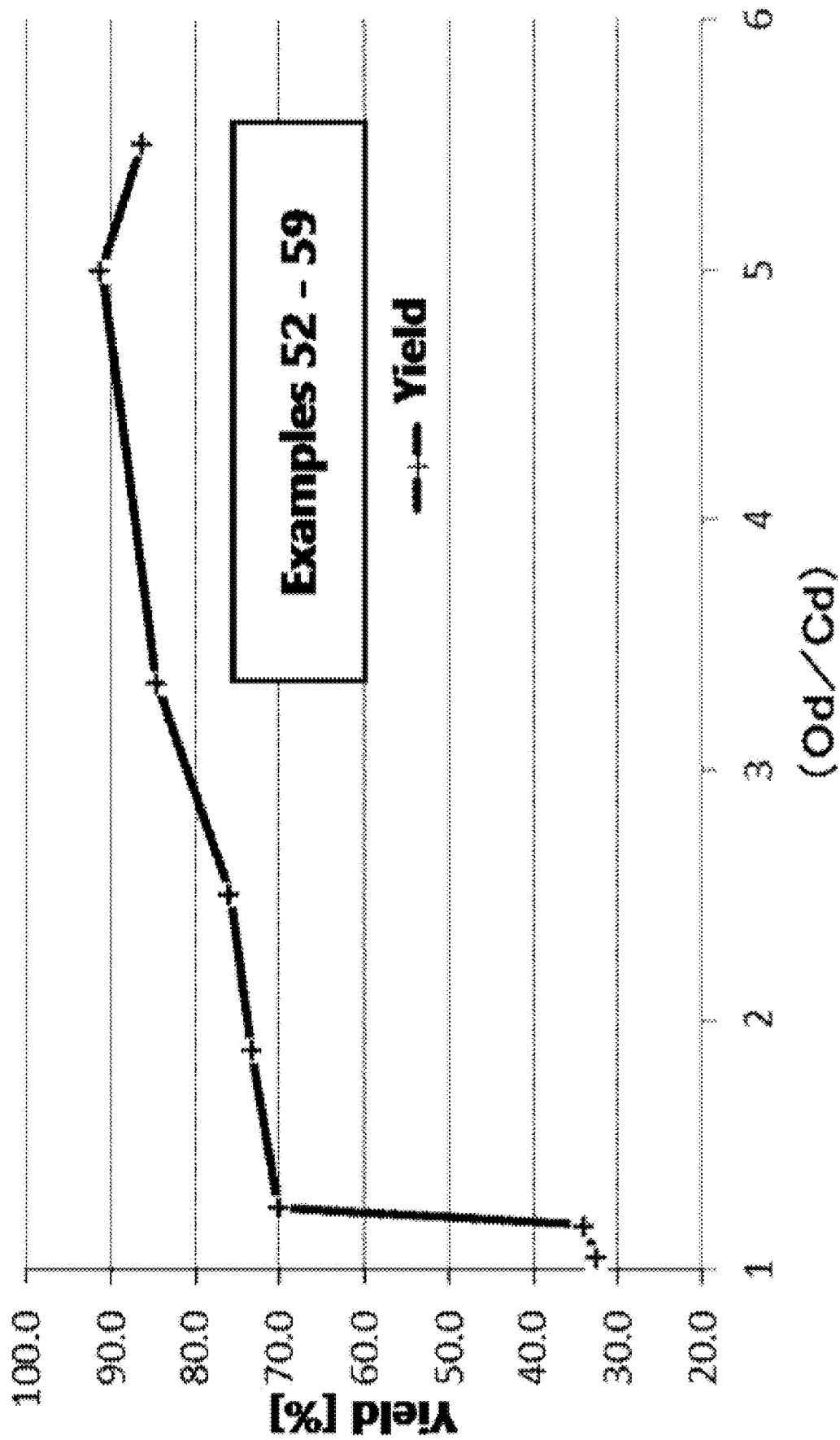
FIG. 25
This is a graph showing change of the yield in the results of Examples 52 to 59.
Figure 26:
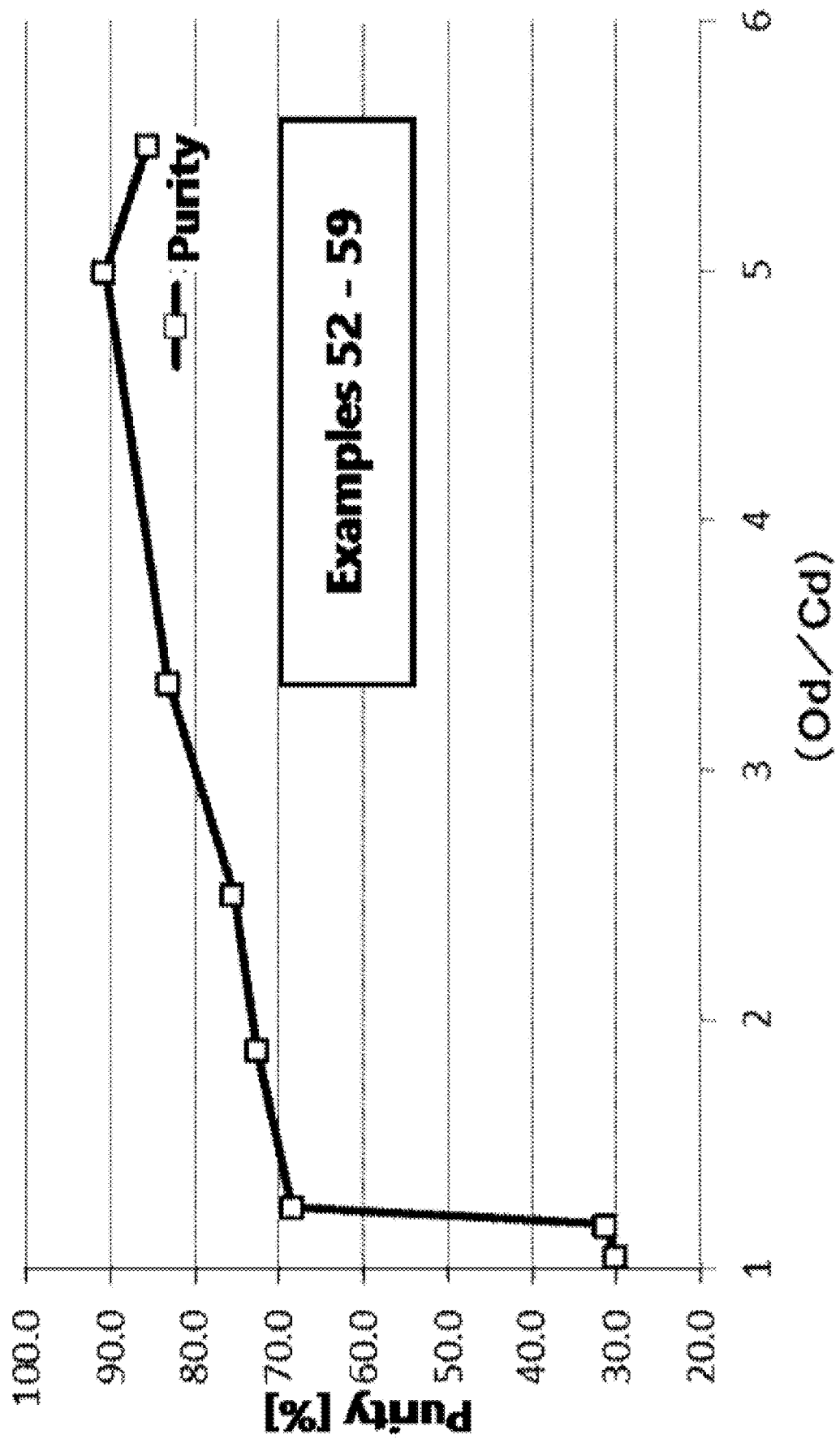
FIG. 26
This is a graph showing change of the purity in the results of Examples 52 to 59.

While introducing 96% concentrated sulfuric acid as the first fluid from the inside introduction part at the rate of 500 mL/min, a mixed solution of benzene and cyclohexene with the volume ratio of benzene/cyclohexene=4/5 was introduced as the second fluid from the intermediate introduction part into between the processing surfaces at the rate of 560 mL/min. The process conditions and the results thereof are shown in Table 16 to Table 18. The relationships between Od/Cd and the yield and between Od/Cd and the purity are shown in graphs of FIG. 25 and FIG. 26, respectively. It was confirmed that the yield and the purity each is increased with increase of Od/Cd.

TABLE 16

| | First fluid recipe | Second fluid recipe | |
|---|---|---|---|
| Example | 98% Concentrated sulfuric acid Concentration [wt %] | Benzene Concentration [v %] | Cyclohexene Concentration [v %] |
| 52 to 59 | 100.0 | 44.4 | 55.6 |

TABLE 17

| | First fluid | | Second fluid | |
|---|---|---|---|---|
| Example | Supply flow rate [ml/min] | Supply temperature [° C.] | Supply flow rate [ml/min] | Supply temperature [° C.] |
| 52 to 59 | 500 | 25 | 560 | 25 |

TABLE 18

| Example | Od/Cd | Ow/Iw | Rotation number [rpm] | Circumferential velocity [m/sec] | Yield [%] | Purity [%] |
|---|---|---|---|---|---|---|
| 52 | 1.05 | 0.43 | 1191 | 5.24 | 32.6 | 30.1 |
| 53 | 1.18 | 1.92 | 1060 | 5.24 | 33.9 | 31.2 |
| 54 | 1.25 | 2.73 | 1000 | 5.24 | 70.1 | 68.4 |
| 55 | 1.88 | 9.98 | 665 | 5.24 | 73.4 | 72.6 |
| 56 | 2.50 | 17.11 | 500 | 5.24 | 75.9 | 75.4 |
| 57 | 3.35 | 26.89 | 373 | 5.24 | 84.6 | 83.2 |
| 58 | 5.00 | 45.88 | 250 | 5.24 | 91.2 | 90.6 |
| 59 | 5.50 | 51.63 | 227 | 5.24 | 86.4 | 85.6 |

Examples 60 to 67

By using the apparatus shown in FIG. 1 and FIG. 5(A) and applying a temperature energy to one kind of fluid to be processed, the aciclovir microparticles were obtained by separation.

Figure 27:
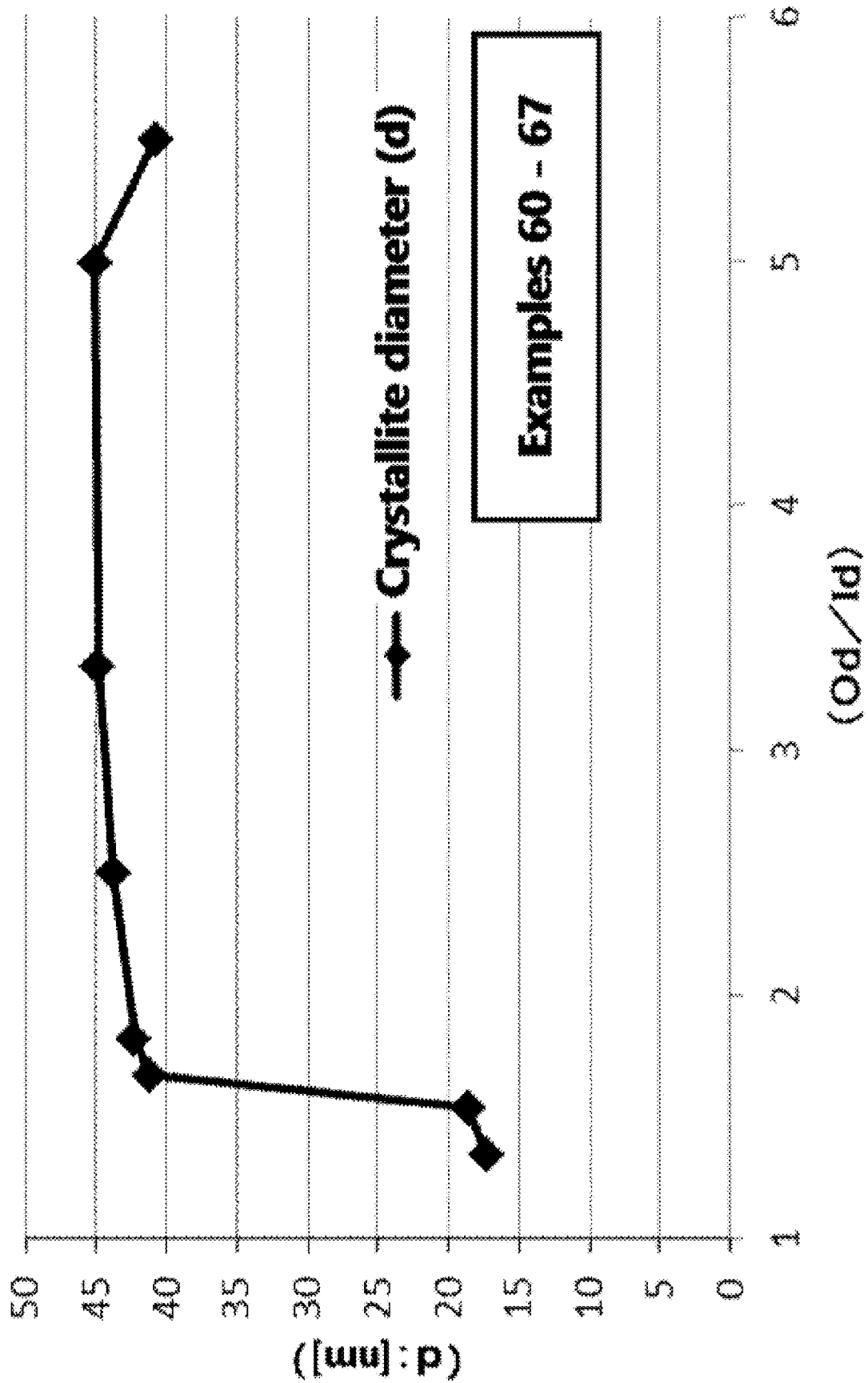
FIG. 27
This is a graph showing change of the crystallite diameter (d) in the results of Examples 60 to 67.
Figure 28:
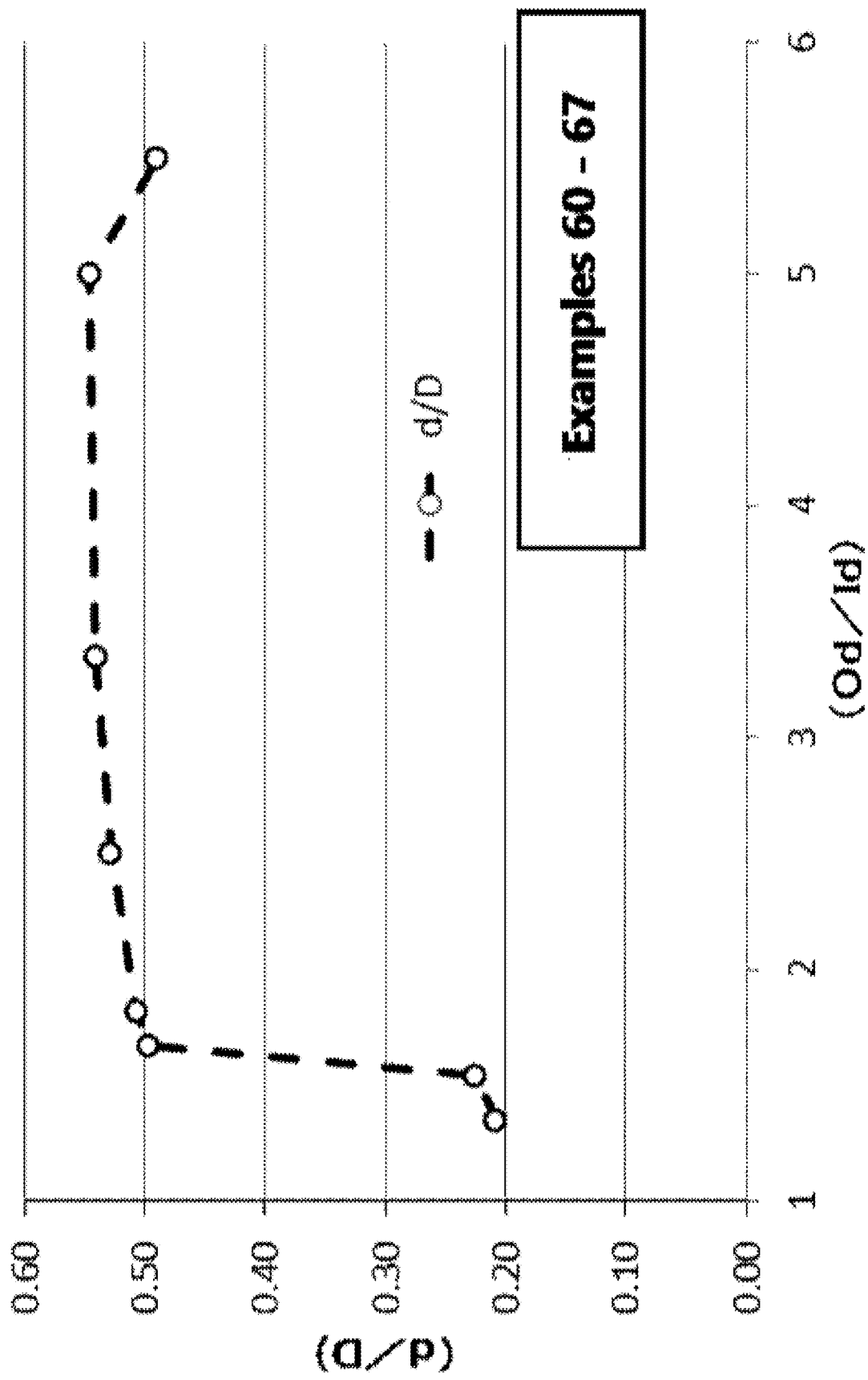
FIG. 28
This is a graph showing change of the ratio (d/D) of the crystallite diameter to the particle diameter in the results of Examples 60 to 67.
Figure 29:
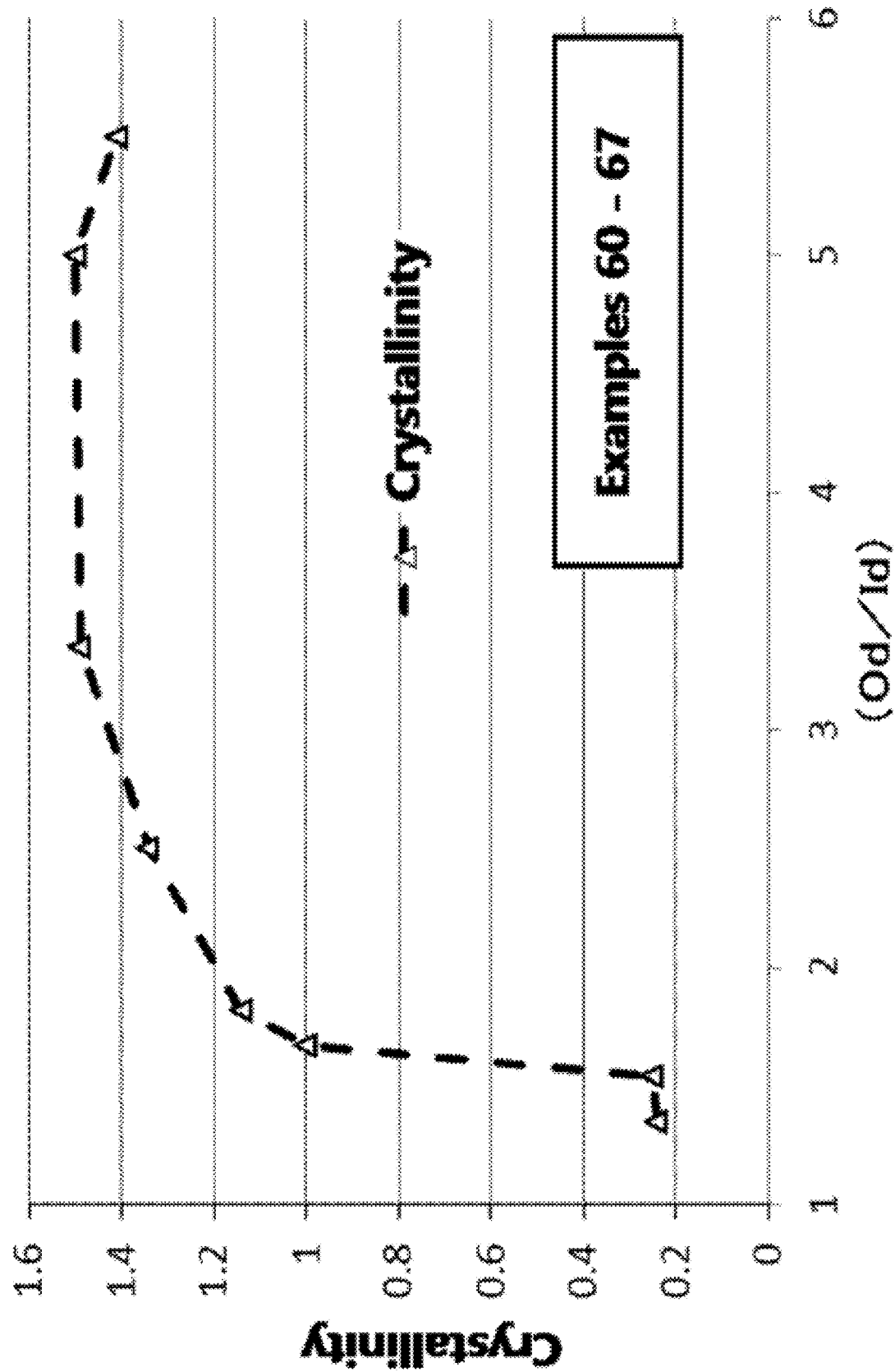
FIG. 29
This is a graph showing change of the crystallinity in the results of Examples 60 to 67.
Figure 30:
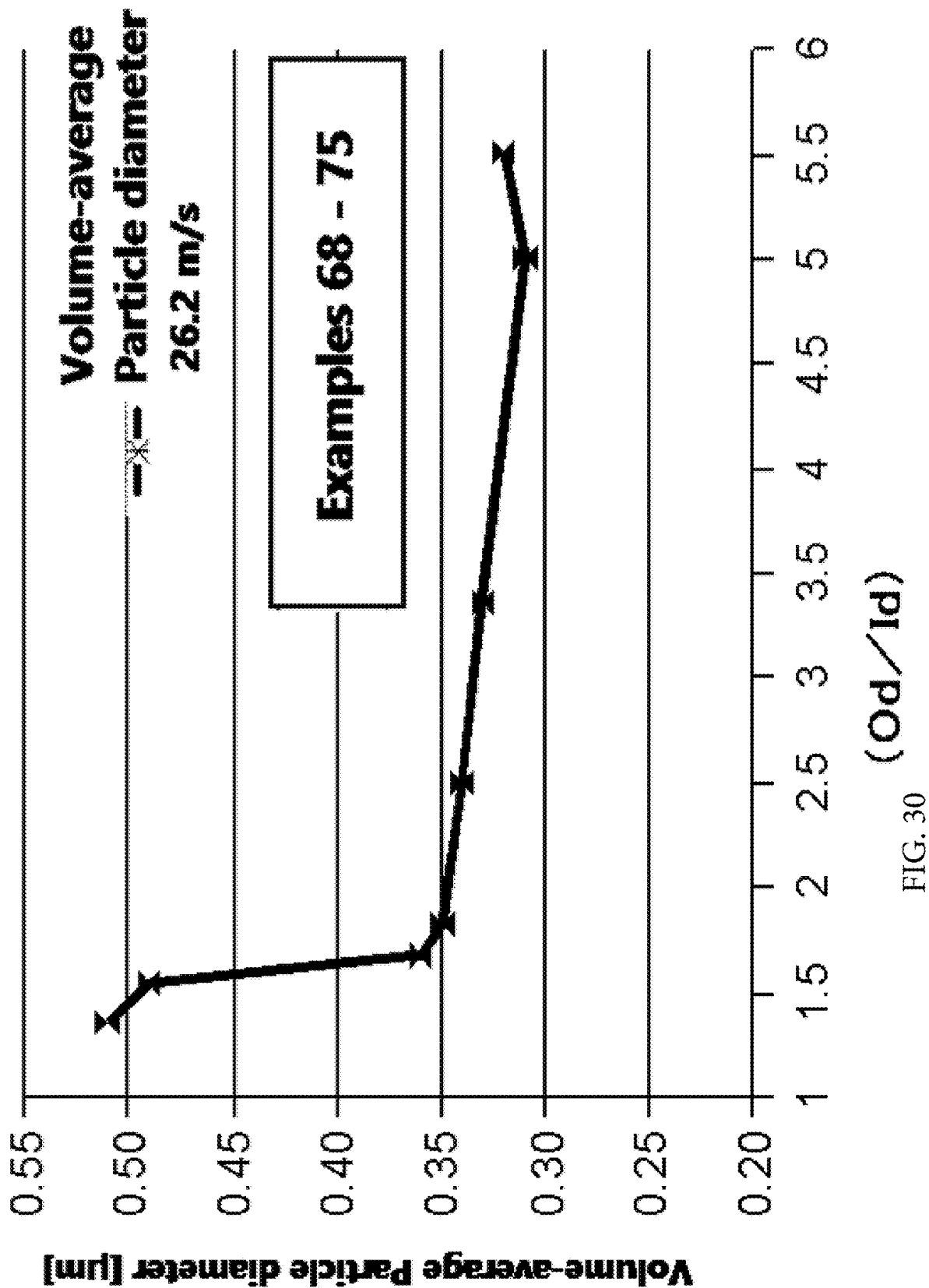
FIG. 30
Figure 31:
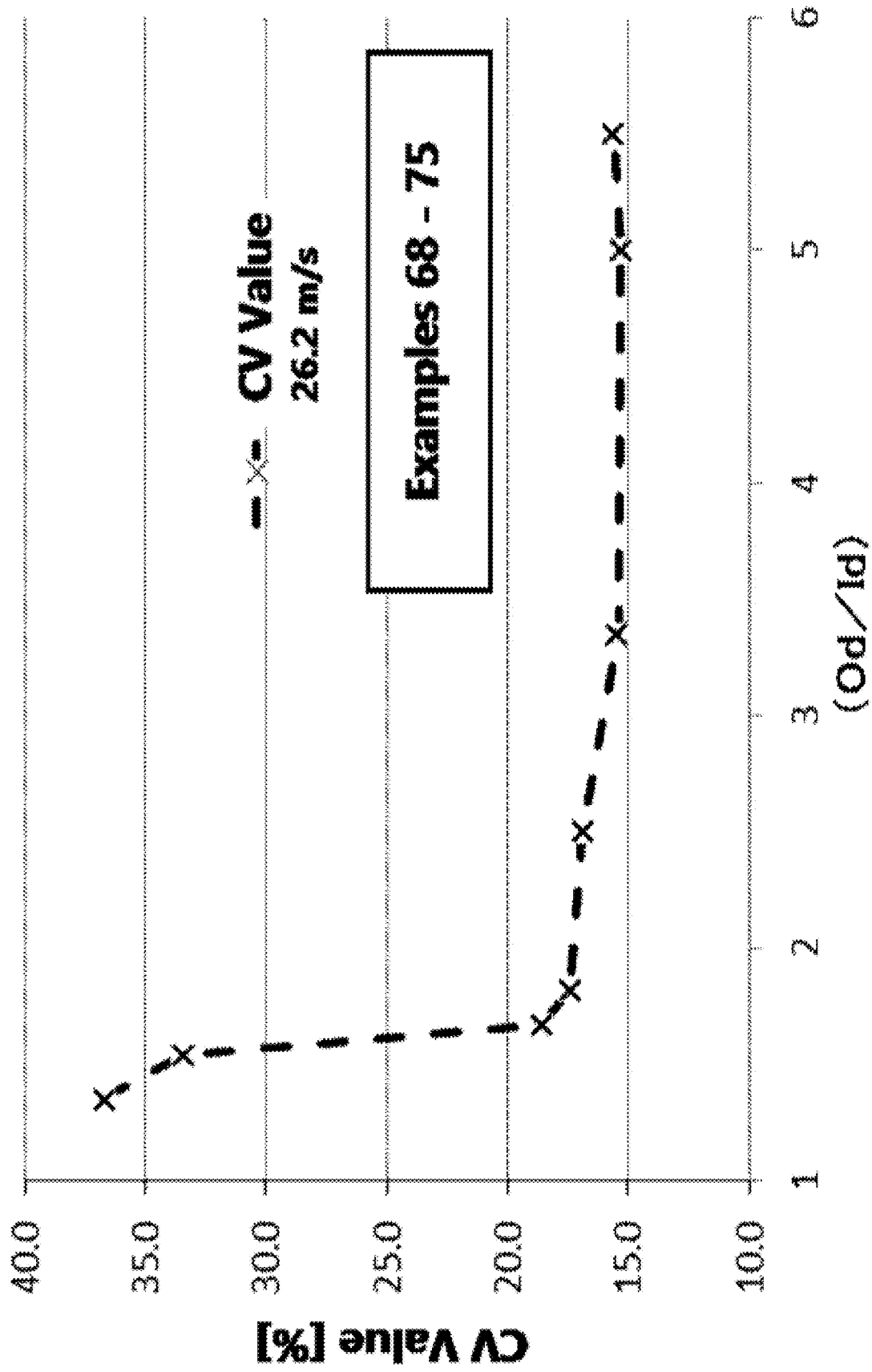
Figure 32:
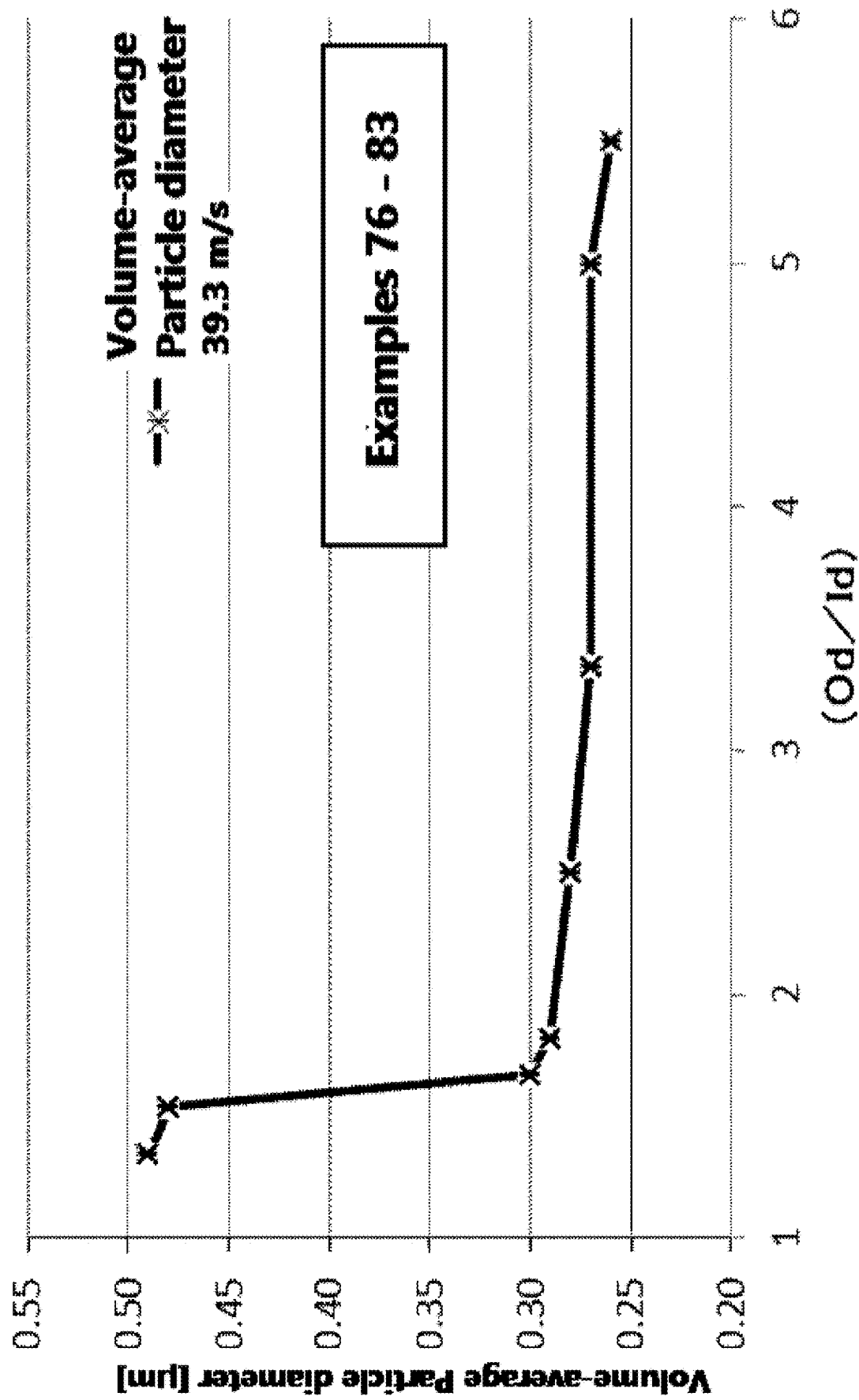
Figure 33:
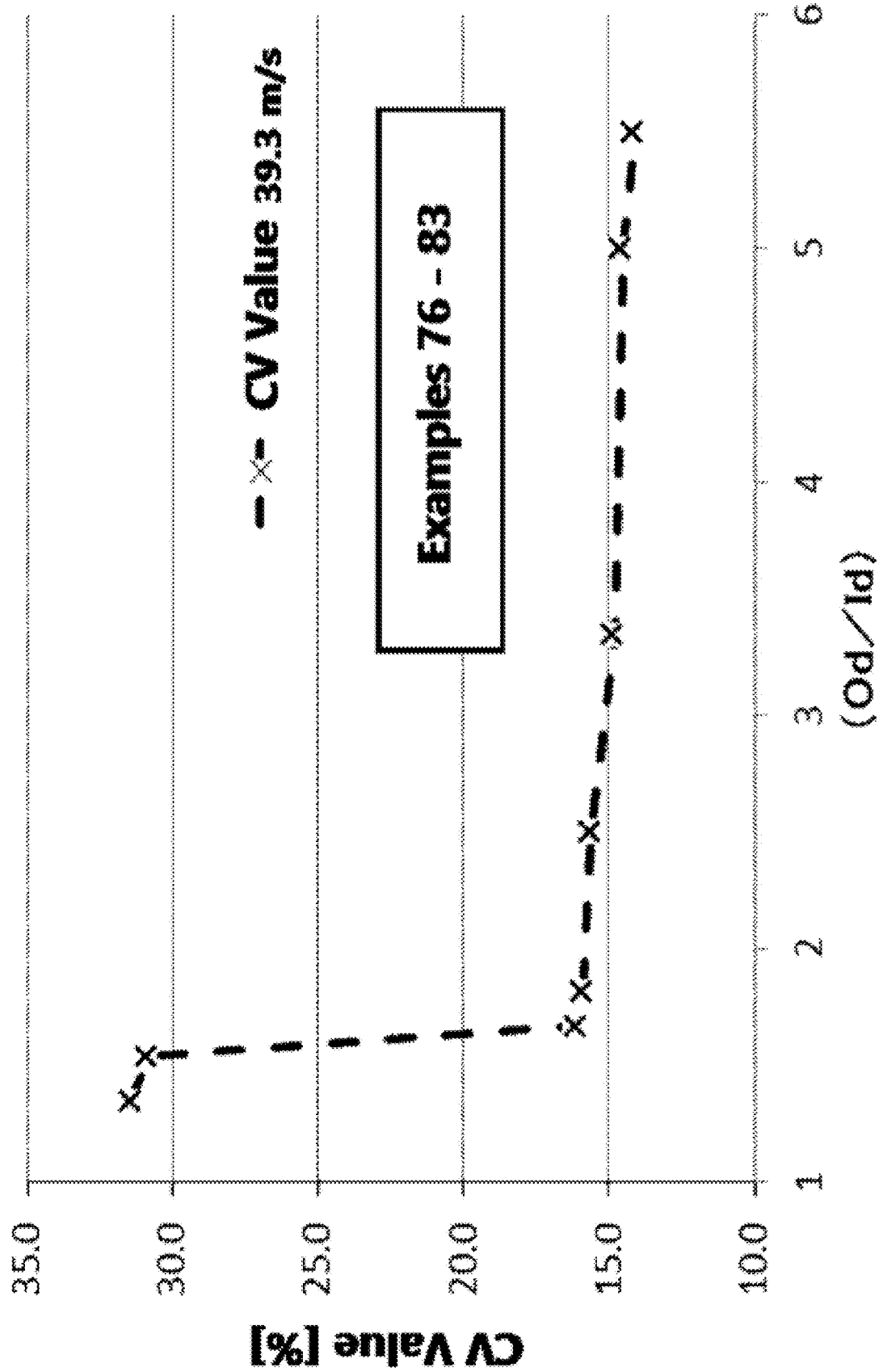
Figure 34:
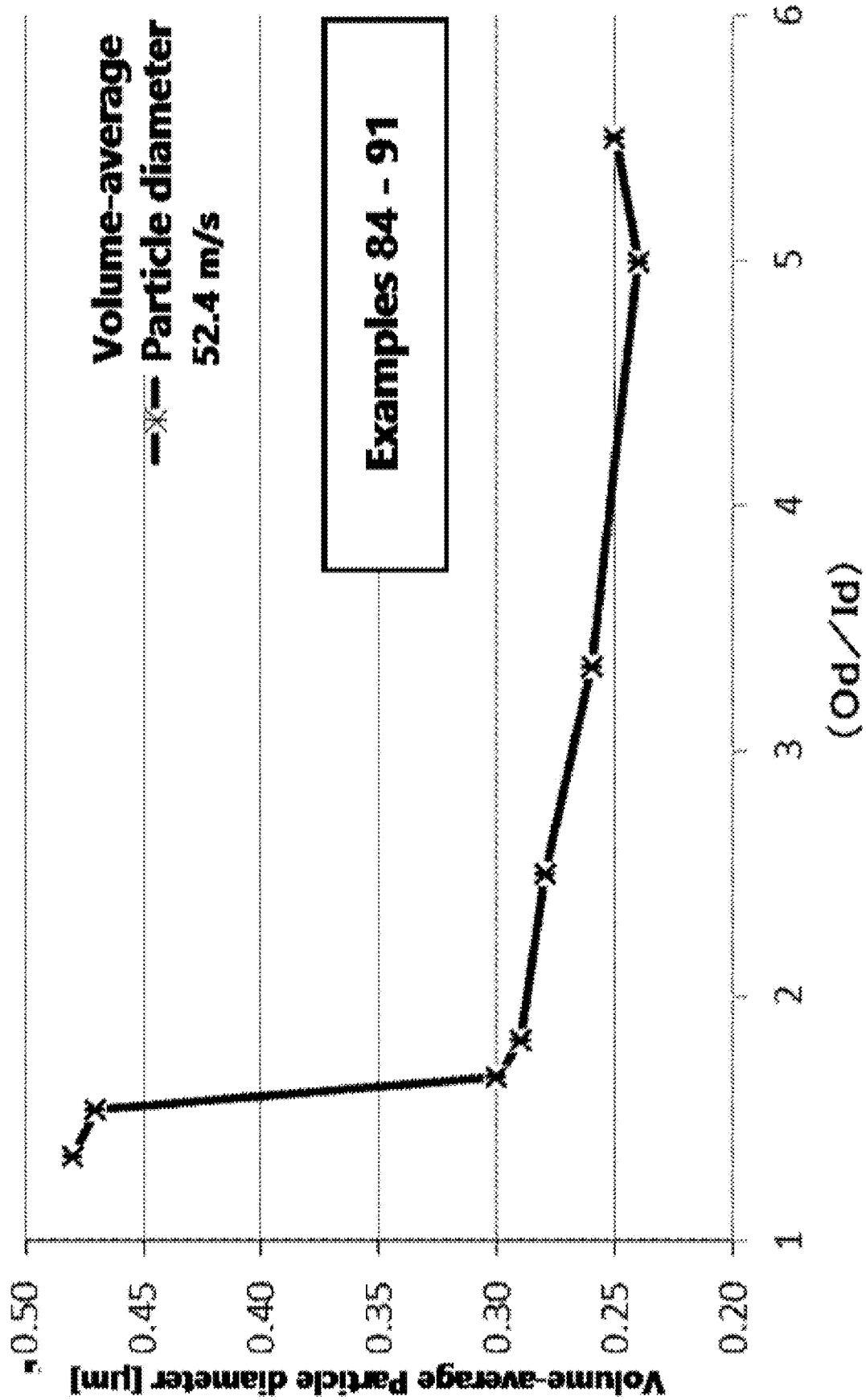
Figure 35:
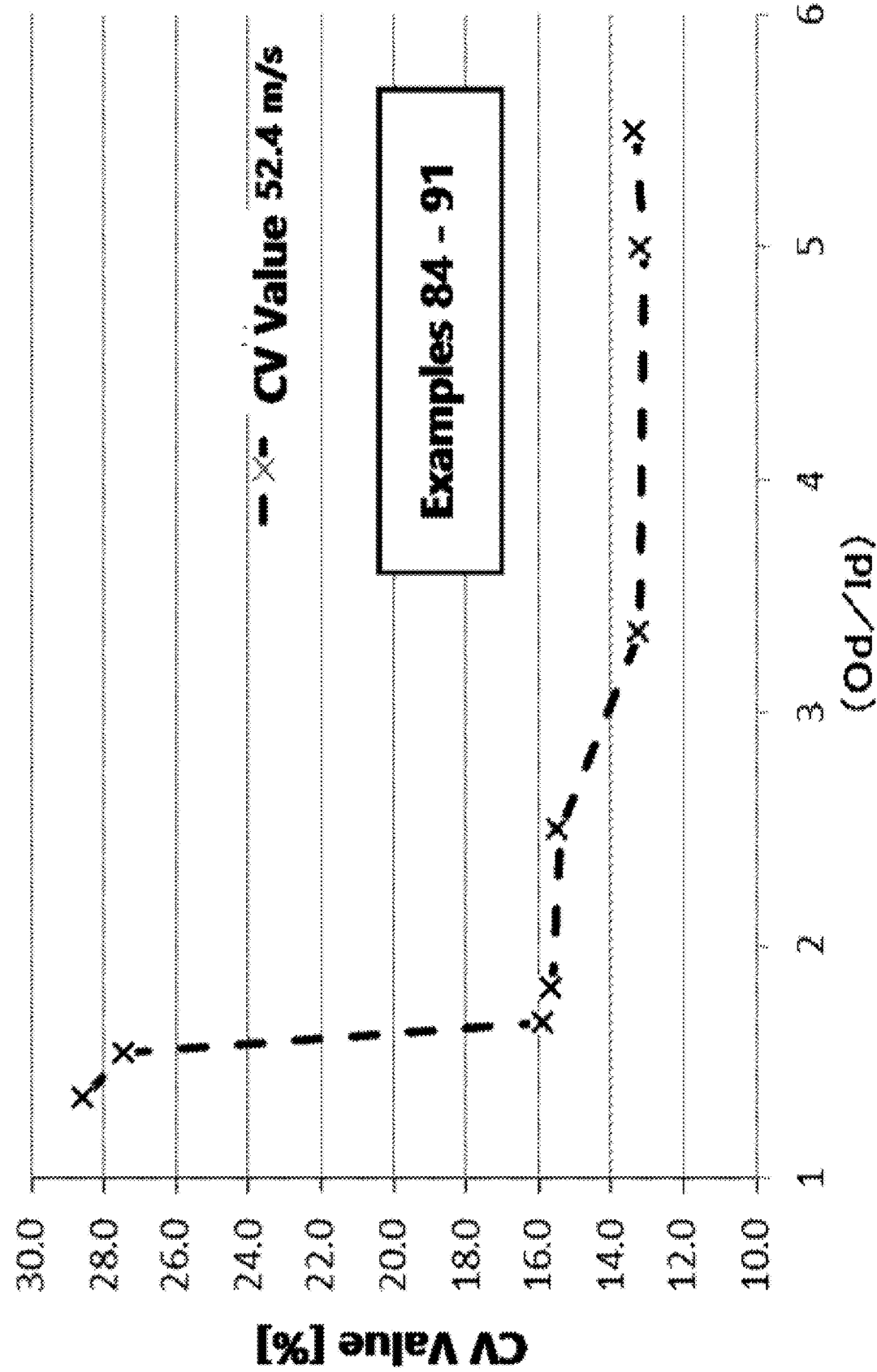
Figure 36:
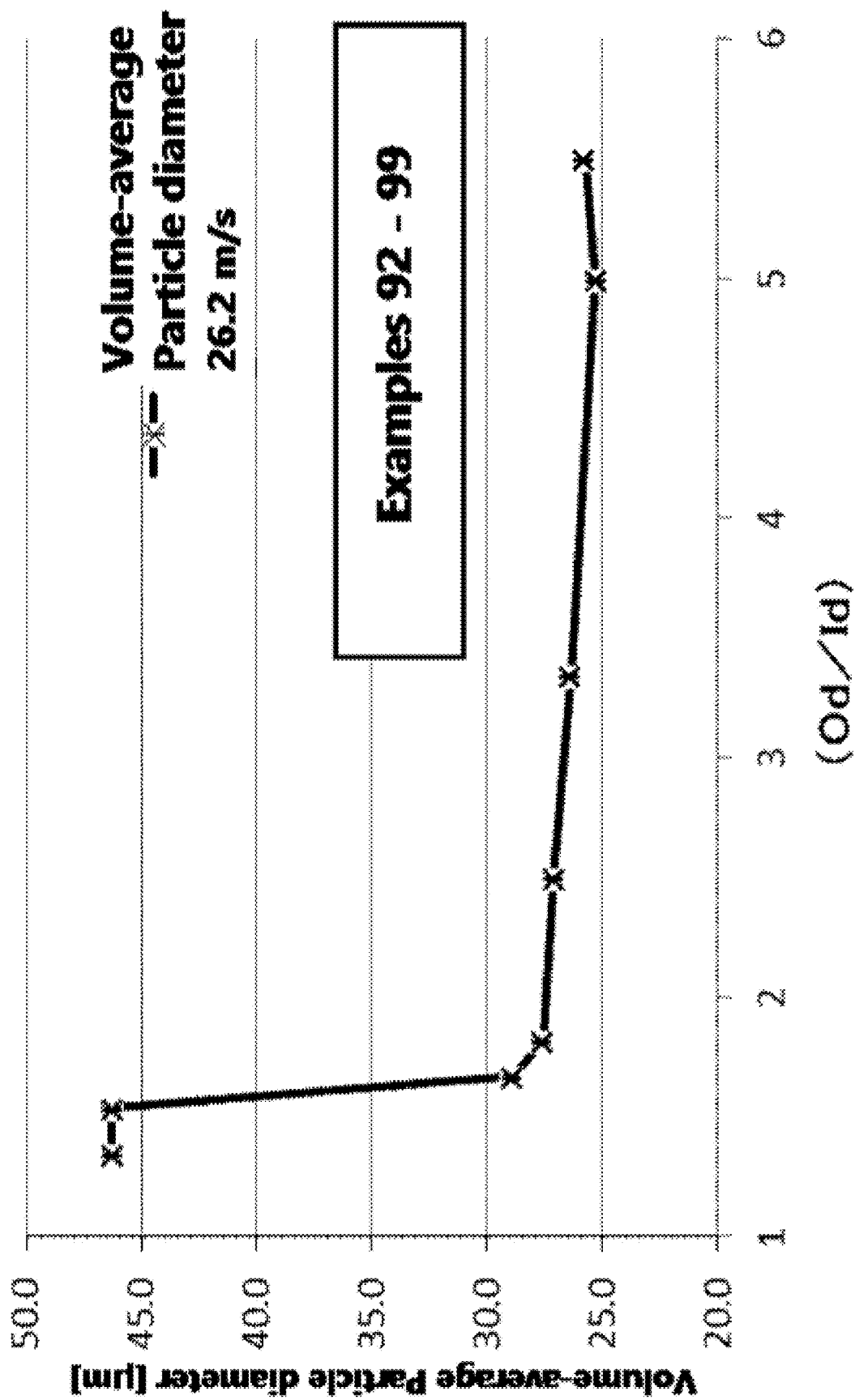
Figure 37:
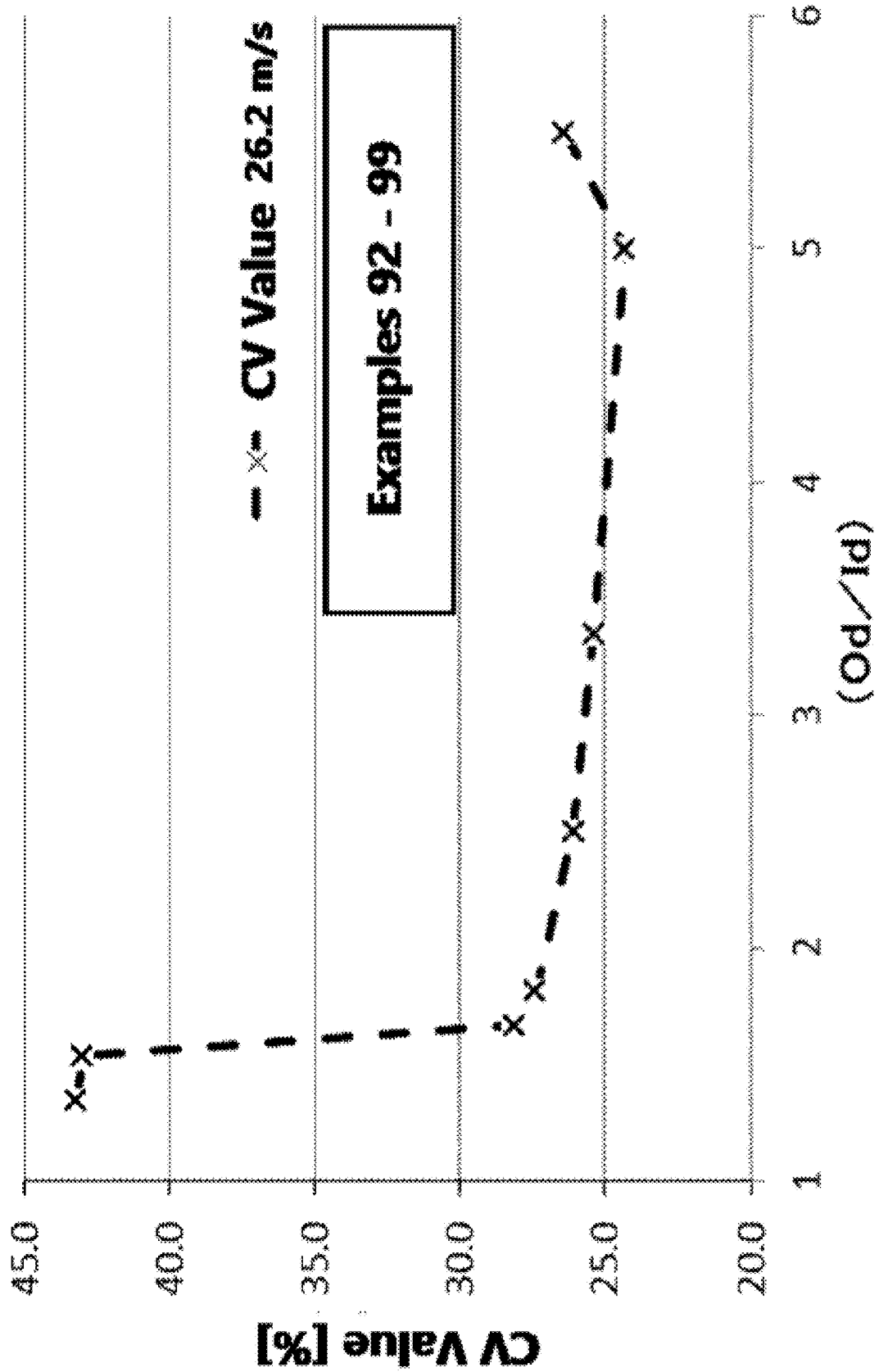
Figure 38:
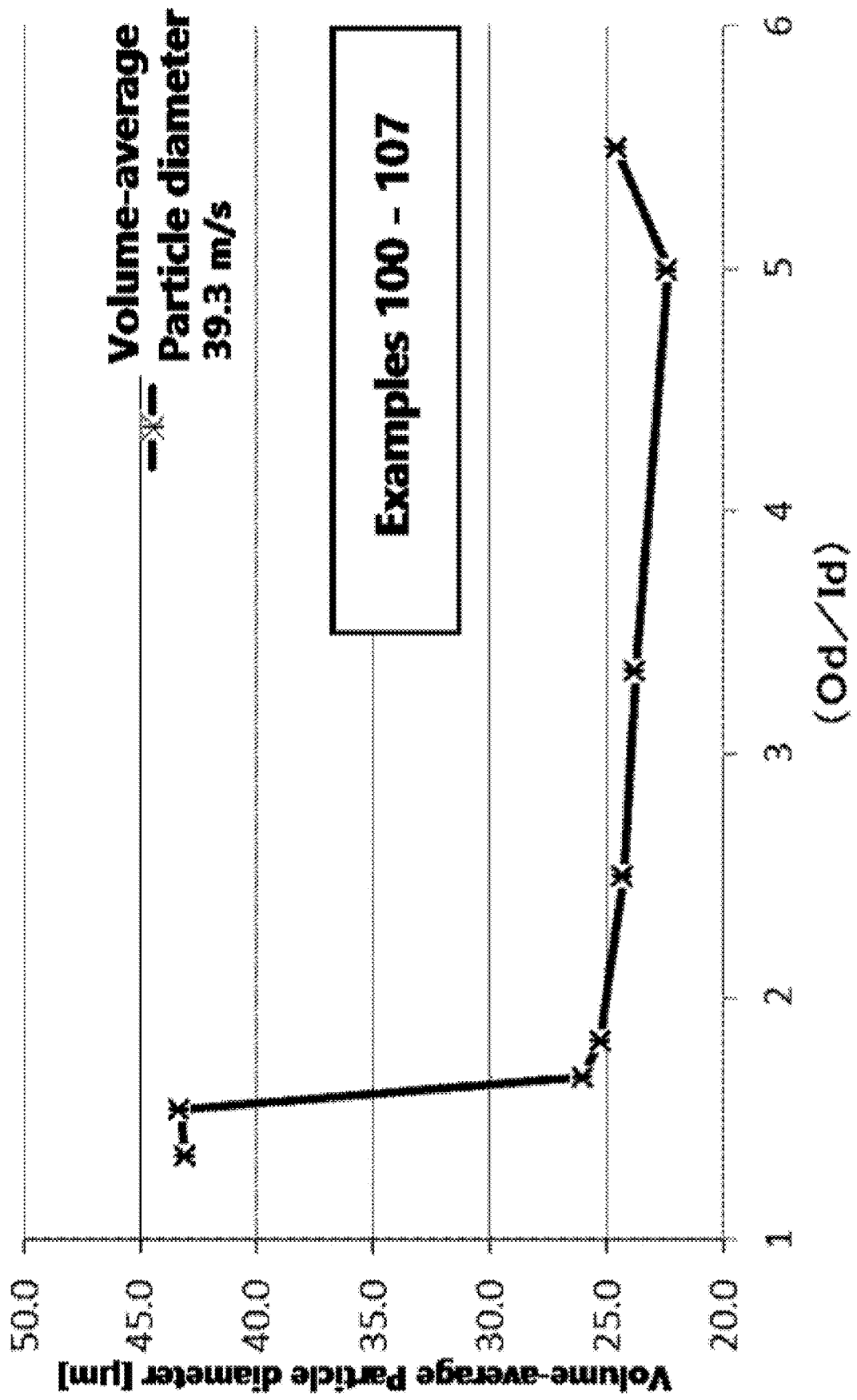
Figure 39:
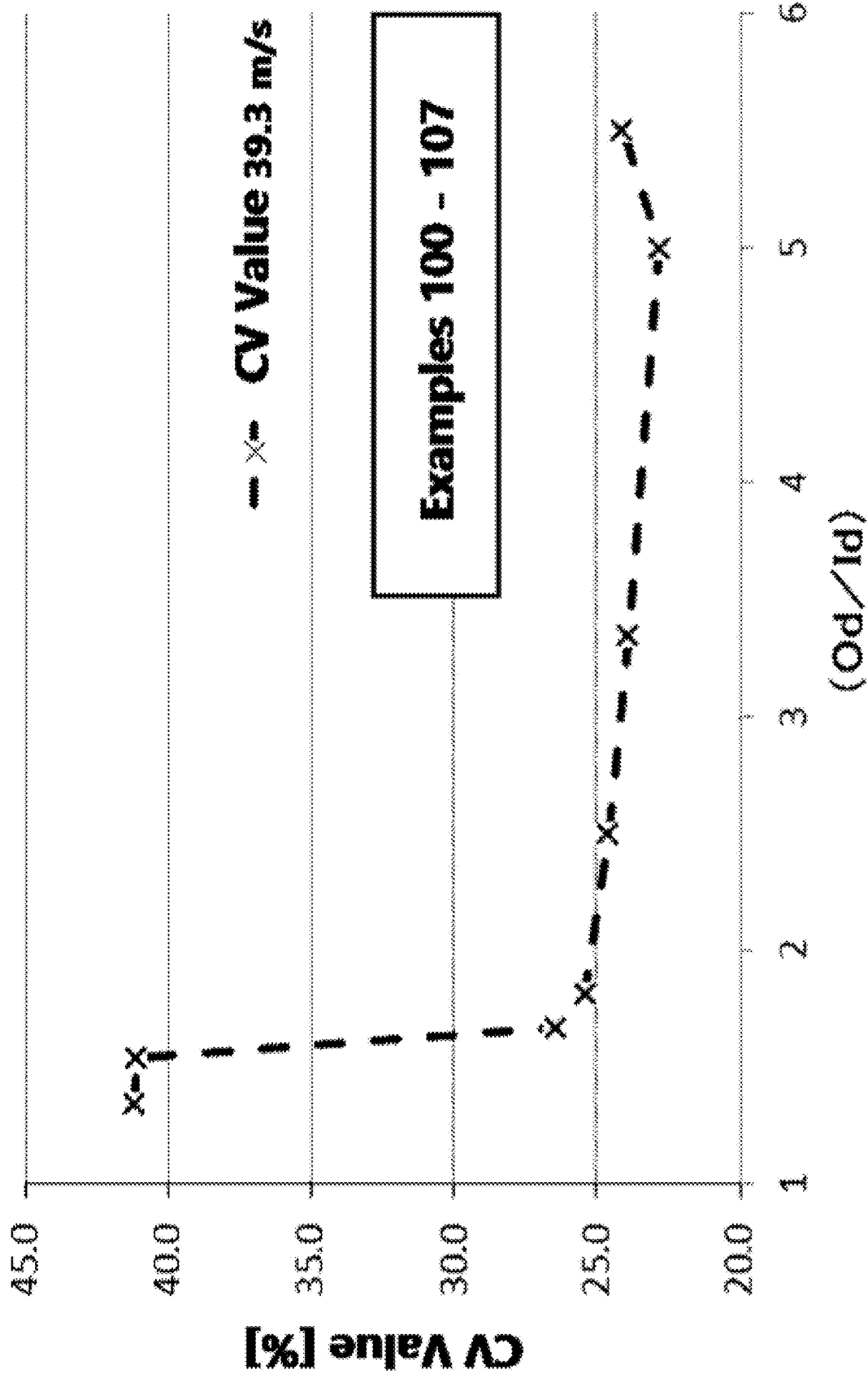
Figure 40:
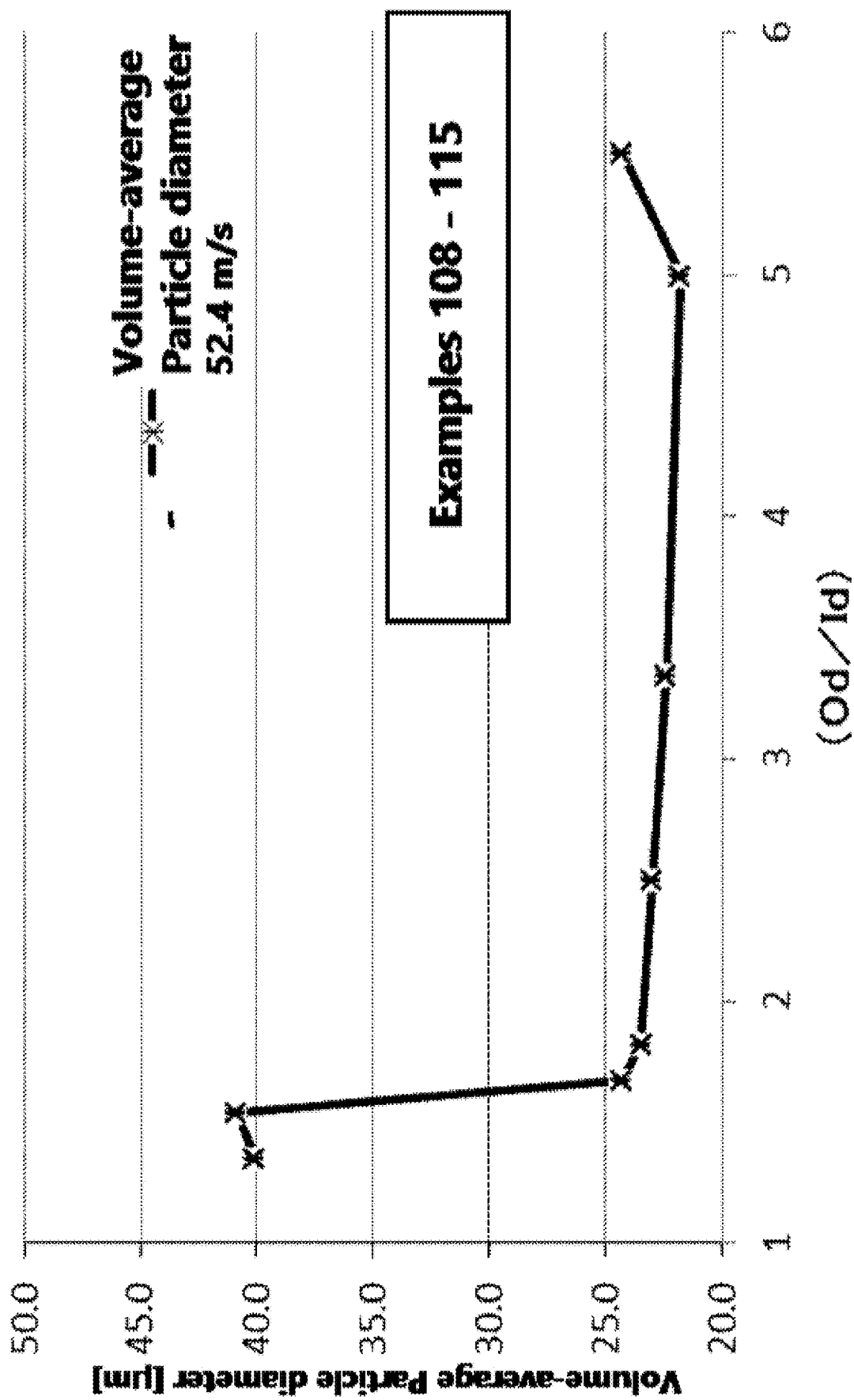
Figure 41:
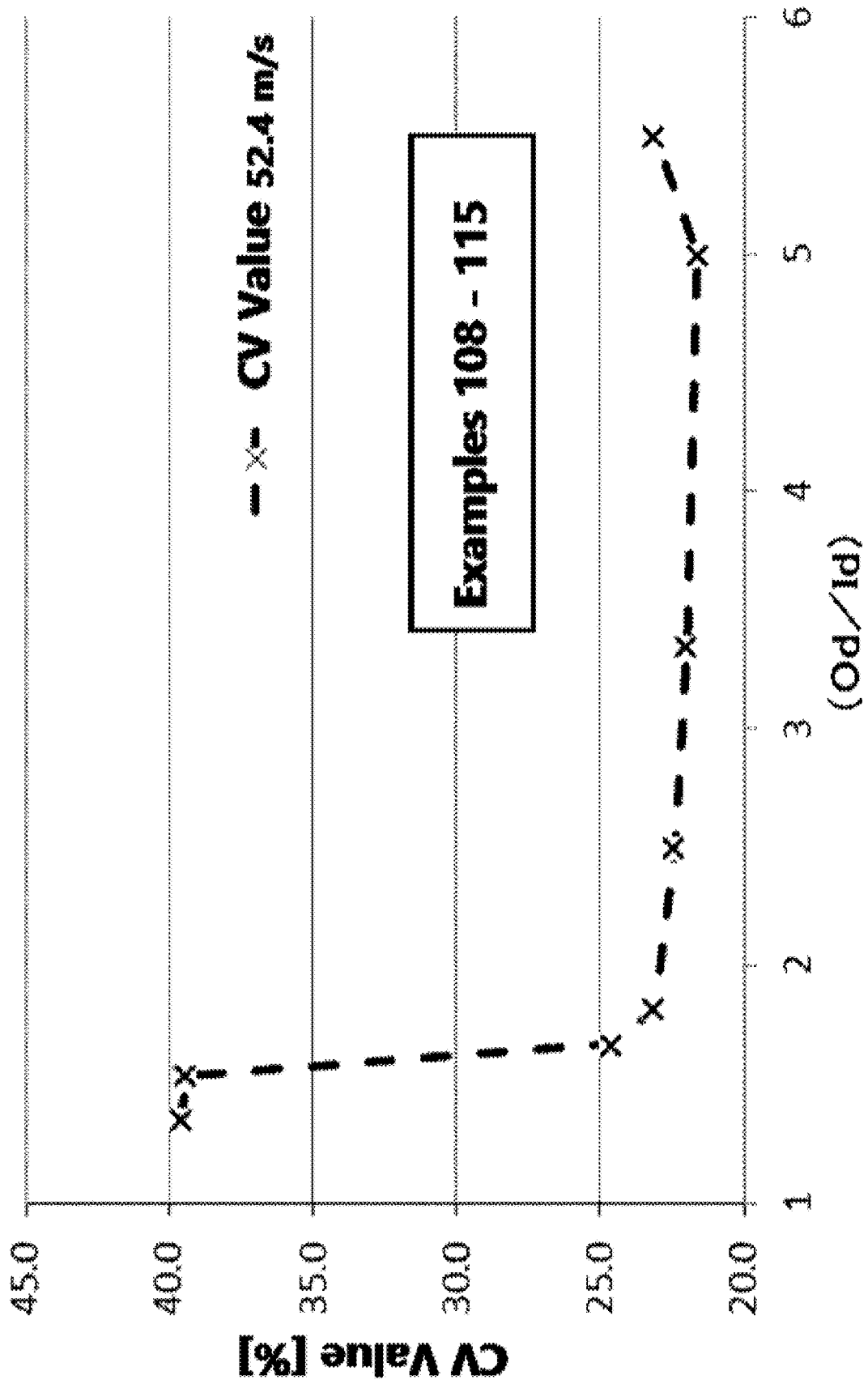
Figure 42:
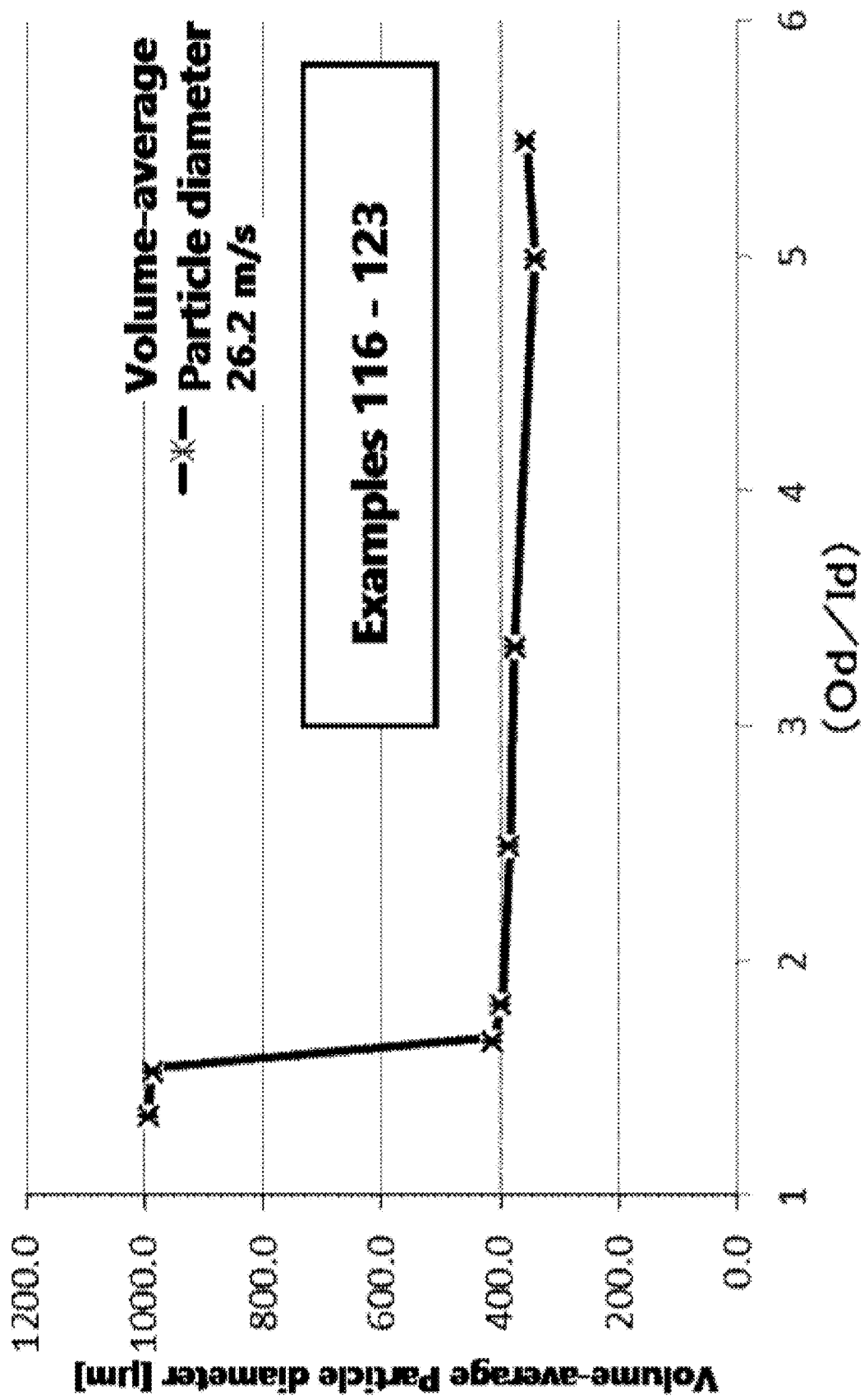
Figure 43:
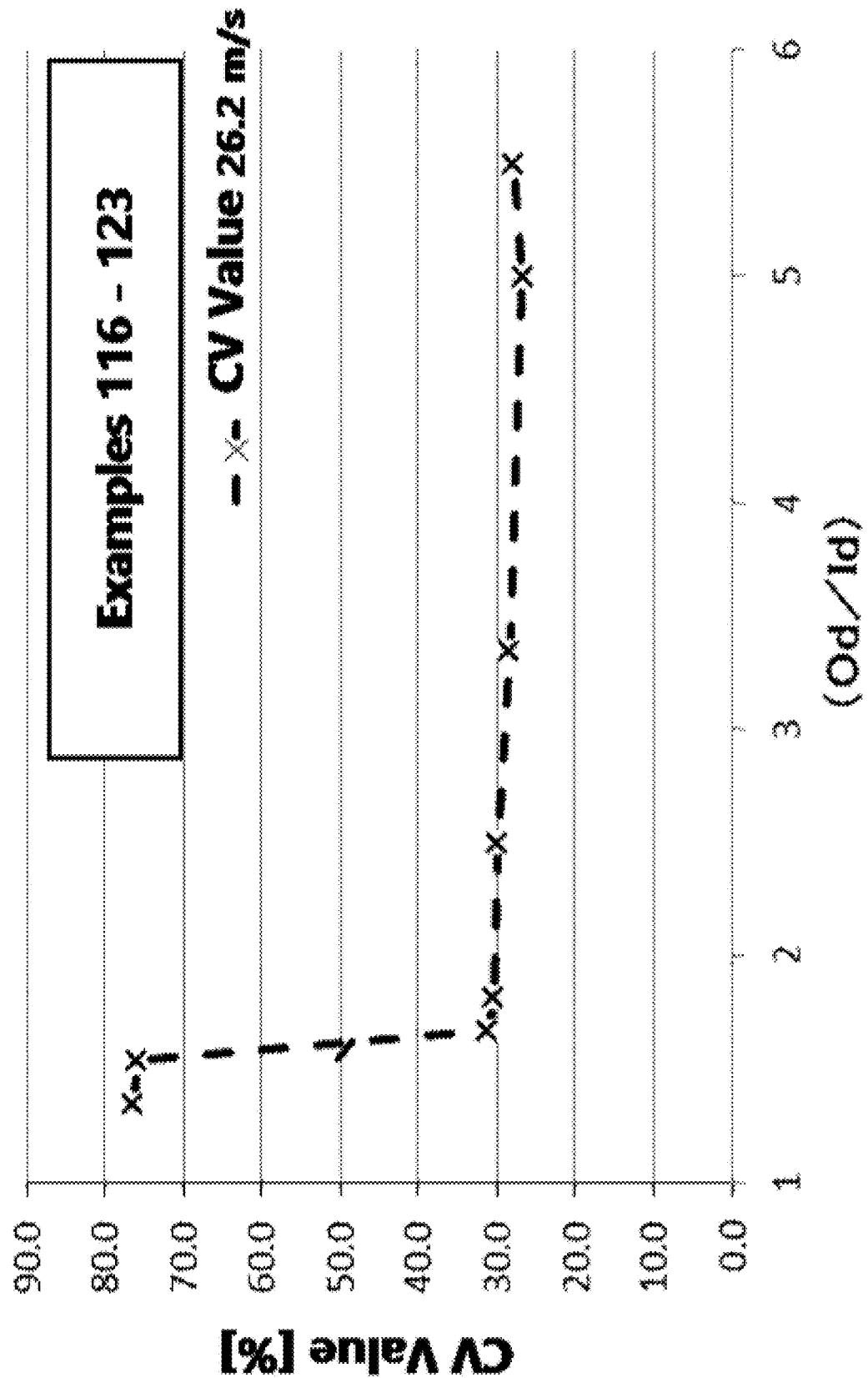
Figure 44:
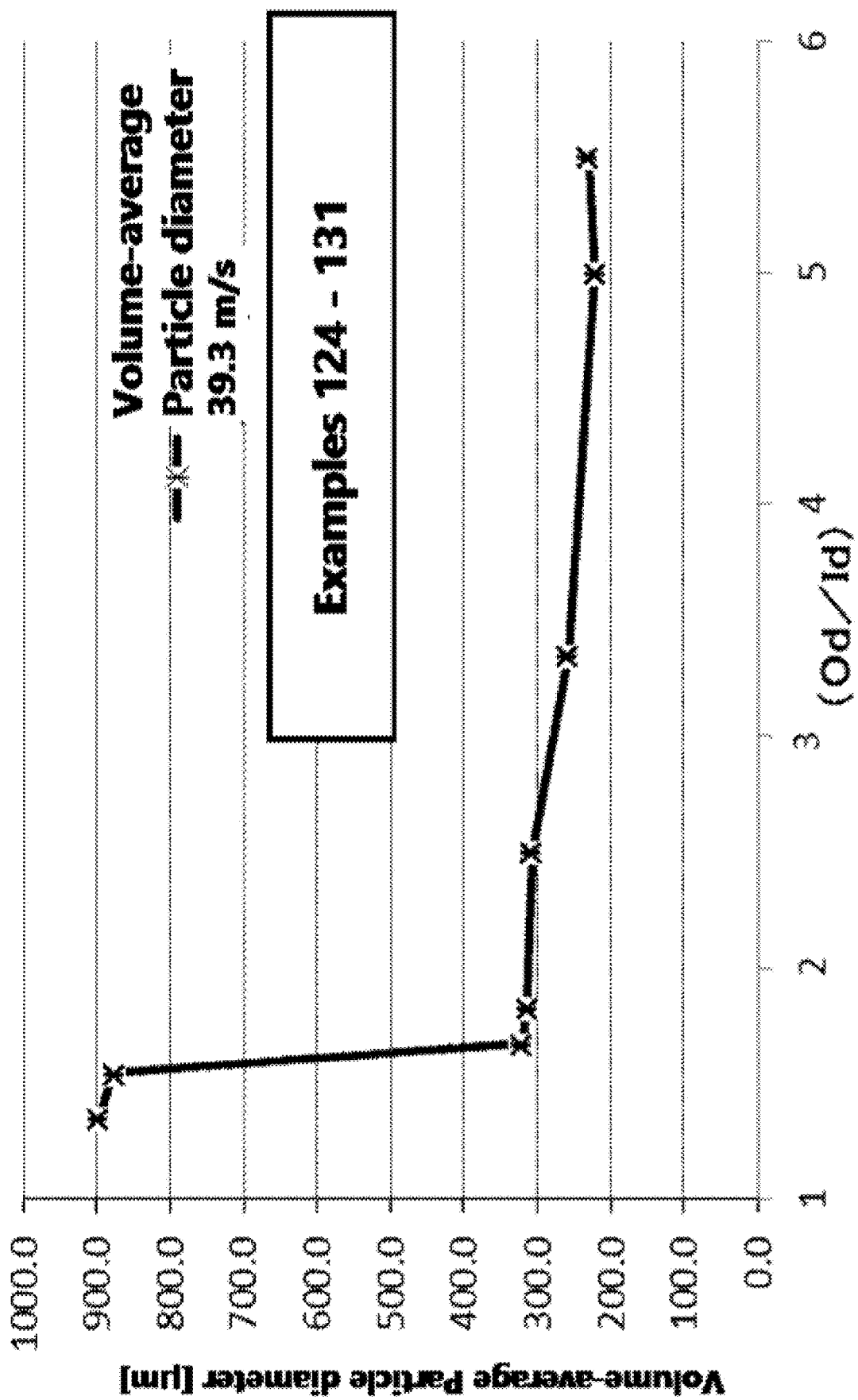
Figure 45:
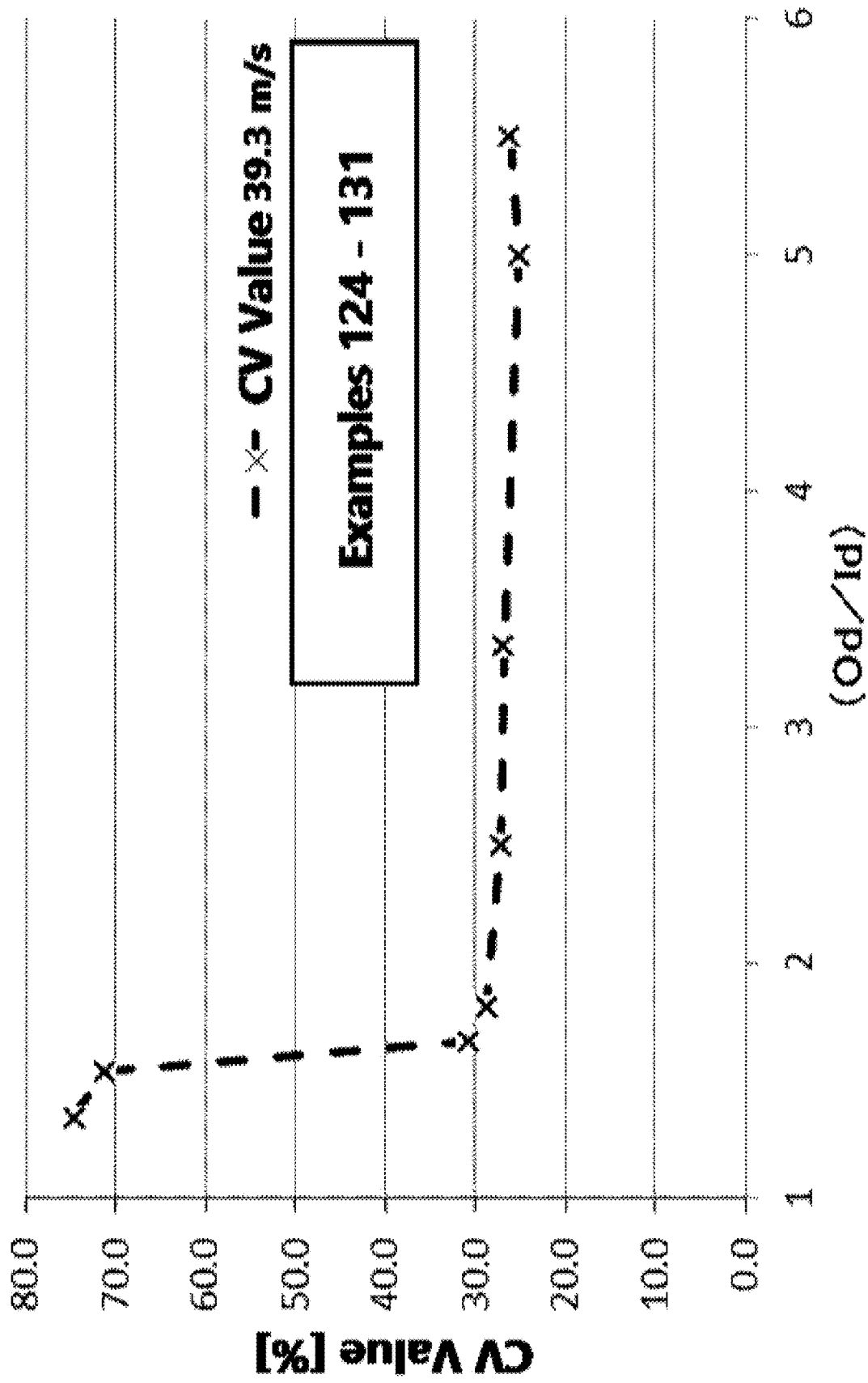
Figure 46:
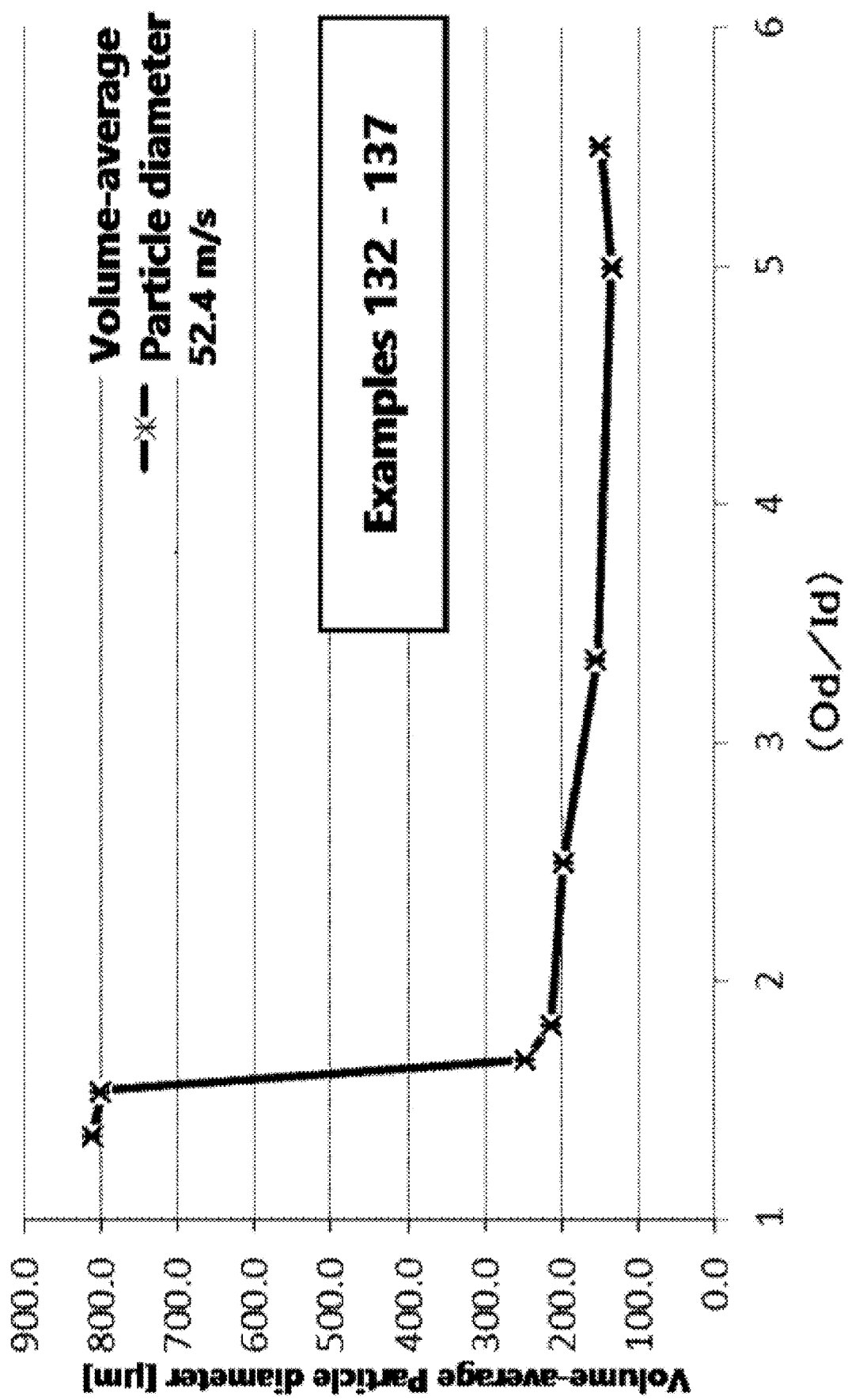
Figure 47:
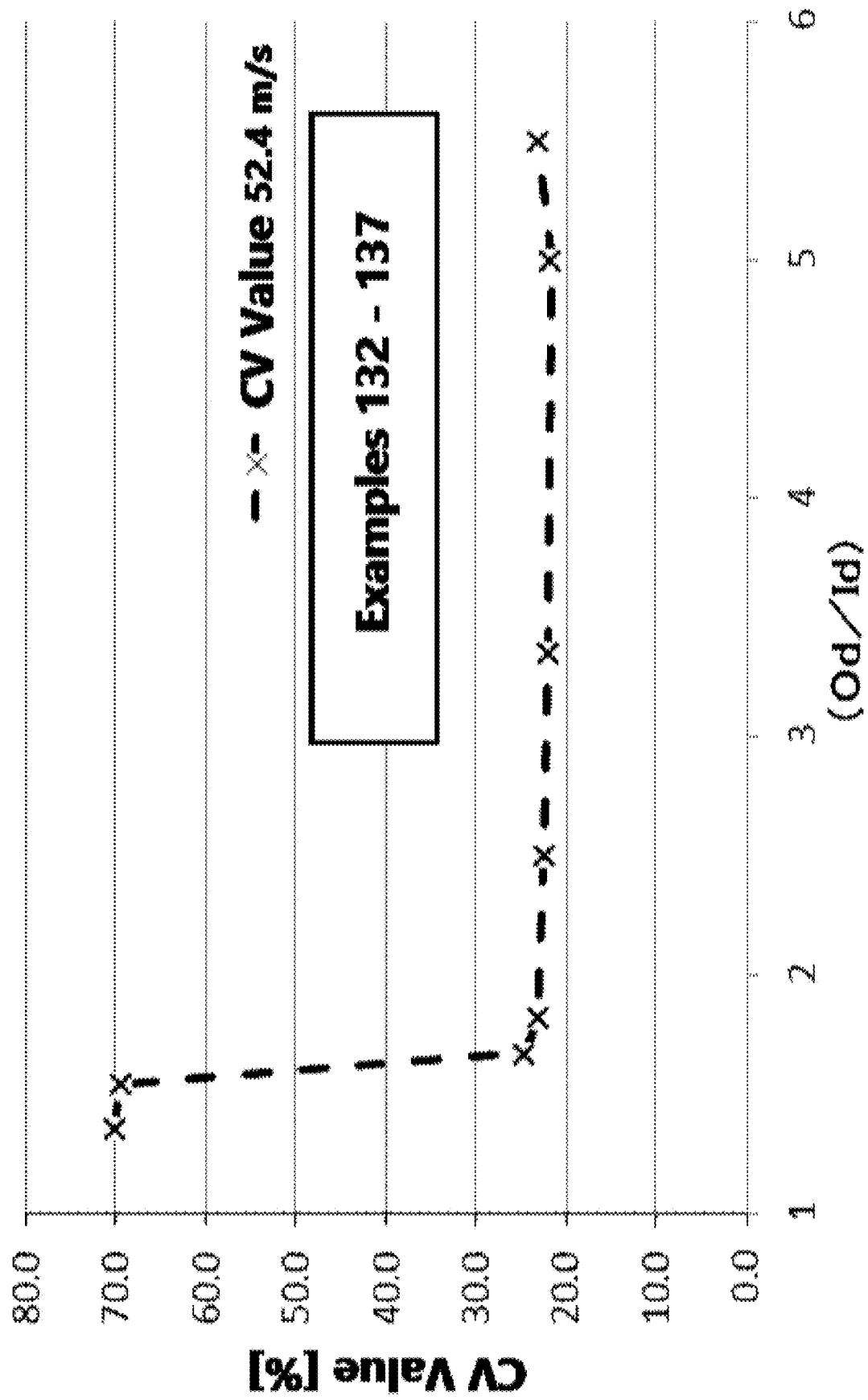

Method:

The 4% Tween 80/2% aciclovir aqueous solution was heated to 85° C., and then, it was introduced from the inside introduction part into between the processing surfaces 1 and 2. The fluid to be processed was cooled between the processing surfaces to separate the aciclovir microparticles, and then the slurry of the aciclovir microparticles was ejected. Specifically, the processing member 20 was provided with the piping as the temperature adjusting mechanism J2 to pass a cooling medium; and then, a cooling water with temperature of 10° C. was passed through the temperature adjusting mechanism J2 to adjust the cooling water volume so as to be temperature of the discharged solution containing the aciclovir microparticles becoming 40° C. The process conditions and the results thereof are shown in Table 19. The relationships between the ratio (Od/Id) of the discharge part radius (Cd) to the introduction part radius (Id) and the crystallite diameter, and the d/D, and the crystallinity are shown in the graphs of FIG. 27 to FIG. 29. It was confirmed that the crystallite diameter, d/D, and the crystallinity each is increased with increase of Od/Cd.

Meanwhile, in Examples 60 to 139, the introduction part radius (Id) was fixed at 30 mm, while the discharge part radius (Od) was changed so as to give the respective ratios.

TABLE 19

| Example | Od/Id | Rotation number [rpm] | Circumferential velocity [m/sec] | TEM particle diameter (D) [nm] | Crystallite diameter (d) [nm] | d/D | Crystallinity |
|---|---|---|---|---|---|---|---|
| 60 | 1.35 | 1865 | 7.9 | 83.1 | 17.3 | 0.21 | 0.24 |
| 61 | 1.54 | 1626 | 7.9 | 82.4 | 18.6 | 0.23 | 0.25 |
| 62 | 1.67 | 1500 | 7.9 | 83.1 | 41.2 | 0.50 | 1 |
| 63 | 1.82 | 1375 | 7.9 | 83.4 | 42.3 | 0.51 | 1.14 |
| 64 | 2.50 | 1002 | 7.9 | 82.9 | 43.8 | 0.53 | 1.34 |
| 65 | 3.35 | 747 | 7.9 | 83.0 | 44.9 | 0.54 | 1.49 |
| 66 | 5.00 | 501 | 7.9 | 82.6 | 45.1 | 0.55 | 1.50 |
| 67 | 5.50 | 460 | 7.9 | 83.4 | 40.8 | 0.49 | 1.41 |

Examples 68 to 91

By using the apparatus shown in FIG. 1 and FIG. 5(A), emulsification processing was carried out with one kind of fluid to be processed to obtain an emulsion.

Method:

29.4% by weight of Liquid paraffin/1.33% by weight, Tween 80/0.67% by weight, Span 80/68.6% by weight, and pure water were mixed; and the resulting mixture was subjected to the pre-emulsification processing by using a high-speed emulsification/dispersion apparatus Cleamix Dissolver (product name: CLM-0.8SD, manufactured by M. Technique Co., Ltd.) (total weight of 800 g was processed at 3000 rpm for 5 minutes). The volume-average particle diameter after the pre-emulsification processing was 57.66 μm, and the CV value thereof was 37.5%. The solution after the pre-emulsification processing was introduced into between the processing members 1 and 2, wherein the processing member 10 was rotated to carry out the precision emulsification processing. The process conditions and the results thereof are shown in Table 20. Examples 68 to 75 belong to the group with the circumferential velocity of 26.2 m/sec, Examples 76 to 83 belong to the group with the circumferential velocity of 39.3 m/sec, and Examples 84 to 91 belong to the group with the circumferential velocity of 52.4 m/sec. In FIG. 30 to FIG. 35, the ratio Od/Id is plotted in the horizontal axis, and the volume-average particle diameter and the CV value are plotted in the vertical axis in each group.

It was found that when Od/Id is changed in such a way that it may become larger, the particle diameter can be controlled so as to be smaller, and the CV value can be decreased.

TABLE 20

| Example | Od/Id | Rotation number [rpm] | Circumferential velocity [m/sec] | Volume-average particle diameter [μm] | C.V. value [%] |
|---|---|---|---|---|---|
| 68 | 1.35 | 5957 | 26.2 | 0.51 | 36.7 |
| 69 | 1.54 | 5301 | 26.2 | 0.49 | 33.4 |
| 70 | 1.67 | 5000 | 26.2 | 0.36 | 18.6 |
| 71 | 1.82 | 3327 | 26.2 | 0.35 | 17.4 |
| 72 | 2.50 | 2502 | 26.2 | 0.34 | 16.9 |
| 73 | 3.35 | 1867 | 26.2 | 0.33 | 15.4 |
| 74 | 5.00 | 1251 | 26.2 | 0.31 | 15.3 |
| 75 | 5.50 | 1137 | 26.2 | 0.32 | 15.6 |
| 76 | 1.35 | 8935 | 39.3 | 0.49 | 31.4 |
| 77 | 1.54 | 7951 | 39.3 | 0.48 | 30.8 |
| 78 | 1.67 | 7500 | 39.3 | 0.30 | 16.1 |
| 79 | 1.82 | 4991 | 39.3 | 0.29 | 15.9 |
| 80 | 2.50 | 3753 | 39.3 | 0.28 | 15.6 |
| 81 | 3.35 | 2801 | 39.3 | 0.27 | 14.8 |
| 82 | 5.00 | 1876 | 39.3 | 0.27 | 14.5 |
| 83 | 5.50 | 1706 | 39.3 | 0.26 | 14.1 |
| 84 | 1.35 | 11914 | 52.4 | 0.48 | 28.5 |
| 85 | 1.54 | 10601 | 52.4 | 0.47 | 27.4 |
| 86 | 1.67 | 10000 | 52.4 | 0.30 | 15.8 |
| 87 | 1.82 | 6654 | 52.4 | 0.29 | 15.6 |
| 88 | 2.50 | 5004 | 52.4 | 0.28 | 15.4 |
| 89 | 3.35 | 3734 | 52.4 | 0.26 | 13.2 |
| 90 | 5.00 | 2502 | 52.4 | 0.24 | 13.1 |
| 91 | 5.50 | 2274 | 52.4 | 0.25 | 13.3 |

Examples 92 to 115

By using the apparatus shown in FIG. 1 and FIG. 5(A), dispersion processing was carried to one kind of fluid to be processed containing red pigments.

Method:

Red pigment (C. I. Pigment Red 177: PR-177) having the primary particle diameter of 20 to 30 nm was added to the mixed solution of propylene glycol monomethyl ether acetate (PGMEA) and propylene glycol monomethyl ether (PGME) (PGMEA/PGME=4/1 by volume ratio) in which a dispersant (BYK-200; manufactured by BYK-Chemie GmbH) was dissolved; and then, the resulting mixture was subjected to the pre-dispersion processing by using a high-speed emulsification/dispersion apparatus Cleamix Dissolver (product name: CLM-0.8SD, manufactured by M. Technique Co., Ltd.) (total weight of 800 g was processed at 3000 rpm for 30 minutes). The volume-average particle diameter after the pre-dispersion processing was 23.6 µm, and the CV value thereof was 74.1%. The solution after the pre-dispersion processing was introduced into between the processing members 1 and 2, wherein the processing member 10 was rotated to carry out the precision dispersion processing (process condition: 5% by weight of PR-177/5% by weight of BYK-2000/90% by weight of PGMEA/PGME).

The process conditions and the results thereof are shown in Table 21. Examples 92 to 99 belong to the group with the circumferential velocity of 26.2 m/sec, Examples 100 to 107 belong to the group with the circumferential velocity of 39.3 m/sec, and Examples 108 to 115 belong to the group with the circumferential velocity of 52.4 m/sec. In FIG. 36 to FIG. 41, the ratio Od/Id is plotted in the horizontal axis, and the volume-average particle diameter and the CV value are plotted in the vertical axis in each group.

It was found that when Od/Id is changed in such a way that it may become larger, the particle diameter can be controlled so as to be smaller, and the CV value can be decreased.

TABLE 21

| Example | Od/Id | Rotation number [rpm] | Circum-ferential velocity [m/sec] | Volume-average particle diameter [µm] | C.V. value [%] |
|---|---|---|---|---|---|
| 92 | 1.35 | 5957 | 26.2 | 46.3 | 43.2 |
| 93 | 1.54 | 5301 | 26.2 | 46.3 | 43.0 |
| 94 | 1.67 | 5000 | 26.2 | 28.9 | 28.1 |
| 95 | 1.82 | 3327 | 26.2 | 27.6 | 27.4 |
| 96 | 2.50 | 2502 | 26.2 | 27.1 | 26.1 |
| 97 | 3.35 | 1867 | 26.2 | 26.4 | 25.4 |
| 98 | 5.00 | 1251 | 26.2 | 25.3 | 24.3 |
| 99 | 5.50 | 1137 | 26.2 | 25.8 | 26.4 |
| 100 | 1.35 | 8935 | 39.3 | 43.1 | 41.2 |
| 101 | 1.54 | 7951 | 39.3 | 43.3 | 41.1 |
| 102 | 1.67 | 7500 | 39.3 | 26.1 | 26.4 |
| 103 | 1.82 | 4991 | 39.3 | 25.3 | 25.4 |
| 104 | 2.50 | 3753 | 39.3 | 24.3 | 24.6 |
| 105 | 3.35 | 2801 | 39.3 | 23.8 | 23.9 |
| 106 | 5.00 | 1876 | 39.3 | 22.4 | 22.8 |
| 107 | 5.50 | 1706 | 39.3 | 24.6 | 24.1 |
| 108 | 1.35 | 11914 | 52.4 | 40.1 | 39.6 |
| 109 | 1.54 | 10601 | 52.4 | 40.9 | 39.4 |
| 110 | 1.67 | 10000 | 52.4 | 24.3 | 24.6 |
| 111 | 1.82 | 6654 | 52.4 | 23.5 | 23.1 |
| 112 | 2.50 | 5004 | 52.4 | 23.0 | 22.4 |
| 113 | 3.35 | 3734 | 52.4 | 22.4 | 22.0 |
| 114 | 5.00 | 2502 | 52.4 | 21.8 | 21.6 |
| 115 | 5.50 | 2274 | 52.4 | 24.3 | 23.1 |

Examples 116 to 137

By using the apparatus shown in FIG. 1 and FIG. 5(A), pulverization processing was carried out to one kind of fluid to be processed containing progesterone drug particles.

Method:

Progesterone powders having the primary particle diameter of 3 to 5 µm was added to the aqueous solution of the dispersion auxiliary agent (HCP—H), and the resulting mixture was subjected to the pre-dispersion processing by using a high-speed emulsification/dispersion apparatus Cleamix Dissolver (product name: CLM-0.8SD, manufactured by M. Technique Co., Ltd.) (total weight of 800 g was processed at 3000 rpm for 30 minutes). After the pre-dispersion processing, the volume-average particle diameter was 4.97 µm and the CV value was 83.4%. The solution after the pre-dispersion processing was introduced into between the processing members 1 and 2, wherein the processing member 10 was rotated to carry out the pulverization processing (process condition: 5% by weight of PR-177/5% by weight of BYK-2000/90% by weight of PGMEA/PGME).

The process conditions and the results thereof are shown in Table 22. Examples 116 to 123 belong to the group with the circumferential velocity of 26.2 m/sec, Examples 124 to 131 belong to the group with the circumferential velocity of 39.3 m/sec, and Examples 132 to 137 belong to the group with the circumferential velocity of 52.4 m/sec. In FIG. 42 to FIG. 47, the ratio Od/Id is plotted in the horizontal axis, and the volume-average particle diameter and the CV value are plotted in the vertical axis in each group.

It was found that when Od/Id is changed in such a way that it may become larger, the particle diameter can be controlled so as to be smaller, and the CV value can be decreased.

TABLE 22

| Example | Od/Id | Rotation number [rpm] | Circum-ferential velocity [m/sec] | Volume-average particle diameter [µm] | C.V. value [%] |
|---|---|---|---|---|---|
| 116 | 1.35 | 5957 | 26.2 | 994.3 | 76.4 |
| 117 | 1.54 | 5301 | 26.2 | 987.6 | 75.9 |
| 118 | 1.67 | 5000 | 26.2 | 411.6 | 31.2 |
| 119 | 1.82 | 3327 | 26.2 | 398.6 | 30.4 |
| 120 | 2.50 | 2502 | 26.2 | 384.6 | 29.9 |
| 121 | 3.35 | 1867 | 26.2 | 375.6 | 28.4 |
| 122 | 5.00 | 1251 | 26.2 | 341.6 | 26.7 |
| 123 | 5.50 | 1137 | 26.2 | 357.9 | 27.9 |
| 124 | 1.35 | 8935 | 39.3 | 897.6 | 74.6 |
| 125 | 1.54 | 7951 | 39.3 | 876.4 | 71.2 |
| 126 | 1.67 | 7500 | 39.3 | 321.3 | 30.6 |
| 127 | 1.82 | 4991 | 39.3 | 314.5 | 28.7 |
| 128 | 2.50 | 3753 | 39.3 | 308.1 | 27.1 |
| 129 | 3.35 | 2801 | 39.3 | 258.4 | 26.8 |
| 130 | 5.00 | 1876 | 39.3 | 221.3 | 25.1 |
| 131 | 5.50 | 1706 | 39.3 | 231.4 | 26.1 |
| 132 | 1.35 | 11914 | 52.4 | 811.2 | 70.1 |
| 133 | 1.54 | 10601 | 52.4 | 798.6 | 69.4 |
| 134 | 1.67 | 10000 | 52.4 | 246.5 | 24.6 |
| 135 | 1.82 | 6654 | 52.4 | 213.5 | 23.1 |
| 136 | 2.50 | 5004 | 52.4 | 198.4 | 22.4 |
| 137 | 3.35 | 3734 | 52.4 | 154.6 | 22.0 |

As it is clear from each Example, when Od/Cd was 1.25 or more and Od/Id was 1.67 or more, each value was drastically improved. This was a great surprise even for inventors; and the present invention was completed on the basis of such finding.

The invention claimed is:

1. A fluid processing method comprising:
an introducing step in which a fluid to be processed is introduced through two or more of introduction parts into a space between at least two processing surfaces facing each other so as to be able to approach or separate from each other, at least one of the at least two processing surfaces rotating relative to the other, and a processing step in which the fluid processing is performed while a thin film fluid formed by the fluid to be processed is passing through the space between the at least two processing surfaces, and then the fluid to be processed is discharged from the space between the two processing surfaces, wherein:

at least two kinds of fluids are used as the fluid to be processed;

the two or more of introduction parts comprise an inside introduction part and an intermediate introduction part which is disposed in a position more apart from a center of the rotation of at least one of the at least two processing surfaces than the inside introduction part;

in the processing step, the space between the processing surfaces is a processing region having the inside introduction part, which is disposed in an inner side of the processing surfaces, as an upstream side of the processing region, and an outer circumference side of the rotation as a downstream side of the processing region, and then the fluid to be processed is discharged from an outer circumference edge of the processing region;

the processing region comprises a mixing region which is located more apart from the center of the rotation than the intermediate introduction part and an unmixed region which is located nearer to the center of the rotation than the intermediate introduction part;

the introduction step comprises a step of introducing at least one kind of the fluids to be processed into the unmixed region from the inside introduction part and a step of introducing at least one other fluid to be processed into the mixing region from the intermediate introduction part;

the processing step comprises a step of mixing in the mixing region the fluid to be processed which is introduced from the inside introduction part with the fluid to be processed which is introduced from the intermediate introduction part; and the at least two kinds of fluids include a raw material fluid containing a substance to be separated and a fluid to separate microparticles of the substance from the raw material fluid;

further in the processing step, at least any one of following controls of the processing characteristics is carried out by selecting a ratio Od/Cd of a distance Od from the center of the rotation to the outer circumference edge to a distance Cd from the center of the rotation to the intermediate introduction part to be within the range of 1.25 to 5.0:

a crystallinity control in which crystallinity of the microparticles is increased compared to processing carried out outside the range of Od/Cd, a d/D control in which a ratio of crystallite diameter d to particle diameter D of the microparticles is increased compared to processing carried out outside the range of Od/Cd, and a control in which a particle size distribution of the microparticles is made narrower compared to processing carried out outside the range of Od/Cd.

2. The fluid processing method according to claim 1, wherein as the control of the processing characteristics, the following controls are carried out:

the crystallinity control in which crystallinity of the microparticles is increased compared to processing carried out outside the range of Od/Cd, and the d/D control in which the ratio of crystallite diameter to particle diameter of the microparticles is increased compared to processing carried out outside the range of Od/Cd; and the crystallinity control is to increase crystallinity of the microparticles by increasing the ratio of the distance from the center of the rotation to the outer circumference edge to the distance from the center of the rotation to the intermediate introduction part, and to decrease the crystallinity by decreasing the ratio of the distance from the center of the rotation to the outer circumference edge to the distance from the center of the rotation to the intermediate introduction part, and the d/D control is to increase the crystallite diameter as well as the ratio of the crystallite diameter to the particle diameter of the microparticles by increasing the ratio of the distance from the center of the rotation to the outer circumference edge to the distance from the center of the rotation to the intermediate introduction part, and to decrease the crystallite diameter as well as the ratio of the crystallite diameter to the particle diameter of the microparticles by decreasing the ratio of the distance from the center of the rotation to the outer circumference edge to the distance from the center of the rotation to the intermediate introduction part.

3. The fluid processing method according to claim 2, wherein the unmixed region includes a coercive introducing region and a thin film controlling region which is located radially outward of the coercive introducing region with respect to the center of the rotation;

the coercive introducing region is formed such that in at least one of the at least two processing surfaces, a depression structure resulting in a micropump effect is extended in a direction from the upstream side to the downstream side, and the thin film controlling region is a region between a downstream end of the depression structure and the intermediate introduction part;

at least one kind of the fluids to be processed is coercively introduced by the depression structure from the inside introduction part to the coercive introducing region, and in the thin film controlling region, pulsation and pressure variance generated by the micropump effect are reduced so that the fluid to be processed becomes a flow under the condition of spiral laminar flow and then flows to the mixing region; and the control of the processing characteristics is carried out by increasing or decreasing a width ratio of a width of the mixing region in a radius direction of the rotation to a width of the thin film controlling region in the radius direction of the rotation.

4. The fluid processing method according to claim 1, wherein the unmixed region includes a coercive introducing region and a thin film controlling region which is located radially outward of the coercive introducing region with respect to the center of the rotation;

the coercive introducing region is formed such that in at least one of the at least two processing surfaces, a depression structure resulting in a micropump effect is extended in a direction from the upstream side to the downstream side, and the thin film controlling region is a region between a downstream end of the depression structure and the intermediate introduction part;

at least one kind of the fluids to be processed is coercively introduced by the depression structure from the inside introduction part to the coercive introducing region, and in the thin film controlling region, pulsation and pressure variance generated by the micropump effect are reduced so that the fluid to be processed becomes a flow under the condition of spiral laminar flow and then flows to the mixing region; and the control of the processing characteristics is carried out by increasing or decreasing a width ratio of a width of the mixing region in a radius direction of the rotation to a width of the thin film controlling region in the radius direction of the rotation.

5. The fluid processing method according to claim 4, wherein the crystallinity control is to increase crystallinity of the microparticles by increasing the width ratio and to decrease crystallinity by decreasing the width ratio, and the d/D control is to increase the crystallite diameter as well as the ratio of the crystallite diameter to the particle diameter of the microparticles by increasing the width ratio, and to decrease the crystallite diameter as well as the ratio of the crystallite diameter to the particle diameter of the microparticles by decreasing the width ratio.

6. A fluid processing method, comprising:

an introducing step in which a fluid to be processed is introduced through two or more of introduction parts into a space between at least two processing surfaces facing each other so as to be able to approach or separate from each other, at least one of the at least two processing surfaces rotating relative to the other, and a processing step in which the fluid processing is performed while a thin film fluid formed by the fluid to be processed is passing through the space between the at least two processing surfaces, and then the fluid to be processed is discharged from the space between the two processing surfaces, wherein:

at least two kinds of fluids are used as the fluid to be processed;

the two or more of introduction parts comprise an inside introduction part and an intermediate introduction part which is disposed in a position more apart from a center of the rotation of at least one of the at least two processing surfaces than the inside introduction part;

in the processing step, the space between the processing surfaces is a processing region having the inside introduction part, which is disposed in an inner side of the processing surfaces, as an upstream side of the processing region, and an outer circumference side of the rotation as a downstream side of the processing region, and then the fluid to be processed is discharged from an outer circumference edge of the processing region;

the processing region comprises a mixing region which is located more apart from the center of the rotation than the intermediate introduction part and an unmixed region which is located nearer to the center of the rotation than the intermediate introduction part;

the introduction step comprises a step of introducing at least one kind of the fluids to be processed into the unmixed region from the inside introduction part and a step of introducing at least one other fluid to be processed into the mixing region from the intermediate introduction part;

the processing step comprises a step of mixing in the mixing region the fluid to be processed which is introduced from the inside introduction part with the fluid to be processed which is introduced from the intermediate introduction part; and at least one kind of fluid of the two kinds of fluids to be processed contains a reaction substance having reactivity;

further in the processing step, at least any one of following controls of the processing characteristics is carried out by selecting a ratio Od/Cd of a distance Od from the center of the rotation to the outer circumference edge to a distance Cd from the center of the rotation to the intermediate introduction part to be within a range of 1.25 to 5.0:

a yield control in which yield of the reaction is increased compared to processing carried out outside the range of Od/Cd, and a purity control in which purity of the reaction is increased compared to processing carried out outside the range of Od/Cd.

7. The fluid processing method according to claim 6, wherein the yield control is to increase the yield by increasing the ratio of the distance from the center of the rotation to the outer circumference edge to the distance from the center of the rotation to the intermediate introduction part, and to decrease the yield by decreasing the ratio of the distance from the center of the rotation to the outer circumference edge to the distance from the center of the rotation to the intermediate introduction part, and the purity control is to increase the purity by increasing the ratio of the distance from the center of the rotation to the outer circumference edge to the distance from the center of the rotation to the intermediate introduction part, and to decrease the purity by decreasing the ratio of the distance from the center of the rotation to the outer circumference edge to the distance from the center of the rotation to the intermediate introduction part.

8. The fluid processing method according to claim 7, wherein the unmixed region includes a coercive introducing region and a thin film controlling region which is located radially outward of the coercive introducing region with respect to the center of the rotation;

the coercive introducing region is formed such that in at least one of the at least two processing surfaces, a depression structure resulting in a micropump effect is extended in a direction from the upstream side to the downstream side, and the thin film controlling region is a region between a downstream end of the depression structure and the intermediate introduction part;

at least one kind of the fluids to be processed is coercively introduced by the depression structure from the inside introduction part to the coercive introducing region, and in the thin film controlling region, pulsation and pressure variance generated by the micropump effect are reduced so that the fluid to be processed becomes a flow under the condition of spiral laminar flow and then flows to the mixing region; and the control of the processing characteristics is carried out by increasing or decreasing a width ratio of a width of the mixing region in a radius direction of the rotation to a width of the thin film controlling region in the radius direction of the rotation.

9. The fluid processing method according to claim 6, wherein the unmixed region includes a coercive introducing region and a thin film controlling region which is located radially outward of the coercive introducing region with respect to the center of the rotation;

the coercive introducing region is formed such that in at least one of the at least two processing surfaces, a depression structure resulting in a micropump effect is extended in a direction from the upstream side to the downstream side, and the thin film controlling region is a region between a downstream end of the depression structure and the intermediate introduction part;

at least one kind of the fluids to be processed is coercively introduced by the depression structure from the inside introduction part to the coercive introducing region, and in the thin film controlling region, pulsation and pressure variance generated by the micropump effect are reduced so that the fluid to be processed becomes a flow under the condition of spiral laminar flow and then flows to the mixing region; and the control of the processing characteristics is carried out by increasing or decreasing a width ratio of a width of the mixing region in a radius direction of the rotation to a width of the thin film controlling region in the radius direction of the rotation.

10. The fluid processing method according to claim 9, wherein the yield control is to increase the yield by increasing the width ratio and to decrease the yield by decreasing the width ratio, and the purity control is to increase the purity by increasing the width ratio and to decrease the purity by decreasing the width ratio.

11. A fluid processing method, comprising:

an introducing step in which a fluid to be processed is introduced through two or more of introduction parts into a space between at least two processing surfaces facing each other so as to be able to approach or separate from each other, at least one of the at least two processing surfaces rotating relative to the other, and a processing step in which the fluid processing is performed while a thin film fluid formed by the fluid to be processed is passing through the space between the at least two processing surfaces, and then the fluid to be processed is discharged from the space between the two processing surfaces, wherein:

at least two kinds of fluids are used as the fluid to be processed;

the two or more of introduction parts comprise an inside introduction part and an intermediate introduction part which is disposed in a position more apart from a center of the rotation of at least one of the at least two processing surfaces than the inside introduction part;

in the processing step, the space between the processing surfaces is a processing region having the inside introduction part, which is disposed in an inner side of the processing surfaces, as an upstream side of the processing region, and an outer circumference side of the rotation as a downstream side of the processing region, and then the fluid to be processed is discharged from an outer circumference edge of the processing region;

the processing region comprises a mixing region which is located more apart from the center of the rotation than the intermediate introduction part and an unmixed region which is located nearer to the center of the rotation than the intermediate introduction part;

the introduction step comprises a step of introducing at least one kind of the fluids to be processed into the unmixed region from the inside introduction part and a step of introducing at least one other fluid to be processed into the mixing region from the intermediate introduction part;

the processing step comprises a step of mixing in the mixing region the fluid to be processed which is introduced from the inside introduction part with the fluid to be processed which is introduced from the intermediate introduction part; and the at least two kinds of fluids to be processed are subjected to at least any one of emulsification, dispersion, and pulverization; and further in the processing step, at least any one of following controls is carried out by selecting a ratio Od/Cd of a distance Od from the center of the rotation to the outer circumference edge to a distance Cd from the center of the rotation to the intermediate introduction part to be within a range of 1.25 to 5.0:

a particle diameter control in which particle diameter of obtained microparticles becomes smaller compared to processing carried out outside the range of Od/Cd, and a control in which particle size distribution of obtained microparticles is made narrower compared to processing carried out outside the range of Od/Cd.

12. A fluid processing method, comprising:

an introducing step in which one kind of fluid to be processed is introduced through an introduction part into a space between at least two processing surfaces facing each other so as to be able to approach or separate from each other, at least one of the at least two processing surfaces rotating relative to the other, and a processing step in which a fluid is processed while a thin film fluid formed by the fluid to be processed is passing through the space between the at least two processing surfaces, and then is discharged from the space between the two processing surfaces, wherein in the processing step, the space between the processing surfaces is a processing region having the introduction part, which is disposed in an inner side of the processing surfaces, as an upstream side of the processing region, and an outer circumference side of the rotation of at least one of the at least two processing surfaces as a downstream side of the processing region, and then the fluid to be processed is discharged from an outer circumference edge of the processing region; and the fluid to be processed includes a raw material fluid containing a substance to be separated, and the processing step contains a step of separating microparticles of the substance from the said raw material fluid by applying an energy to the fluid to be processed introduced from the introduction part into the processing region, further in the processing step, at least any one of following controls of the processing characteristics is carried out by selecting a ratio Od/Id of a distance Od from the center of the rotation to the outer circumference edge to a distance Id from the center of the rotation to the introduction part to be within the range of 1.67 to 8.33:

a crystallinity control in which crystallinity of the microparticles is increased compared to processing carried out outside the range of Od/Id, a d/D control in which a ratio of crystallite diameter d to particle diameter D of the microparticles is increased compared to processing carried out outside the range of Od/Id, and a control in which particle size distribution of the microparticles is made narrower compared to processing carried out outside the range of Od/Id.

13. The fluid processing method according to claim 12, wherein as the control of the processing characteristics, following controls are carried out:

a crystallinity control in which crystallinity of the microparticles is increased compared to processing carried out outside the range of Od/Id, and a d/D control in which a ratio of crystallite diameter d to particle diameter D of the microparticles is increased compared to processing carried out outside the range of Od/Id; and the crystallinity control is to increase crystallinity of the microparticles by increasing the ratio of the distance from the center of the rotation to the outer circumference edge to the distance from the center of the rotation to the introduction part, and to decrease the crystallinity by decreasing the ratio of the distance from the center of the rotation to the outer circumference edge to the distance from the center of the rotation to the introduction part, and the d/D control is to increase the crystallite diameter as well as the ratio of the crystallite diameter to the particle diameter of the microparticles by increasing the ratio of the distance from the center of the rotation to the outer circumference edge to the distance from the center of the rotation to the introduction part, and to decrease the crystallite diameter as well as the ratio of the crystallite diameter to the particle diameter of the microparticles by decreasing the ratio of the distance from the center of the rotation to the outer circumference edge to the distance from the center of the rotation to the introduction part.

14. A fluid processing method, comprising:

an introducing step in which one kind of fluid to be processed is introduced through an introduction part into a space between at least two processing surfaces facing each other so as to be able to approach or separate from each other, at least one of the at least two processing surfaces rotating relative to the other, and a processing step in which a fluid is processed while a thin film fluid formed by the fluid to be processed is passing through the space between the at least two processing surfaces, and then is discharged from the space between the two processing surfaces, wherein:

in the processing step, the space between the processing surfaces is a processing region having the introduction part, which is disposed in an inner side of the processing surfaces, as an upstream side of the processing region, and an outer circumference side of the rotation of at least one of the at least two processing surfaces as a downstream side of the processing region, and then the fluid to be processed is discharged from an outer circumference edge of the processing region; and the fluid to be processed contains a reaction substance having reactivity;

further in the processing step, at least any one of following controls is carried out by selecting a ratio Od/Id of a distance Od from the center of the rotation to the outer circumference edge to a distance Id from the center of the rotation to the introduction part to be within the range of 1.67 to 8.33:

a yield control in which yield of the reaction is increased compared to processing carried out outside the range of Od/Id, and a purity control in which purity of the reaction is increased compared to processing carried out outside the range of Od/Id.

15. The fluid processing method according to claim 14, wherein the yield control is to increase the yield by increasing the ratio of the distance from the center of the rotation to the outer circumference edge to the distance from the center of the rotation to the introduction part, and to decrease the yield by decreasing the ratio of the distance from the center of the rotation to the outer circumference edge to the distance from the center of the rotation to the introduction part, and the purity control is to increase the purity by increasing the ratio of the distance from the center of the rotation to the outer circumference edge to the distance from the center of the rotation to the introduction part, and to decrease the purity by decreasing the ratio of the distance from the center of the rotation to the outer circumference edge to the distance from the center of the rotation to the introduction part.

16. A fluid processing method, comprising:

an introducing step in which one kind of fluid to be processed is introduced through an introduction part into a space between at least two processing surfaces facing each other so as to be able to approach or separate from each other, at least one of the at least two processing surfaces rotating relative to the other, and a processing step in which a fluid is processed while a thin film fluid formed by the fluid to be processed is passing through the space between the at least two processing surfaces, and then is discharged from the space between the two processing surfaces, wherein in the processing step, the space between the processing surfaces is a processing region having the introduction part, which is disposed in an inner side of the processing surfaces, as an upstream side of the processing region, and an outer circumference side of the rotation of at least one of the at least two processing surfaces as a downstream side of the processing region, and then the fluid to be processed is discharged from an outer circumference edge of the processing region; and the fluid to be processed is subjected to at least any one of emulsification, dispersion, and pulverization;

further in the processing step, at least any one of following controls is carried out by selecting a ratio Od/Id of a distance Od from the center of the rotation to the outer circumference edge to a distance Id from the center of the rotation to the introduction part to be within the range of 1.67 to 8.33:

a particle diameter control in which particle diameter of the obtained microparticles becomes smaller compared to processing carried out outside the range of Od/Id, and a control in which particle size distribution of the obtained microparticles is made narrower compared to processing carried out outside the range of Od/Id.

\* \* \* \* \*